US009483904B2

(12) United States Patent
Kitamura et al.

(10) Patent No.: US 9,483,904 B2
(45) Date of Patent: Nov. 1, 2016

(54) GAMING MACHINE

(71) Applicants: UNIVERSAL ENTERTAINMENT CORPORATION, Koto-Ku, Tokyo (JP); ARUZE GAMING AMERICA, INC., Las Vegas, NV (US)

(72) Inventors: Kenta Kitamura, Tokyo (JP); Kenji Enokido, Tokyo (JP); Tatsuya Teranishi, Tokyo (JP); Takaki Narita, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 116 days.

(21) Appl. No.: 14/486,352

(22) Filed: Sep. 15, 2014

(65) Prior Publication Data

US 2015/0087390 A1 Mar. 26, 2015

(30) Foreign Application Priority Data

Sep. 20, 2013 (JP) ................................ 2013-194981

(51) Int. Cl.
*G06F 19/00* (2011.01)
*G07F 17/32* (2006.01)
*G07F 17/34* (2006.01)

(52) U.S. Cl.
CPC ........... *G07F 17/3213* (2013.01); *G07F 17/34* (2013.01)

(58) Field of Classification Search
None
See application file for complete search history.

(56) References Cited

U.S. PATENT DOCUMENTS

2004/0067791 A1* 4/2004 Glavich .............. G07F 17/3267 463/20
2005/0054419 A1* 3/2005 Souza ..................... G07F 17/32 463/20
2008/0227528 A1* 9/2008 Sakuma .................. G07F 17/34 463/20
2013/0217472 A1 8/2013 Kitamura et al.

FOREIGN PATENT DOCUMENTS

CN 103258380 8/2013
JP 2007020954 2/2007

OTHER PUBLICATIONS

Office Action dated Oct. 9, 2015 issued in corresponding Macau application.

* cited by examiner

*Primary Examiner* — Paul A D'Agostino
(74) *Attorney, Agent, or Firm* — KMF Patent Services, PLLC; Kenneth M. Fagin; S. Peter Konzel

(57) ABSTRACT

A gaming machine capable of realizing game patterns differing from one another in a bonus game is provided. A main CPU 222 determines symbols to be rearranged by conducting a lottery based on a first symbol determination table in which in free games, probabilities, with each of which predetermined symbols (BONUS symbols) are rearranged on a particular condition (a condition that three or more BONUS symbols are rearranged in a display window 56), are set so as to exceed a predetermined probability and in the next free games subsequent to the game in which the predetermined symbols have been rearranged on the particular condition, determines symbols to be rearranged by conducting a lottery based on a second symbol determination table in which probabilities, with each of which the predetermined symbols are rearranged on the particular condition, are set so as to less than the predetermined probability.

5 Claims, 55 Drawing Sheets

FIG. 9

PAYLINE DEFINITION TABLE

| No. | FIRST REEL | SECOND REEL | THIRD REEL | FOURTH REEL | FIFTH REEL |
|---|---|---|---|---|---|
| 1 | 1 | 1 | 1 | 1 | 1 |
| 2 | 0 | 0 | 0 | 0 | 0 |
| 3 | 2 | 2 | 2 | 2 | 2 |
| 4 | 0 | 1 | 2 | 1 | 0 |
| 5 | 2 | 1 | 0 | 1 | 2 |

FIG. 10

SYMBOL DETERMINATION TABLE FOR A BASIC GAME (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 6 | 3BAR | 4 | 1BAR | 10 | 1BAR | 7 | 2BAR | 2 |
| 01 | BLANK | 6 | BLANK | 4 | BLANK | 10 | BLANK | 7 | BLANK | 2 |
| 02 | BONUS | 6 | SEVEN | 4 | BONUS | 10 | SEVEN | 7 | BONUS | 4 |
| 03 | BLANK | 6 | BLANK | 4 | BLANK | 10 | BLANK | 7 | BLANK | 4 |
| 04 | SEVEN | 6 | BONUS | 6 | 1BAR | 30 | BONUS | 5 | SEVEN | 4 |
| 05 | BLANK | 6 | BLANK | 6 | BLANK | 36 | BLANK | 5 | BLANK | 4 |
| 06 | 3BAR | 6 | 2BAR | 6 | 2BAR | 16 | 2BAR | 5 | 3BAR | 4 |
| 07 | BLANK | 6 | BLANK | 6 | BLANK | 18 | BLANK | 5 | BLANK | 4 |
| 08 | BONUS | 6 | BONUS | 4 | SEVEN | 12 | BONUS | 7 | BONUS | 2 |
| 09 | BLANK | 6 | BLANK | 4 | BLANK | 18 | BLANK | 7 | BLANK | 2 |
| 10 | 2BAR | 32 | 3BAR | 34 | 2BAR | 30 | 1BAR | 15 | 2BAR | 34 |
| 11 | BLANK | 38 | BLANK | 34 | BLANK | 36 | BLANK | 15 | BLANK | 34 |
| 12 | 1BAR | 20 | 1BAR | 18 | 1BAR | 4 | 3BAR | 35 | 1BAR | 30 |
| 13 | BLANK | 22 | BLANK | 18 | BLANK | 4 | BLANK | 35 | BLANK | 30 |
| 14 | SEVEN | 16 | SEVEN | 18 | SEVEN | 4 | SEVEN | 35 | SEVEN | 30 |
| 15 | BLANK | 22 | BLANK | 18 | BLANK | 4 | BLANK | 35 | BLANK | 30 |
| 16 | 1BAR | 1 | 1BAR | 2 | 3BAR | 1 | 3BAR | 7 | 1BAR | 7 |
| 17 | BLANK | 1 | BLANK | 2 | BLANK | 1 | BLANK | 7 | BLANK | 7 |
| 18 | CHERRY | 1 | CHERRY | 2 | CHERRY | 1 | CHERRY | 7 | CHERRY | 7 |
| 19 | BLANK | 1 | BLANK | 2 | BLANK | 1 | BLANK | 7 | BLANK | 7 |
| 20 | 1BAR | 32 | 1BAR | 34 | 3BAR | 4 | 3BAR | 15 | 1BAR | 34 |
| 21 | BLANK | 38 | BLANK | 34 | BLANK | 4 | BLANK | 15 | BLANK | 34 |
| TOTAL | | 284 | | 264 | | 264 | | 290 | | 316 |

FIG. 11

PAYOUT TABLE (FIRST EMBODIMENT)

| COMBINATION OF SYMBOLS | | | | | PAYOUT | WINNING COMBINATION |
|---|---|---|---|---|---|---|
| FIRST REEL | SECOND REEL | THIRD REEL | FOURTH REEL | FIFTH REEL | | |
| SEVEN | SEVEN | SEVEN | (ANY) | (ANY) | 100 | SEVEN |
| SEVEN | SEVEN | SEVEN | SEVEN | (ANY) | 200 | SEVEN |
| SEVEN | SEVEN | SEVEN | SEVEN | SEVEN | 500 | SEVEN |
| 3BAR | 3BAR | 3BAR | (ANY) | (ANY) | 50 | 3BAR |
| 3BAR | 3BAR | 3BAR | 3BAR | (ANY) | 100 | 3BAR |
| 3BAR | 3BAR | 3BAR | 3BAR | 3BAR | 400 | 3BAR |
| 2BAR | 2BAR | 2BAR | (ANY) | (ANY) | 40 | 2BAR |
| 2BAR | 2BAR | 2BAR | 2BAR | (ANY) | 80 | 2BAR |
| 2BAR | 2BAR | 2BAR | 2BAR | 2BAR | 300 | 2BAR |
| 1BAR | 1BAR | 1BAR | (ANY) | (ANY) | 30 | 1BAR |
| 1BAR | 1BAR | 1BAR | 1BAR | (ANY) | 60 | 1BAR |
| 1BAR | 1BAR | 1BAR | 1BAR | 1BAR | 250 | 1BAR |
| 1BAR/2BAR/3BAR | 1BAR/2BAR/3BAR | 1BAR/2BAR/3BAR | (ANY) | (ANY) | 20 | MIXBAR |
| 1BAR/2BAR/3BAR | 1BAR/2BAR/3BAR | 1BAR/2BAR/3BAR | 1BAR/2BAR/3BAR | (ANY) | 50 | MIXBAR |
| 1BAR/2BAR/3BAR | 1BAR/2BAR/3BAR | 1BAR/2BAR/3BAR | 1BAR/2BAR/3BAR | 1BAR/2BAR/3BAR | 200 | MIXBAR |
| ONE CHERRY SYMBOL | | | | | 30 | CHERRY |
| TWO CHERRY SYMBOLS | | | | | 60 | CHERRY |
| THREE CHERRY SYMBOLS | | | | | 90 | CHERRY |
| FOUR CHERRY SYMBOLS | | | | | 150 | CHERRY |
| FIVE CHERRY SYMBOLS | | | | | 300 | CHERRY |
| THREE BONUS SYMBOLS | | | | | 10 | BONUS |
| FOUR BONUS SYMBOLS | | | | | 30 | BONUS |
| FIVE BONUS SYMBOLS | | | | | 150 | BONUS |

FIG. 20A

SYMBOL DETERMINATION TABLE FIRST SELECTION TABLE (FIRST EMBODIMENT)

| No. | TABLE | WEIGHT |
|---|---|---|
| 1 | FIRST SYMBOL DETERMINATION TABLE FOR FREE GAMES | 18 |
| 2 | SECOND SYMBOL DETERMINATION TABLE FOR FREE GAMES | 11 |
| 3 | THIRD SYMBOL DETERMINATION TABLE FOR FREE GAMES | 17 |
| 4 | FOURTH SYMBOL DETERMINATION TABLE FOR FREE GAMES | 17 |
| 5 | FIFTH SYMBOL DETERMINATION TABLE FOR FREE GAMES | 22 |
| 6 | SIXTH SYMBOL DETERMINATION TABLE FOR FREE GAMES | 15 |
| 7 | SEVENTH SYMBOL DETERMINATION TABLE FOR FREE GAMES | 0 |
| 8 | EIGHTH SYMBOL DETERMINATION TABLE FOR FREE GAMES | 0 |
| 9 | NINTH SYMBOL DETERMINATION TABLE FOR FREE GAMES | 0 |
| 10 | TENTH SYMBOL DETERMINATION TABLE FOR FREE GAMES | 0 |
| TOTAL | | 100 |

FIG. 20B

SYMBOL DETERMINATION TABLE SECOND SELECTION TABLE (FIRST EMBODIMENT)

| No. | TABLE | WEIGHT |
|---|---|---|
| 1 | FIRST SYMBOL DETERMINATION TABLE FOR FREE GAMES | 0 |
| 2 | SECOND SYMBOL DETERMINATION TABLE FOR FREE GAMES | 0 |
| 3 | THIRD SYMBOL DETERMINATION TABLE FOR FREE GAMES | 0 |
| 4 | FOURTH SYMBOL DETERMINATION TABLE FOR FREE GAMES | 0 |
| 5 | FIFTH SYMBOL DETERMINATION TABLE FOR FREE GAMES | 1 |
| 6 | SIXTH SYMBOL DETERMINATION TABLE FOR FREE GAMES | 13 |
| 7 | SEVENTH SYMBOL DETERMINATION TABLE FOR FREE GAMES | 10 |
| 8 | EIGHTH SYMBOL DETERMINATION TABLE FOR FREE GAMES | 22 |
| 9 | NINTH SYMBOL DETERMINATION TABLE FOR FREE GAMES | 22 |
| 10 | TENTH SYMBOL DETERMINATION TABLE FOR FREE GAMES | 32 |
| TOTAL | | 100 |

FIG. 21

FIRST SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 1 | BLANK | 1 | BLANK | 2 | BLANK | 2 |
| 02 | BONUS | 0 | SEVEN | 12 | BONUS | 1 | SEVEN | 2 | BONUS | 3 |
| 03 | BLANK | 22 | BLANK | 1 | BLANK | 1 | BLANK | 2 | BLANK | 1 |
| 04 | SEVEN | 2 | BONUS | 1 | 1BAR | 0 | BONUS | 2 | SEVEN | 2 |
| 05 | BLANK | 2 | BLANK | 1 | BLANK | 0 | BLANK | 2 | BLANK | 1 |
| 06 | 3BAR | 0 | 2BAR | 0 | 2BAR | 0 | 2BAR | 1 | 3BAR | 2 |
| 07 | BLANK | 0 | BLANK | 0 | BLANK | 8 | BLANK | 7 | BLANK | 6 |
| 08 | BONUS | 0 | BONUS | 0 | SEVEN | 3 | BONUS | 6 | BONUS | 6 |
| 09 | BLANK | 0 | BLANK | 0 | BLANK | 11 | BLANK | 7 | BLANK | 6 |
| 10 | 2BAR | 0 | 3BAR | 0 | 2BAR | 0 | 1BAR | 3 | 2BAR | 2 |
| 11 | BLANK | 0 | BLANK | 0 | BLANK | 0 | BLANK | 1 | BLANK | 2 |
| 12 | 1BAR | 0 | 1BAR | 0 | 1BAR | 0 | 3BAR | 1 | 1BAR | 2 |
| 13 | BLANK | 5 | BLANK | 4 | BLANK | 8 | BLANK | 1 | BLANK | 2 |
| 14 | SEVEN | 1 | SEVEN | 24 | SEVEN | 3 | SEVEN | 2 | SEVEN | 2 |
| 15 | BLANK | 5 | BLANK | 4 | BLANK | 11 | BLANK | 1 | BLANK | 2 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 37 | | 48 | | 47 | | 40 | | 41 |

FIG. 22

SECOND SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 0 | BLANK | 1 | BLANK | 1 | BLANK | 2 |
| 02 | BONUS | 0 | SEVEN | 1 | BONUS | 1 | SEVEN | 1 | BONUS | 2 |
| 03 | BLANK | 3 | BLANK | 1 | BLANK | 1 | BLANK | 2 | BLANK | 2 |
| 04 | SEVEN | 15 | BONUS | 1 | 1BAR | 0 | BONUS | 4 | SEVEN | 1 |
| 05 | BLANK | 2 | BLANK | 1 | BLANK | 0 | BLANK | 2 | BLANK | 3 |
| 06 | 3BAR | 0 | 2BAR | 0 | 2BAR | 0 | 2BAR | 1 | 3BAR | 2 |
| 07 | BLANK | 0 | BLANK | 0 | BLANK | 2 | BLANK | 2 | BLANK | 2 |
| 08 | BONUS | 0 | BONUS | 0 | SEVEN | 24 | BONUS | 2 | BONUS | 2 |
| 09 | BLANK | 0 | BLANK | 0 | BLANK | 2 | BLANK | 2 | BLANK | 2 |
| 10 | 2BAR | 0 | 3BAR | 0 | 2BAR | 0 | 1BAR | 1 | 2BAR | 4 |
| 11 | BLANK | 0 | BLANK | 0 | BLANK | 0 | BLANK | 1 | BLANK | 4 |
| 12 | 1BAR | 0 | 1BAR | 0 | 1BAR | 0 | 3BAR | 1 | 1BAR | 4 |
| 13 | BLANK | 1 | BLANK | 2 | BLANK | 1 | BLANK | 2 | BLANK | 4 |
| 14 | SEVEN | 12 | SEVEN | 23 | SEVEN | 12 | SEVEN | 2 | SEVEN | 1 |
| 15 | BLANK | 1 | BLANK | 2 | BLANK | 1 | BLANK | 2 | BLANK | 2 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 34 | | 31 | | 45 | | 26 | | 37 |

FIG. 23

THIRD SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 0 | BLANK | 1 | BLANK | 2 | BLANK | 2 |
| 02 | BONUS | 0 | SEVEN | 4 | BONUS | 1 | SEVEN | 2 | BONUS | 2 |
| 03 | BLANK | 0 | BLANK | 18 | BLANK | 1 | BLANK | 2 | BLANK | 2 |
| 04 | SEVEN | 2 | BONUS | 0 | 1BAR | 0 | BONUS | 3 | SEVEN | 2 |
| 05 | BLANK | 4 | BLANK | 0 | BLANK | 0 | BLANK | 1 | BLANK | 2 |
| 06 | 3BAR | 0 | 2BAR | 0 | 2BAR | 0 | 2BAR | 1 | 3BAR | 2 |
| 07 | BLANK | 1 | BLANK | 0 | BLANK | 0 | BLANK | 4 | BLANK | 4 |
| 08 | BONUS | 1 | BONUS | 0 | SEVEN | 6 | BONUS | 8 | BONUS | 7 |
| 09 | BLANK | 1 | BLANK | 0 | BLANK | 12 | BLANK | 4 | BLANK | 4 |
| 10 | 2BAR | 0 | 3BAR | 0 | 2BAR | 0 | 1BAR | 4 | 2BAR | 3 |
| 11 | BLANK | 0 | BLANK | 0 | BLANK | 0 | BLANK | 2 | BLANK | 2 |
| 12 | 1BAR | 0 | 1BAR | 0 | 1BAR | 0 | 3BAR | 2 | 1BAR | 3 |
| 13 | BLANK | 0 | BLANK | 0 | BLANK | 0 | BLANK | 2 | BLANK | 1 |
| 14 | SEVEN | 6 | SEVEN | 2 | SEVEN | 5 | SEVEN | 2 | SEVEN | 2 |
| 15 | BLANK | 29 | BLANK | 2 | BLANK | 13 | BLANK | 1 | BLANK | 2 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 44 | | 26 | | 39 | | 40 | | 40 |

FIG. 24

FOURTH SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 4 | BLANK | 1 | BLANK | 2 | BLANK | 2 |
| 02 | BONUS | 0 | SEVEN | 2 | BONUS | 1 | SEVEN | 2 | BONUS | 2 |
| 03 | BLANK | 18 | BLANK | 0 | BLANK | 1 | BLANK | 1 | BLANK | 2 |
| 04 | SEVEN | 4 | BONUS | 0 | 1BAR | 0 | BONUS | 3 | SEVEN | 2 |
| 05 | BLANK | 0 | BLANK | 0 | BLANK | 0 | BLANK | 2 | BLANK | 2 |
| 06 | 3BAR | 0 | 2BAR | 0 | 2BAR | 0 | 2BAR | 1 | 3BAR | 2 |
| 07 | BLANK | 0 | BLANK | 1 | BLANK | 12 | BLANK | 4 | BLANK | 4 |
| 08 | BONUS | 0 | BONUS | 1 | SEVEN | 6 | BONUS | 8 | BONUS | 7 |
| 09 | BLANK | 0 | BLANK | 1 | BLANK | 0 | BLANK | 4 | BLANK | 4 |
| 10 | 2BAR | 0 | 3BAR | 0 | 2BAR | 0 | 1BAR | 4 | 2BAR | 3 |
| 11 | BLANK | 0 | BLANK | 0 | BLANK | 0 | BLANK | 2 | BLANK | 2 |
| 12 | 1BAR | 0 | 1BAR | 0 | 1BAR | 0 | 3BAR | 2 | 1BAR | 3 |
| 13 | BLANK | 2 | BLANK | 29 | BLANK | 13 | BLANK | 1 | BLANK | 2 |
| 14 | SEVEN | 2 | SEVEN | 6 | SEVEN | 5 | SEVEN | 2 | SEVEN | 2 |
| 15 | BLANK | 0 | BLANK | 0 | BLANK | 0 | BLANK | 2 | BLANK | 1 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 26 | | 44 | | 39 | | 40 | | 40 |

FIG. 25

FIFTH SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 0 | BLANK | 4 | BLANK | 2 | BLANK | 2 |
| 02 | BONUS | 0 | SEVEN | 3 | BONUS | 5 | SEVEN | 2 | BONUS | 3 |
| 03 | BLANK | 18 | BLANK | 1 | BLANK | 4 | BLANK | 2 | BLANK | 1 |
| 04 | SEVEN | 3 | BONUS | 1 | 1BAR | 0 | BONUS | 2 | SEVEN | 2 |
| 05 | BLANK | 6 | BLANK | 1 | BLANK | 0 | BLANK | 2 | BLANK | 1 |
| 06 | 3BAR | 0 | 2BAR | 0 | 2BAR | 0 | 2BAR | 2 | 3BAR | 2 |
| 07 | BLANK | 1 | BLANK | 1 | BLANK | 3 | BLANK | 3 | BLANK | 5 |
| 08 | BONUS | 1 | BONUS | 1 | SEVEN | 1 | BONUS | 3 | BONUS | 6 |
| 09 | BLANK | 1 | BLANK | 1 | BLANK | 3 | BLANK | 3 | BLANK | 5 |
| 10 | 2BAR | 0 | 3BAR | 0 | 2BAR | 0 | 1BAR | 4 | 2BAR | 2 |
| 11 | BLANK | 0 | BLANK | 0 | BLANK | 0 | BLANK | 5 | BLANK | 2 |
| 12 | 1BAR | 0 | 1BAR | 0 | 1BAR | 0 | 3BAR | 4 | 1BAR | 2 |
| 13 | BLANK | 2 | BLANK | 1 | BLANK | 3 | BLANK | 2 | BLANK | 2 |
| 14 | SEVEN | 1 | SEVEN | 6 | SEVEN | 1 | SEVEN | 2 | SEVEN | 2 |
| 15 | BLANK | 2 | BLANK | 1 | BLANK | 2 | BLANK | 2 | BLANK | 2 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 35 | | 17 | | 26 | | 40 | | 39 |

FIG. 26

SIXTH SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 1 | BLANK | 0 | BLANK | 2 | BLANK | 2 |
| 02 | BONUS | 0 | SEVEN | 11 | BONUS | 0 | SEVEN | 1 | BONUS | 3 |
| 03 | BLANK | 12 | BLANK | 1 | BLANK | 0 | BLANK | 2 | BLANK | 1 |
| 04 | SEVEN | 2 | BONUS | 0 | 1BAR | 0 | BONUS | 2 | SEVEN | 2 |
| 05 | BLANK | 11 | BLANK | 0 | BLANK | 0 | BLANK | 2 | BLANK | 1 |
| 06 | 3BAR | 0 | 2BAR | 0 | 2BAR | 0 | 2BAR | 2 | 3BAR | 2 |
| 07 | BLANK | 0 | BLANK | 0 | BLANK | 17 | BLANK | 6 | BLANK | 6 |
| 08 | BONUS | 0 | BONUS | 0 | SEVEN | 3 | BONUS | 6 | BONUS | 6 |
| 09 | BLANK | 0 | BLANK | 0 | BLANK | 4 | BLANK | 6 | BLANK | 6 |
| 10 | 2BAR | 0 | 3BAR | 0 | 2BAR | 0 | 1BAR | 2 | 2BAR | 2 |
| 11 | BLANK | 0 | BLANK | 0 | BLANK | 0 | BLANK | 2 | BLANK | 2 |
| 12 | 1BAR | 0 | 1BAR | 0 | 1BAR | 0 | 3BAR | 2 | 1BAR | 2 |
| 13 | BLANK | 5 | BLANK | 1 | BLANK | 7 | BLANK | 2 | BLANK | 2 |
| 14 | SEVEN | 2 | SEVEN | 11 | SEVEN | 2 | SEVEN | 1 | SEVEN | 2 |
| 15 | BLANK | 13 | BLANK | 1 | BLANK | 4 | BLANK | 2 | BLANK | 2 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 45 | | 26 | | 37 | | 40 | | 41 |

FIG. 27

SEVENTH SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 0 | BLANK | 3 | BLANK | 2 | BLANK | 1 |
| 02 | BONUS | 0 | SEVEN | 2 | BONUS | 4 | SEVEN | 1 | BONUS | 1 |
| 03 | BLANK | 1 | BLANK | 2 | BLANK | 3 | BLANK | 2 | BLANK | 1 |
| 04 | SEVEN | 11 | BONUS | 2 | 1BAR | 0 | BONUS | 1 | SEVEN | 1 |
| 05 | BLANK | 1 | BLANK | 2 | BLANK | 0 | BLANK | 2 | BLANK | 2 |
| 06 | 3BAR | 0 | 2BAR | 0 | 2BAR | 0 | 2BAR | 2 | 3BAR | 2 |
| 07 | BLANK | 0 | BLANK | 0 | BLANK | 2 | BLANK | 2 | BLANK | 1 |
| 08 | BONUS | 0 | BONUS | 0 | SEVEN | 12 | BONUS | 2 | BONUS | 4 |
| 09 | BLANK | 0 | BLANK | 0 | BLANK | 2 | BLANK | 2 | BLANK | 1 |
| 10 | 2BAR | 0 | 3BAR | 0 | 2BAR | 0 | 1BAR | 4 | 2BAR | 7 |
| 11 | BLANK | 0 | BLANK | 0 | BLANK | 0 | BLANK | 1 | BLANK | 5 |
| 12 | 1BAR | 0 | 1BAR | 0 | 1BAR | 0 | 3BAR | 1 | 1BAR | 5 |
| 13 | BLANK | 2 | BLANK | 3 | BLANK | 2 | BLANK | 3 | BLANK | 1 |
| 14 | SEVEN | 12 | SEVEN | 16 | SEVEN | 13 | SEVEN | 2 | SEVEN | 1 |
| 15 | BLANK | 2 | BLANK | 3 | BLANK | 2 | BLANK | 3 | BLANK | 1 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 29 | | 30 | | 43 | | 30 | | 34 |

FIG. 28

EIGHTH SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 0 | BLANK | 1 | BLANK | 2 | BLANK | 1 |
| 02 | BONUS | 0 | SEVEN | 4 | BONUS | 1 | SEVEN | 2 | BONUS | 1 |
| 03 | BLANK | 0 | BLANK | 18 | BLANK | 1 | BLANK | 2 | BLANK | 1 |
| 04 | SEVEN | 2 | BONUS | 0 | 1BAR | 0 | BONUS | 2 | SEVEN | 2 |
| 05 | BLANK | 4 | BLANK | 0 | BLANK | 0 | BLANK | 2 | BLANK | 1 |
| 06 | 3BAR | 0 | 2BAR | 0 | 2BAR | 0 | 2BAR | 1 | 3BAR | 2 |
| 07 | BLANK | 0 | BLANK | 0 | BLANK | 0 | BLANK | 3 | BLANK | 0 |
| 08 | BONUS | 0 | BONUS | 0 | SEVEN | 8 | BONUS | 4 | BONUS | 0 |
| 09 | BLANK | 0 | BLANK | 0 | BLANK | 10 | BLANK | 3 | BLANK | 0 |
| 10 | 2BAR | 0 | 3BAR | 0 | 2BAR | 0 | 1BAR | 4 | 2BAR | 8 |
| 11 | BLANK | 0 | BLANK | 0 | BLANK | 0 | BLANK | 4 | BLANK | 9 |
| 12 | 1BAR | 0 | 1BAR | 0 | 1BAR | 0 | 3BAR | 5 | 1BAR | 9 |
| 13 | BLANK | 0 | BLANK | 0 | BLANK | 0 | BLANK | 2 | BLANK | 1 |
| 14 | SEVEN | 9 | SEVEN | 2 | SEVEN | 6 | SEVEN | 2 | SEVEN | 2 |
| 15 | BLANK | 26 | BLANK | 2 | BLANK | 10 | BLANK | 1 | BLANK | 3 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 41 | | 26 | | 37 | | 39 | | 40 |

FIG. 29

NINTH SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 4 | BLANK | 1 | BLANK | 2 | BLANK | 1 |
| 02 | BONUS | 0 | SEVEN | 2 | BONUS | 1 | SEVEN | 2 | BONUS | 1 |
| 03 | BLANK | 18 | BLANK | 0 | BLANK | 1 | BLANK | 2 | BLANK | 1 |
| 04 | SEVEN | 4 | BONUS | 0 | 1BAR | 0 | BONUS | 2 | SEVEN | 2 |
| 05 | BLANK | 0 | BLANK | 0 | BLANK | 0 | BLANK | 2 | BLANK | 2 |
| 06 | 3BAR | 0 | 2BAR | 0 | 2BAR | 0 | 2BAR | 1 | 3BAR | 1 |
| 07 | BLANK | 0 | BLANK | 0 | BLANK | 10 | BLANK | 3 | BLANK | 0 |
| 08 | BONUS | 0 | BONUS | 0 | SEVEN | 8 | BONUS | 4 | BONUS | 0 |
| 09 | BLANK | 0 | BLANK | 0 | BLANK | 0 | BLANK | 3 | BLANK | 0 |
| 10 | 2BAR | 0 | 3BAR | 0 | 2BAR | 0 | 1BAR | 4 | 2BAR | 8 |
| 11 | BLANK | 0 | BLANK | 0 | BLANK | 0 | BLANK | 4 | BLANK | 9 |
| 12 | 1BAR | 0 | 1BAR | 0 | 1BAR | 0 | 3BAR | 5 | 1BAR | 9 |
| 13 | BLANK | 2 | BLANK | 26 | BLANK | 10 | BLANK | 1 | BLANK | 3 |
| 14 | SEVEN | 2 | SEVEN | 9 | SEVEN | 6 | SEVEN | 2 | SEVEN | 2 |
| 15 | BLANK | 0 | BLANK | 0 | BLANK | 0 | BLANK | 2 | BLANK | 1 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 26 | | 41 | | 37 | | 39 | | 40 |

FIG. 30

TENTH SYMBOL DETERMINATION TABLE FOR FREE GAMES (FIRST EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 3BAR | 0 | 1BAR | 0 | 1BAR | 0 | 2BAR | 0 |
| 01 | BLANK | 0 | BLANK | 7 | BLANK | 0 | BLANK | 2 | BLANK | 1 |
| 02 | BONUS | 0 | SEVEN | 18 | BONUS | 0 | SEVEN | 2 | BONUS | 1 |
| 03 | BLANK | 20 | BLANK | 0 | BLANK | 0 | BLANK | 7 | BLANK | 1 |
| 04 | SEVEN | 2 | BONUS | 0 | 1BAR | 0 | BONUS | 7 | SEVEN | 1 |
| 05 | BLANK | 3 | BLANK | 0 | BLANK | 0 | BLANK | 7 | BLANK | 1 |
| 06 | 3BAR | 0 | 2BAR | 0 | 2BAR | 0 | 2BAR | 1 | 3BAR | 3 |
| 07 | BLANK | 0 | BLANK | 0 | BLANK | 14 | BLANK | 1 | BLANK | 0 |
| 08 | BONUS | 0 | BONUS | 0 | SEVEN | 5 | BONUS | 1 | BONUS | 0 |
| 09 | BLANK | 0 | BLANK | 0 | BLANK | 15 | BLANK | 2 | BLANK | 0 |
| 10 | 2BAR | 0 | 3BAR | 0 | 2BAR | 0 | 1BAR | 2 | 2BAR | 11 |
| 11 | BLANK | 0 | BLANK | 0 | BLANK | 0 | BLANK | 2 | BLANK | 11 |
| 12 | 1BAR | 0 | 1BAR | 0 | 1BAR | 0 | 3BAR | 2 | 1BAR | 11 |
| 13 | BLANK | 7 | BLANK | 24 | BLANK | 14 | BLANK | 2 | BLANK | 2 |
| 14 | SEVEN | 2 | SEVEN | 44 | SEVEN | 5 | SEVEN | 2 | SEVEN | 2 |
| 15 | BLANK | 10 | BLANK | 14 | BLANK | 15 | BLANK | 2 | BLANK | 2 |
| 16 | 1BAR | 0 | 1BAR | 0 | 3BAR | 0 | 3BAR | 0 | 1BAR | 0 |
| 17 | BLANK | 0 | BLANK | 0 | BLANK | 0 | BLANK | 0 | BLANK | 0 |
| 18 | CHERRY | 0 | CHERRY | 0 | CHERRY | 0 | CHERRY | 0 | CHERRY | 0 |
| 19 | BLANK | 0 | BLANK | 0 | BLANK | 0 | BLANK | 0 | BLANK | 0 |
| 20 | 1BAR | 0 | 1BAR | 0 | 3BAR | 0 | 3BAR | 0 | 1BAR | 0 |
| 21 | BLANK | 0 | BLANK | 0 | BLANK | 0 | BLANK | 0 | BLANK | 0 |
| TOTAL | | 44 | | 107 | | 68 | | 42 | | 47 |

FIG. 31

SYMBOL DETERMINATION TABLE FOR A BASIC GAME (SECONDT EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 1 | 2BAR | 4 | 3BAR | 1 | 2BAR | 4 | 1BAR | 4 |
| 01 | BLANK | 5 | BLANK | 1 | BLANK | 8 | BLANK | 12 | BLANK | 6 |
| 02 | SEVEN | 3 | SEVEN | 1 | SEVEN | 1 | SEVEN | 4 | SEVEN | 6 |
| 03 | BLANK | 1 | BLANK | 1 | BLANK | 1 | BLANK | 5 | BLANK | 7 |
| 04 | 3BAR | 2 | 2BAR | 5 | 3BAR | 1 | 2BAR | 7 | 3BAR | 1 |
| 05 | BLANK | 7 | BLANK | 1 | BLANK | 27 | BLANK | 1 | BLANK | 12 |
| 06 | 2BAR | 1 | 3BAR | 9 | 1BAR | 1 | 3BAR | 3 | 2BAR | 2 |
| 07 | BLANK | 4 | BLANK | 7 | BLANK | 1 | BLANK | 1 | BLANK | 5 |
| 08 | BELL | 3 | BELL | 9 | BELL | 1 | BELL | 3 | BELL | 1 |
| 09 | BLANK | 3 | BLANK | 3 | BLANK | 1 | BLANK | 1 | BLANK | 1 |
| 10 | 1BAR | 1 | 1BAR | 1 | 2BAR | 1 | 1BAR | 2 | 1BAR | 1 |
| 11 | BLANK | 5 | BLANK | 5 | BLANK | 5 | BLANK | 1 | BLANK | 1 |
| 12 | BELL | 9 | BELL | 5 | BELL | 5 | BELL | 3 | BELL | 4 |
| 13 | BLANK | 22 | BLANK | 11 | BLANK | 5 | BLANK | 25 | BLANK | 7 |
| 14 | SEVEN | 1 | SEVEN | 4 | 1BAR | 1 | SEVEN | 3 | SEVEN | 7 |
| 15 | BLANK | 1 | BLANK | 1 | BLANK | 1 | BLANK | 9 | BLANK | 6 |
| 16 | 3BAR | 1 | 1BAR | 7 | SEVEN | 1 | 1BAR | 4 | 3BAR | 2 |
| 17 | BLANK | 1 | BLANK | 1 | BLANK | 1 | BLANK | 1 | BLANK | 1 |
| 18 | COIN | 1 | COIN | 1 | 2BAR | 1 | COIN | 1 | COIN | 2 |
| 19 | BLANK | 1 | BLANK | 1 | BLANK | 1 | BLANK | 1 | BLANK | 1 |
| 20 | 2BAR | 2 | 3BAR | 8 | COIN | 1 | 3BAR | 10 | 2BAR | 3 |
| 21 | BLANK | 17 | BLANK | 2 | BLANK | 1 | BLANK | 1 | BLANK | 8 |
| TOTAL | | 92 | | 88 | | 67 | | 102 | | 88 |

FIG. 32

PAYOUT TABLE (SECOND EMBODIMENT)

| COMBINATION OF SYMBOLS | | | | | | WINNING COMBINATION |
|---|---|---|---|---|---|---|
| FIRST REEL | SECOND REEL | THIRD REEL | FOURTH REEL | FIFTH REEL | | |
| SEVEN | SEVEN | SEVEN | (ANY) | (ANY) | 500 | SEVEN |
| SEVEN | SEVEN | SEVEN | SEVEN | (ANY) | 750 | SEVEN |
| SEVEN | SEVEN | SEVEN | SEVEN | SEVEN | 1500 | SEVEN |
| 3BAR | 3BAR | 3BAR | (ANY) | (ANY) | 100 | 3BAR |
| 3BAR | 3BAR | 3BAR | 3BAR | (ANY) | 200 | 3BAR |
| 3BAR | 3BAR | 3BAR | 3BAR | 3BAR | 400 | 3BAR |
| 2BAR | 2BAR | 2BAR | (ANY) | (ANY) | 50 | 2BAR |
| 2BAR | 2BAR | 2BAR | 2BAR | (ANY) | 150 | 2BAR |
| 2BAR | 2BAR | 2BAR | 2BAR | 2BAR | 300 | 2BAR |
| 1BAR | 1BAR | 1BAR | (ANY) | (ANY) | 30 | 1BAR |
| 1BAR | 1BAR | 1BAR | 1BAR | (ANY) | 100 | 1BAR |
| 1BAR | 1BAR | 1BAR | 1BAR | 1BAR | 250 | 1BAR |
| 1BAR／2BAR／3BAR | 1BAR／2BAR／3BAR | 1BAR／2BAR／3BAR | (ANY) | (ANY) | 15 | MIXBAR |
| 1BAR／2BAR／3BAR | 1BAR／2BAR／3BAR | 1BAR／2BAR／3BAR | 1BAR／2BAR／3BAR | (ANY) | 50 | MIXBAR |
| 1BAR／2BAR／3BAR | 1BAR／2BAR／3BAR | 1BAR／2BAR／3BAR | 1BAR／2BAR／3BAR | 1BAR／2BAR／3BAR | 200 | MIXBAR |
| BELL | BELL | BELL | (ANY) | (ANY) | 20 | BELL |
| BELL | BELL | BELL | BELL | (ANY) | 50 | BELL |
| BELL | BELL | BELL | BELL | BELL | 100 | BELL |
| ONE COIN SYMBOL | | | | | 30 | COIN |
| TWO COIN SYMBOLS | | | | | 90 | COIN |
| THREE COIN SYMBOLS | | | | | 150 | COIN |
| FOUR COIN SYMBOLS | | | | | 300 | COIN |
| FIVE COIN SYMBOLS | | | | | 450 | COIN |

FIG. 36A

SYMBOL DETERMINATION TABLE FIRST SELECTION TABLE (SECOND EMBODIMENT)

| No. | TABLE | WEIGHT |
|---|---|---|
| 1 | FIRST SYMBOL DETERMINATION TABLE FOR FREE GAMES | 64 |
| 2 | SECOND SYMBOL DETERMINATION TABLE FOR FREE GAMES | 64 |
| 3 | THIRD SYMBOL DETERMINATION TABLE FOR FREE GAMES | 64 |
| 4 | FOURTH SYMBOL DETERMINATION TABLE FOR FREE GAMES | 1 |
| 5 | FIFTH SYMBOL DETERMINATION TABLE FOR FREE GAMES | 1 |
| 6 | SIXTH SYMBOL DETERMINATION TABLE FOR FREE GAMES | 0 |
| 7 | SEVENTH SYMBOL DETERMINATION TABLE FOR FREE GAMES | 0 |
| 8 | EIGHTH SYMBOL DETERMINATION TABLE FOR FREE GAMES | 46 |
| 9 | NINTH SYMBOL DETERMINATION TABLE FOR FREE GAMES | 0 |
| TOTAL | | 240 |

FIG. 36B

SYMBOL DETERMINATION TABLE SECOND SELECTION TABLE (SECOND EMBODIMENT)

| No. | TABLE | WEIGHT |
|---|---|---|
| 1 | FIRST SYMBOL DETERMINATION TABLE FOR FREE GAMES | 12 |
| 2 | SECOND SYMBOL DETERMINATION TABLE FOR FREE GAMES | 12 |
| 3 | THIRD SYMBOL DETERMINATION TABLE FOR FREE GAMES | 12 |
| 4 | FOURTH SYMBOL DETERMINATION TABLE FOR FREE GAMES | 3 |
| 5 | FIFTH SYMBOL DETERMINATION TABLE FOR FREE GAMES | 3 |
| 6 | SIXTH SYMBOL DETERMINATION TABLE FOR FREE GAMES | 0 |
| 7 | SEVENTH SYMBOL DETERMINATION TABLE FOR FREE GAMES | 12 |
| 8 | EIGHTH SYMBOL DETERMINATION TABLE FOR FREE GAMES | 10 |
| 9 | NINTH SYMBOL DETERMINATION TABLE FOR FREE GAMES | 0 |
| TOTAL | | 64 |

FIG. 37

FIRST SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 0 | 3BAR | 0 | 2BAR | 0 |
| 07 | BLANK | 0 | BLANK | 0 | BLANK | 1 | BLANK | 2 | BLANK | 2 |
| 08 | BELL | 1 | BELL | 1 | BELL | 10 | BELL | 2 | BELL | 2 |
| 09 | BLANK | 0 | BLANK | 0 | BLANK | 0 | BLANK | 2 | BLANK | 2 |
| 10 | 1BAR | 0 | 1BAR | 0 | 2BAR | 0 | 1BAR | 0 | 1BAR | 0 |
| 11 | BLANK | 0 | BLANK | 0 | BLANK | 1 | BLANK | 0 | BLANK | 0 |
| 12 | BELL | 1 | BELL | 1 | BELL | 7 | BELL | 0 | BELL | 0 |
| 13 | BLANK | 0 | BLANK | 0 | BLANK | 0 | BLANK | 0 | BLANK | 0 |
| 14 | SEVEN | 0 | SEVEN | 0 | 1BAR | 0 | SEVEN | 0 | SEVEN | 0 |
| 15 | BLANK | 0 | BLANK | 0 | BLANK | 0 | BLANK | 0 | BLANK | 0 |
| 16 | 3BAR | 0 | 1BAR | 0 | SEVEN | 0 | 1BAR | 0 | 3BAR | 0 |
| 17 | BLANK | 0 | BLANK | 0 | BLANK | 0 | BLANK | 0 | BLANK | 0 |
| 18 | COIN | 0 | COIN | 0 | 2BAR | 0 | COIN | 0 | COIN | 0 |
| 19 | BLANK | 0 | BLANK | 0 | BLANK | 0 | BLANK | 0 | BLANK | 0 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 2 | | 2 | | 19 | | 6 | | 6 |

FIG. 38

SECOND SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 0 | 3BAR | 0 | 2BAR | 0 |
| 07 | BLANK | 0 | BLANK | 0 | BLANK | 15 | BLANK | 2 | BLANK | 0 |
| 08 | BELL | 0 | BELL | 1 | BELL | 1 | BELL | 2 | BELL | 4 |
| 09 | BLANK | 1 | BLANK | 0 | BLANK | 0 | BLANK | 2 | BLANK | 2 |
| 10 | 1BAR | 0 | 1BAR | 0 | 2BAR | 0 | 1BAR | 0 | 1BAR | 0 |
| 11 | BLANK | 0 | BLANK | 0 | BLANK | 2 | BLANK | 0 | BLANK | 0 |
| 12 | BELL | 0 | BELL | 1 | BELL | 1 | BELL | 0 | BELL | 0 |
| 13 | BLANK | 0 | BLANK | 0 | BLANK | 0 | BLANK | 0 | BLANK | 0 |
| 14 | SEVEN | 0 | SEVEN | 0 | 1BAR | 0 | SEVEN | 0 | SEVEN | 0 |
| 15 | BLANK | 0 | BLANK | 0 | BLANK | 0 | BLANK | 0 | BLANK | 0 |
| 16 | 3BAR | 0 | 1BAR | 0 | SEVEN | 0 | 1BAR | 0 | 3BAR | 0 |
| 17 | BLANK | 0 | BLANK | 0 | BLANK | 0 | BLANK | 0 | BLANK | 0 |
| 18 | COIN | 0 | COIN | 0 | 2BAR | 0 | COIN | 0 | COIN | 0 |
| 19 | BLANK | 0 | BLANK | 0 | BLANK | 0 | BLANK | 0 | BLANK | 0 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 1 | | 2 | | 19 | | 6 | | 6 |

FIG. 39

THIRD SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 0 | 3BAR | 0 | 2BAR | 0 |
| 07 | BLANK | 1 | BLANK | 0 | BLANK | 0 | BLANK | 2 | BLANK | 2 |
| 08 | BELL | 0 | BELL | 1 | BELL | 1 | BELL | 2 | BELL | 3 |
| 09 | BLANK | 0 | BLANK | 0 | BLANK | 7 | BLANK | 2 | BLANK | 1 |
| 10 | 1BAR | 0 | 1BAR | 0 | 2BAR | 0 | 1BAR | 0 | 1BAR | 0 |
| 11 | BLANK | 0 | BLANK | 0 | BLANK | 0 | BLANK | 0 | BLANK | 0 |
| 12 | BELL | 0 | BELL | 1 | BELL | 1 | BELL | 0 | BELL | 0 |
| 13 | BLANK | 0 | BLANK | 0 | BLANK | 10 | BLANK | 0 | BLANK | 0 |
| 14 | SEVEN | 0 | SEVEN | 0 | 1BAR | 0 | SEVEN | 0 | SEVEN | 0 |
| 15 | BLANK | 0 | BLANK | 0 | BLANK | 0 | BLANK | 0 | BLANK | 0 |
| 16 | 3BAR | 0 | 1BAR | 0 | SEVEN | 0 | 1BAR | 0 | 3BAR | 0 |
| 17 | BLANK | 0 | BLANK | 0 | BLANK | 0 | BLANK | 0 | BLANK | 0 |
| 18 | COIN | 0 | COIN | 0 | 2BAR | 0 | COIN | 0 | COIN | 0 |
| 19 | BLANK | 0 | BLANK | 0 | BLANK | 0 | BLANK | 0 | BLANK | 0 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 1 | | 2 | | 19 | | 6 | | 6 |

FIG. 40

FOURTH SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 0 | 3BAR | 0 | 2BAR | 0 |
| 07 | BLANK | 0 | BLANK | 0 | BLANK | 0 | BLANK | 0 | BLANK | 0 |
| 08 | BELL | 0 | BELL | 0 | BELL | 0 | BELL | 0 | BELL | 0 |
| 09 | BLANK | 0 | BLANK | 0 | BLANK | 0 | BLANK | 0 | BLANK | 0 |
| 10 | 1BAR | 0 | 1BAR | 0 | 2BAR | 0 | 1BAR | 0 | 1BAR | 0 |
| 11 | BLANK | 0 | BLANK | 0 | BLANK | 0 | BLANK | 0 | BLANK | 0 |
| 12 | BELL | 0 | BELL | 0 | BELL | 0 | BELL | 0 | BELL | 0 |
| 13 | BLANK | 1 | BLANK | 0 | BLANK | 0 | BLANK | 2 | BLANK | 1 |
| 14 | SEVEN | 1 | SEVEN | 1 | 1BAR | 0 | SEVEN | 1 | SEVEN | 1 |
| 15 | BLANK | 0 | BLANK | 0 | BLANK | 1 | BLANK | 2 | BLANK | 3 |
| 16 | 3BAR | 0 | 1BAR | 0 | SEVEN | 2 | 1BAR | 0 | 3BAR | 0 |
| 17 | BLANK | 0 | BLANK | 0 | BLANK | 2 | BLANK | 0 | BLANK | 0 |
| 18 | COIN | 0 | COIN | 0 | 2BAR | 0 | COIN | 0 | COIN | 0 |
| 19 | BLANK | 0 | BLANK | 0 | BLANK | 0 | BLANK | 0 | BLANK | 0 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 2 | | 1 | | 5 | | 5 | | 5 |

FIG. 41

FIFTH SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 0 | 3BAR | 0 | 2BAR | 0 |
| 07 | BLANK | 0 | BLANK | 0 | BLANK | 0 | BLANK | 0 | BLANK | 0 |
| 08 | BELL | 0 | BELL | 0 | BELL | 0 | BELL | 0 | BELL | 0 |
| 09 | BLANK | 0 | BLANK | 0 | BLANK | 0 | BLANK | 0 | BLANK | 0 |
| 10 | 1BAR | 0 | 1BAR | 0 | 2BAR | 0 | 1BAR | 0 | 1BAR | 0 |
| 11 | BLANK | 0 | BLANK | 0 | BLANK | 0 | BLANK | 0 | BLANK | 0 |
| 12 | BELL | 0 | BELL | 0 | BELL | 0 | BELL | 0 | BELL | 0 |
| 13 | BLANK | 0 | BLANK | 0 | BLANK | 0 | BLANK | 2 | BLANK | 3 |
| 14 | SEVEN | 1 | SEVEN | 1 | 1BAR | 0 | SEVEN | 1 | SEVEN | 1 |
| 15 | BLANK | 1 | BLANK | 0 | BLANK | 2 | BLANK | 2 | BLANK | 1 |
| 16 | 3BAR | 0 | 1BAR | 0 | SEVEN | 2 | 1BAR | 0 | 3BAR | 0 |
| 17 | BLANK | 0 | BLANK | 0 | BLANK | 1 | BLANK | 0 | BLANK | 0 |
| 18 | COIN | 0 | COIN | 0 | 2BAR | 0 | COIN | 0 | COIN | 0 |
| 19 | BLANK | 0 | BLANK | 0 | BLANK | 0 | BLANK | 0 | BLANK | 0 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 2 | | 1 | | 5 | | 5 | | 5 |

FIG. 42

SIXTH SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 0 | 3BAR | 0 | 2BAR | 0 |
| 07 | BLANK | 0 | BLANK | 0 | BLANK | 0 | BLANK | 0 | BLANK | 0 |
| 08 | BELL | 0 | BELL | 0 | BELL | 0 | BELL | 0 | BELL | 0 |
| 09 | BLANK | 0 | BLANK | 0 | BLANK | 0 | BLANK | 0 | BLANK | 0 |
| 10 | 1BAR | 0 | 1BAR | 0 | 2BAR | 0 | 1BAR | 0 | 1BAR | 0 |
| 11 | BLANK | 0 | BLANK | 0 | BLANK | 0 | BLANK | 0 | BLANK | 0 |
| 12 | BELL | 0 | BELL | 0 | BELL | 0 | BELL | 0 | BELL | 0 |
| 13 | BLANK | 1 | BLANK | 0 | BLANK | 0 | BLANK | 1 | BLANK | 5 |
| 14 | SEVEN | 1 | SEVEN | 1 | 1BAR | 1 | SEVEN | 1 | SEVEN | 5 |
| 15 | BLANK | 1 | BLANK | 0 | BLANK | 0 | BLANK | 1 | BLANK | 5 |
| 16 | 3BAR | 0 | 1BAR | 0 | SEVEN | 0 | 1BAR | 0 | 3BAR | 0 |
| 17 | BLANK | 0 | BLANK | 0 | BLANK | 0 | BLANK | 2 | BLANK | 1 |
| 18 | COIN | 0 | COIN | 0 | 2BAR | 1 | COIN | 2 | COIN | 1 |
| 19 | BLANK | 0 | BLANK | 0 | BLANK | 0 | BLANK | 2 | BLANK | 1 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 3 | | 1 | | 2 | | 9 | | 18 |

FIG. 43

SEVENTH SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 1 | 3BAR | 0 | 2BAR | 0 |
| 07 | BLANK | 2 | BLANK | 0 | BLANK | 0 | BLANK | 0 | BLANK | 0 |
| 08 | BELL | 1 | BELL | 1 | BELL | 0 | BELL | 0 | BELL | 0 |
| 09 | BLANK | 2 | BLANK | 0 | BLANK | 0 | BLANK | 0 | BLANK | 0 |
| 10 | 1BAR | 0 | 1BAR | 0 | 2BAR | 1 | 1BAR | 0 | 1BAR | 0 |
| 11 | BLANK | 0 | BLANK | 0 | BLANK | 0 | BLANK | 1 | BLANK | 5 |
| 12 | BELL | 1 | BELL | 1 | BELL | 0 | BELL | 1 | BELL | 5 |
| 13 | BLANK | 0 | BLANK | 0 | BLANK | 0 | BLANK | 1 | BLANK | 5 |
| 14 | SEVEN | 0 | SEVEN | 0 | 1BAR | 1 | SEVEN | 0 | SEVEN | 0 |
| 15 | BLANK | 0 | BLANK | 0 | BLANK | 0 | BLANK | 0 | BLANK | 0 |
| 16 | 3BAR | 0 | 1BAR | 0 | SEVEN | 0 | 1BAR | 0 | 3BAR | 0 |
| 17 | BLANK | 0 | BLANK | 0 | BLANK | 0 | BLANK | 5 | BLANK | 1 |
| 18 | COIN | 0 | COIN | 0 | 2BAR | 0 | COIN | 5 | COIN | 1 |
| 19 | BLANK | 0 | BLANK | 0 | BLANK | 0 | BLANK | 5 | BLANK | 1 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 6 | | 2 | | 3 | | 18 | | 18 |

FIG. 44

EIGHTH SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 0 | 3BAR | 0 | 2BAR | 0 |
| 07 | BLANK | 0 | BLANK | 0 | BLANK | 0 | BLANK | 0 | BLANK | 0 |
| 08 | BELL | 0 | BELL | 0 | BELL | 0 | BELL | 0 | BELL | 0 |
| 09 | BLANK | 0 | BLANK | 0 | BLANK | 0 | BLANK | 0 | BLANK | 0 |
| 10 | 1BAR | 0 | 1BAR | 0 | 2BAR | 0 | 1BAR | 0 | 1BAR | 0 |
| 11 | BLANK | 0 | BLANK | 0 | BLANK | 0 | BLANK | 0 | BLANK | 0 |
| 12 | BELL | 0 | BELL | 0 | BELL | 0 | BELL | 0 | BELL | 0 |
| 13 | BLANK | 1 | BLANK | 0 | BLANK | 0 | BLANK | 1 | BLANK | 1 |
| 14 | SEVEN | 1 | SEVEN | 1 | 1BAR | 1 | SEVEN | 1 | SEVEN | 1 |
| 15 | BLANK | 1 | BLANK | 0 | BLANK | 0 | BLANK | 1 | BLANK | 1 |
| 16 | 3BAR | 0 | 1BAR | 0 | SEVEN | 0 | 1BAR | 0 | 3BAR | 0 |
| 17 | BLANK | 0 | BLANK | 0 | BLANK | 0 | BLANK | 0 | BLANK | 0 |
| 18 | COIN | 0 | COIN | 0 | 2BAR | 1 | COIN | 0 | COIN | 0 |
| 19 | BLANK | 0 | BLANK | 0 | BLANK | 0 | BLANK | 0 | BLANK | 0 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 3 | | 1 | | 2 | | 3 | | 3 |

FIG. 45

NINTH SYMBOL DETERMINATION TABLE FOR FREE GAMES (SECOND EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 1BAR | 0 | 2BAR | 0 | 3BAR | 0 | 2BAR | 0 | 1BAR | 0 |
| 01 | BLANK | 0 | BLANK | 0 | BLANK | 0 | BLANK | 0 | BLANK | 0 |
| 02 | SEVEN | 0 | SEVEN | 0 | SEVEN | 0 | SEVEN | 0 | SEVEN | 0 |
| 03 | BLANK | 0 | BLANK | 0 | BLANK | 0 | BLANK | 0 | BLANK | 0 |
| 04 | 3BAR | 0 | 2BAR | 0 | 3BAR | 0 | 2BAR | 0 | 3BAR | 0 |
| 05 | BLANK | 0 | BLANK | 0 | BLANK | 0 | BLANK | 0 | BLANK | 0 |
| 06 | 2BAR | 0 | 3BAR | 0 | 1BAR | 1 | 3BAR | 0 | 2BAR | 0 |
| 07 | BLANK | 2 | BLANK | 0 | BLANK | 0 | BLANK | 3 | BLANK | 3 |
| 08 | BELL | 1 | BELL | 1 | BELL | 0 | BELL | 3 | BELL | 3 |
| 09 | BLANK | 2 | BLANK | 0 | BLANK | 0 | BLANK | 3 | BLANK | 3 |
| 10 | 1BAR | 0 | 1BAR | 0 | 2BAR | 1 | 1BAR | 0 | 1BAR | 0 |
| 11 | BLANK | 0 | BLANK | 0 | BLANK | 0 | BLANK | 3 | BLANK | 3 |
| 12 | BELL | 1 | BELL | 1 | BELL | 0 | BELL | 3 | BELL | 3 |
| 13 | BLANK | 0 | BLANK | 0 | BLANK | 0 | BLANK | 3 | BLANK | 3 |
| 14 | SEVEN | 0 | SEVEN | 0 | 1BAR | 1 | SEVEN | 0 | SEVEN | 0 |
| 15 | BLANK | 0 | BLANK | 0 | BLANK | 0 | BLANK | 0 | BLANK | 0 |
| 16 | 3BAR | 0 | 1BAR | 0 | SEVEN | 0 | 1BAR | 0 | 3BAR | 0 |
| 17 | BLANK | 0 | BLANK | 0 | BLANK | 0 | BLANK | 0 | BLANK | 0 |
| 18 | COIN | 0 | COIN | 0 | 2BAR | 0 | COIN | 0 | COIN | 0 |
| 19 | BLANK | 0 | BLANK | 0 | BLANK | 0 | BLANK | 0 | BLANK | 0 |
| 20 | 2BAR | 0 | 3BAR | 0 | COIN | 0 | 3BAR | 0 | 2BAR | 0 |
| 21 | BLANK | 0 | BLANK | 0 | BLANK | 0 | BLANK | 0 | BLANK | 0 |
| TOTAL | | 6 | | 2 | | 3 | | 18 | | 18 |

FIG. 46

SYMBOL DETERMINATION TABLE FOR A BASIC GAME (THIRD EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 10 | 1BAR | 19 | 2BAR | 18 | 1BAR | 20 | 2BAR | 6 |
| 01 | BLANK | 41 | BLANK | 10 | BLANK | 58 | BLANK | 10 | BLANK | 26 |
| 02 | 1BAR | 15 | 2BAR | 19 | 1BAR | 16 | 2BAR | 21 | 1BAR | 6 |
| 03 | BLANK | 5 | BLANK | 5 | BLANK | 3 | BLANK | 10 | BLANK | 5 |
| 04 | SEVEN | 15 | SEVEN | 13 | SEVEN | 3 | SEVEN | 5 | SEVEN | 11 |
| 05 | BLANK | 5 | BLANK | 5 | BLANK | 3 | BLANK | 10 | BLANK | 5 |
| 06 | 1BAR | 10 | 2BAR | 16 | 1BAR | 14 | 2BAR | 12 | 1BAR | 15 |
| 07 | BLANK | 10 | BLANK | 15 | BLANK | 6 | BLANK | 17 | BLANK | 5 |
| 08 | SEVEN | 25 | SEVEN | 21 | SEVEN | 25 | SEVEN | 9 | SEVEN | 35 |
| 09 | BLANK | 10 | BLANK | 15 | BLANK | 5 | BLANK | 10 | BLANK | 5 |
| 10 | 3BAR | 10 | 3BAR | 17 | 3BAR | 12 | 3BAR | 10 | 3BAR | 9 |
| 11 | BLANK | 2 | BLANK | 2 | BLANK | 2 | BLANK | 2 | BLANK | 2 |
| 12 | CHERRY | 2 | CHERRY | 2 | CHERRY | 2 | CHERRY | 2 | CHERRY | 2 |
| 13 | BLANK | 2 | BLANK | 2 | BLANK | 2 | BLANK | 2 | BLANK | 2 |
| 14 | 2BAR | 5 | 1BAR | 8 | 2BAR | 16 | 1BAR | 17 | 2BAR | 6 |
| 15 | BLANK | 18 | BLANK | 5 | BLANK | 2 | BLANK | 6 | BLANK | 22 |
| 16 | 3BAR | 8 | 3BAR | 12 | SEVEN | 2 | 3BAR | 17 | 3BAR | 5 |
| 17 | BLANK | 18 | BLANK | 8 | BLANK | 2 | BLANK | 6 | BLANK | 22 |
| 18 | 2BAR | 8 | 1BAR | 20 | 2BAR | 21 | 1BAR | 22 | 2BAR | 5 |
| 19 | BLANK | 8 | BLANK | 8 | BLANK | 5 | BLANK | 10 | BLANK | 3 |
| 20 | SEVEN | 8 | SEVEN | 6 | SEVEN | 5 | SEVEN | 14 | SEVEN | 12 |
| 21 | BLANK | 8 | BLANK | 8 | BLANK | 5 | BLANK | 9 | BLANK | 3 |
| TOTAL | | 243 | | 236 | | 227 | | 241 | | 212 |

FIG. 47

PAYOUT TABLE (THIRD EMBODIMENT)

| COMBINATION OF SYMBOLS | | | | | | WINNING COMBINATION |
|---|---|---|---|---|---|---|
| FIRST REEL | SECOND REEL | THIRD REEL | FOURTH REEL | FIFTH REEL | | |
| SEVEN | SEVEN | SEVEN | (ANY) | (ANY) | 200 | SEVEN |
| SEVEN | SEVEN | SEVEN | SEVEN | (ANY) | 500 | SEVEN |
| SEVEN | SEVEN | SEVEN | SEVEN | SEVEN | 1000 | SEVEN |
| 3BAR | 3BAR | 3BAR | (ANY) | (ANY) | 100 | 3BAR |
| 3BAR | 3BAR | 3BAR | 3BAR | (ANY) | 200 | 3BAR |
| 3BAR | 3BAR | 3BAR | 3BAR | 3BAR | 400 | 3BAR |
| 2BAR | 2BAR | 2BAR | (ANY) | (ANY) | 50 | 2BAR |
| 2BAR | 2BAR | 2BAR | 2BAR | (ANY) | 150 | 2BAR |
| 2BAR | 2BAR | 2BAR | 2BAR | 2BAR | 300 | 2BAR |
| 1BAR | 1BAR | 1BAR | (ANY) | (ANY) | 30 | 1BAR |
| 1BAR | 1BAR | 1BAR | 1BAR | (ANY) | 100 | 1BAR |
| 1BAR | 1BAR | 1BAR | 1BAR | 1BAR | 250 | 1BAR |
| 1BAR/2BAR/3BAR | 1BAR/2BAR/3BAR | 1BAR/2BAR/3BAR | (ANY) | (ANY) | 15 | MIXBAR |
| 1BAR/2BAR/3BAR | 1BAR/2BAR/3BAR | 1BAR/2BAR/3BAR | 1BAR/2BAR/3BAR | (ANY) | 50 | MIXBAR |
| 1BAR/2BAR/3BAR | 1BAR/2BAR/3BAR | 1BAR/2BAR/3BAR | 1BAR/2BAR/3BAR | 1BAR/2BAR/3BAR | 250 | MIXBAR |
| ONE CHERRY SYMBOL | | | | | 30 | CHERRY |
| TWO CHERRY SYMBOLS | | | | | 90 | CHERRY |
| THREE CHERRY SYMBOLS | | | | | 150 | CHERRY |
| FOUR CHERRY SYMBOLS | | | | | 300 | CHERRY |
| FIVE CHERRY SYMBOLS | | | | | 450 | CHERRY |

FIG. 51

SYMBOL DETERMINATION TABLE SELECTION TABLE (THIRD EMBODIMENT)

| No. | TABLE | WEIGHT |
|---|---|---|
| 1 | FIRST SYMBOL DETERMINATION TABLE FOR FREE GAMES | 1 |
| 2 | SECOND SYMBOL DETERMINATION TABLE FOR FREE GAMES | 1 |
| TOTAL | | 2 |

FIG. 52

FIRST SYMBOL DETERMINATION TABLE FOR FREE GAMES (THIRD EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 1BAR | 0 | 2BAR | 0 | 1BAR | 0 | 2BAR | 5 |
| 01 | BLANK | 0 | BLANK | 0 | BLANK | 0 | BLANK | 0 | BLANK | 5 |
| 02 | 1BAR | 0 | 2BAR | 0 | 1BAR | 0 | 2BAR | 0 | 1BAR | 5 |
| 03 | BLANK | 0 | BLANK | 0 | BLANK | 0 | BLANK | 0 | BLANK | 5 |
| 04 | SEVEN | 0 | SEVEN | 0 | SEVEN | 0 | SEVEN | 0 | SEVEN | 5 |
| 05 | BLANK | 0 | BLANK | 0 | BLANK | 0 | BLANK | 0 | BLANK | 5 |
| 06 | 1BAR | 0 | 2BAR | 0 | 1BAR | 0 | 2BAR | 2 | 1BAR | 5 |
| 07 | BLANK | 1 | BLANK | 0 | BLANK | 0 | BLANK | 3 | BLANK | 1 |
| 08 | SEVEN | 1 | SEVEN | 1 | SEVEN | 2 | SEVEN | 2 | SEVEN | 1 |
| 09 | BLANK | 0 | BLANK | 0 | BLANK | 2 | BLANK | 3 | BLANK | 1 |
| 10 | 3BAR | 0 | 3BAR | 0 | 3BAR | 0 | 3BAR | 2 | 3BAR | 5 |
| 11 | BLANK | 0 | BLANK | 0 | BLANK | 0 | BLANK | 0 | BLANK | 0 |
| 12 | CHERRY | 0 | CHERRY | 0 | CHERRY | 0 | CHERRY | 0 | CHERRY | 0 |
| 13 | BLANK | 0 | BLANK | 0 | BLANK | 0 | BLANK | 0 | BLANK | 0 |
| 14 | 2BAR | 0 | 1BAR | 0 | 2BAR | 0 | 1BAR | 0 | 2BAR | 5 |
| 15 | BLANK | 0 | BLANK | 0 | BLANK | 0 | BLANK | 0 | BLANK | 5 |
| 16 | 3BAR | 0 | 3BAR | 0 | SEVEN | 0 | 3BAR | 0 | 3BAR | 5 |
| 17 | BLANK | 0 | BLANK | 0 | BLANK | 0 | BLANK | 0 | BLANK | 5 |
| 18 | 2BAR | 0 | 1BAR | 0 | 2BAR | 0 | 1BAR | 0 | 2BAR | 5 |
| 19 | BLANK | 0 | BLANK | 0 | BLANK | 0 | BLANK | 0 | BLANK | 5 |
| 20 | SEVEN | 0 | SEVEN | 0 | SEVEN | 0 | SEVEN | 0 | SEVEN | 5 |
| 21 | BLANK | 0 | BLANK | 0 | BLANK | 0 | BLANK | 0 | BLANK | 5 |
| TOTAL | | 2 | | 1 | | 4 | | 12 | | 83 |

FIG. 53

SECOND SYMBOL DETERMINATION TABLE FOR FREE GAMES (THIRD EMBODIMENT)

| | FIRST REEL | | SECOND REEL | | THIRD REEL | | FOURTH REEL | | FIFTH REEL | |
|---|---|---|---|---|---|---|---|---|---|---|
| CODE NO. | SYMBOL | WEIGHT | SYMBOL | WEIGHT | SYMBOL | WEIGHT | SYMBOL | WEIGHT | SYMBOL | WEIGHT |
| 00 | 2BAR | 0 | 1BAR | 0 | 2BAR | 0 | 1BAR | 0 | 2BAR | 5 |
| 01 | BLANK | 0 | BLANK | 0 | BLANK | 0 | BLANK | 0 | BLANK | 5 |
| 02 | 1BAR | 0 | 2BAR | 0 | 1BAR | 0 | 2BAR | 0 | 1BAR | 5 |
| 03 | BLANK | 0 | BLANK | 0 | BLANK | 0 | BLANK | 0 | BLANK | 5 |
| 04 | SEVEN | 0 | SEVEN | 0 | SEVEN | 0 | SEVEN | 0 | SEVEN | 5 |
| 05 | BLANK | 0 | BLANK | 0 | BLANK | 0 | BLANK | 0 | BLANK | 5 |
| 06 | 1BAR | 0 | 2BAR | 0 | 1BAR | 0 | 2BAR | 2 | 1BAR | 5 |
| 07 | BLANK | 0 | BLANK | 0 | BLANK | 2 | BLANK | 3 | BLANK | 1 |
| 08 | SEVEN | 1 | SEVEN | 1 | SEVEN | 2 | SEVEN | 2 | SEVEN | 1 |
| 09 | BLANK | 1 | BLANK | 0 | BLANK | 0 | BLANK | 3 | BLANK | 1 |
| 10 | 3BAR | 0 | 3BAR | 0 | 3BAR | 0 | 3BAR | 2 | 3BAR | 5 |
| 11 | BLANK | 0 | BLANK | 0 | BLANK | 0 | BLANK | 0 | BLANK | 0 |
| 12 | CHERRY | 0 | CHERRY | 0 | CHERRY | 0 | CHERRY | 0 | CHERRY | 0 |
| 13 | BLANK | 0 | BLANK | 0 | BLANK | 0 | BLANK | 0 | BLANK | 0 |
| 14 | 2BAR | 0 | 1BAR | 0 | 2BAR | 0 | 1BAR | 0 | 2BAR | 5 |
| 15 | BLANK | 0 | BLANK | 0 | BLANK | 0 | BLANK | 0 | BLANK | 5 |
| 16 | 3BAR | 0 | 3BAR | 0 | SEVEN | 0 | 3BAR | 0 | 3BAR | 5 |
| 17 | BLANK | 0 | BLANK | 0 | BLANK | 0 | BLANK | 0 | BLANK | 5 |
| 18 | 2BAR | 0 | 1BAR | 0 | 2BAR | 0 | 1BAR | 0 | 2BAR | 5 |
| 19 | BLANK | 0 | BLANK | 0 | BLANK | 0 | BLANK | 0 | BLANK | 5 |
| 20 | SEVEN | 0 | SEVEN | 0 | SEVEN | 0 | SEVEN | 0 | SEVEN | 5 |
| 21 | BLANK | 0 | BLANK | 0 | BLANK | 0 | BLANK | 0 | BLANK | 5 |
| TOTAL | | 2 | | 1 | | 4 | | 12 | | 83 |

GAMING MACHINE

CROSS REFERENCE TO RELATED APPLICATIONS

This application is based on and claims a priority from the prior Japanese Patent Application No. 2013-194981 filed on Sep. 20, 2013, the entire contents of which are incorporated herein by reference.

BACKGROUND OF THE INVENTION

1. Field of the Invention

The present invention relates to a gaming machine.

2. Background of the Related Art

Conventionally, there has been known a gaming machine in which when subsequent to the insertion of gaming media such as coins, a player presses a spin button, symbols to be displayed for the player upon stopping a plurality of reels are determined by lottery processing; scrolling of symbol arrays of the reels is started; the scrolling is stopped so as to display the determined symbols for the player and to rearrange the symbols; it is determined whether or not a combination of the displayed symbols is associated with a prize; and in a case where the combination of the displayed symbols is associated with the prize, a bonus according to a kind of the winning combination of the symbols is awarded to the player.

In such a gaming machine, upon winning a BB related to the activation of a bonus, a number of gaming media which can be paid out in a bonus game is determined and set (for example, refer to Japanese Unexamined Patent Application Publication No. 2007-20954). On this gaming machine, a player can play the bonus game until the set number of gaming media has been reached.

However, in such a gaming machine, after winning the BB related to the activation of the bonus, the game is merely played until the medals whose allowable number is determined have been paid out. Therefore, the player merely consumes the predetermined allowable number of medals and thus, game patterns are likely to be monotonous in the bonus game.

SUMMARY OF THE INVENTION

Accordingly, an object of the present invention is to provide a gaming machine capable of realizing game patterns differing from one another in a bonus game by changing probabilities, with each of which predetermined symbols are rearranged on a particular condition.

A first aspect of the present invention is directed to a gaming machine in which a payout is determined based on rearranged symbols includes:

a plurality of symbol display devices (for example, five reels 52A, 52B, 52C, 52D, and 52E displayed in a display window 56 of a symbol display unit 40);

a memory (for example, a ROM 224) for storing a first symbol determination table (for example, one of the first to sixth symbol determination tables in the first embodiment) in which probabilities, with each of which predetermined symbols (for example, BONUS symbols) are rearranged in the display regions (for example, the display window 56) of the display (for example, the symbol display unit 40) on a particular condition (for example, a condition that three or more BONUS symbols are rearranged) in free games, are set so as to exceed a predetermined probability and a second symbol determination table (for example, one of the fifth to tenth symbol determination tables in the first embodiment) in which the probabilities, with each of which the predetermined symbols are rearranged in the display regions of the display on the particular condition in the free games, are set so as to be less than the predetermined probability; and a controller (for example, a main CPU 222, a main body PCB 240, and the like) for controlling the plurality of symbol display devices and executing control to rearrange the plurality of symbols in the display regions of the display, the controller being programmed to execute processing (1-1) to (1-4) described below:

processing (1-1) in which in a basic game, symbols to be rearranged are determined by conducting a lottery;

processing (1-2) in which in the basic game, when the rearranged symbols (for example, the BONUS symbols) meet a predetermined condition (for example, a condition that three or more BONUS symbols are rearranged), a game state is shifted to the free games;

processing (1-3) in which in the free games, symbols to be rearranged are determined based on the first symbol determination table by conducting a lottery; and processing (1-4) in which in the next free games subsequent to the game in which the predetermined symbols have been rearranged in the display regions on the particular condition, symbols to be rearranged are determined based on the second symbol determination table by conducting a lottery.

By employing the above-described configuration in the present invention, when in the free games, the symbols to be rearranged are determined based on the first symbol determination table and the predetermined symbols are rearranged on the particular condition, in the next games subsequent to the game in which the predetermined symbols are rearranged on said particular condition, the symbols to be rearranged are determined based on the second symbol determination table by conducting a lottery. Accordingly, in the free games, the predetermined symbols can be easily rearranged until it is first realized that the predetermined symbols are rearranged on the particular condition (retrigger), and after the retrigger has once been realized, it is made possible for the predetermined symbols to be less easily rearranged on the particular condition. Thus, a player can play the games while expecting that the retrigger is realized since the start of the free games. In addition, a player can play the games while further expecting, even after the retrigger has once been realized, that the retrigger is realized though the probabilities become low.

In a second aspect of the present invention, the controller in the first aspect is further programmed to execute processing (1-5) described below:

processing (1-5) in which in the free games, when the predetermined symbols are rearranged in the display regions on the particular condition, a predetermined number of free games (for example, five games) is added to a number of the free games.

By employing the above-described configuration in the present invention, in the free games, when the retrigger has been realized, the number of free games is increased by the predetermined number of free games. In addition, in the free games, the retrigger is easily realized until the retrigger is first realized, and the retrigger is less easily realized after the retrigger has once been realized. Thus, a player can play the games while expecting the increase in the number of free games with high probabilities. Further, after the retrigger once has been realized, a player can play the games while further expecting the addition of the number of free games through the probabilities become low.

In a third aspect of the present invention, the memory in the first aspect has stored therein a first symbol determination table group (for example, a symbol determination table first selection table in the first embodiment) having a plurality of symbol determination tables, in each of which in the free games, probabilities, with each of which the predetermined symbols are rearranged in the display regions of the display on the particular condition, are set so as to exceed the predetermined probability and a second symbol determination table group (for example, a symbol determination table second selection table in the first embodiment) having a plurality of symbol determination tables, in each of which in the free games, probabilities, with each of which the predetermined symbols are rearranged in the display regions of the display on the particular condition, are set so as to be less than the predetermined probability, in the respective plurality of symbol determination tables which the first symbol determination table group and the second symbol determination table group have, the probabilities which are different from one another are set, the processing (1-3) includes:

processing (1-3-1) in which in the free games, one symbol determination table (for example, one of the first to sixth symbol determination tables in the first embodiment) is selected from the first symbol determination table group for each game by conducting a lottery; and processing (1-3-2) in which in the free games, symbols to be rearranged are determined based on the symbol determination table selected from the first symbol determination table group by conducting a lottery, and the processing (1-4) includes:

processing (1-4-1) in which in the next and subsequent free games, one symbol determination table (for example, one of the fifth to tenth symbol determination tables in the first embodiment) is selected from the second symbol determination table group for each game by conducting a lottery; and processing (1-4-2) in which in the next and subsequent free games, symbols to be rearranged are determined based on the symbol determination table selected from the second symbol determination table group by conducting a lottery.

By employing the above-described configuration in the present invention, each of the symbol determination tables is selected for each game by conducting a lottery. In addition, the probabilities are set such that the probabilities, with each of which the predetermined symbols are rearranged on the particular condition, are different from those in each of the symbol determination tables. Accordingly, even in a case where the predetermined symbols are easily rearranged or less easily rearranged on the particular condition, variations in said probabilities are increased, thereby allowing the games to be prevented from becoming monotonous.

In a fourth aspect of the present invention, the memory in the second aspect has stored therein a first symbol determination table group (for example, a symbol determination table first selection table in the first embodiment) having a plurality of symbol determination tables, in each of which in the free games, probabilities, with each of which the predetermined symbols are rearranged in the display regions of the display on the particular condition, exceed the predetermined probability and a second symbol determination table group (for example, a symbol determination table second selection table in the first embodiment) having a plurality of symbol determination tables, in each of which in the free games, probabilities, with each of which the predetermined symbols are rearranged in the display regions of the display on the particular condition, are less than the predetermined probability, in the respective plurality of symbol determination tables which the first symbol determination table group and the second symbol determination table group have, the probabilities which are different from one another are set, the processing (1-3) includes:

processing (1-3-1) in which in the free games, one symbol determination table (for example, one of the first to sixth symbol determination tables in the first embodiment) is selected from the first symbol determination table group for each game by conducting a lottery; and processing (1-3-2) in which in the free games, symbols to be rearranged are determined based on the symbol determination table selected from the first symbol determination table group by conducting a lottery, and the processing (1-4) includes:

processing (1-4-1) in which in the next and subsequent free games, one symbol determination table (for example, one of the fifth to tenth symbol determination tables in the first embodiment) is selected from the second symbol determination table group for each game by conducting a lottery; and processing (1-4-2) in which in the next and subsequent free games, symbols to be rearranged are determined based on the symbol determination table selected from the second symbol determination table group by conducting a lottery.

By employing the above-described configuration in the present invention, in the free games, when the retrigger has been realized, the number of free games is increased by the predetermined number of free games. In addition, in the free games, the retrigger is easily realized until the retrigger is first realized, and the retrigger is less easily realized after the retrigger has once been realized. Thus, a player can play the games while expecting the increase in the number of free games with high probabilities. Further, after the retrigger once has been realized, a player can play the games while further expecting the addition of the number of free games through the probabilities become low.

In addition, each of the symbol determination tables is selected for each game by conducting a lottery, and the probabilities are set such that the probabilities, with each of which the predetermined symbols are rearranged on the particular condition, are different from those in each of the symbol determination tables. Accordingly, even in a case where the predetermined symbols are easily rearranged or less easily rearranged on the particular condition, variations in said probabilities are increased, thereby allowing the games to be prevented from becoming monotonous.

A gaming machine capable of realizing game patterns differing from one another in a bonus game is provided.

BRIEF DESCRIPTION OF THE DRAWINGS

FIG. 9 shows an example of a payline definition table defining paylines;

FIG. 10 shows an example of a symbol determination table for a basic game;

FIG. 11 shows an example of a payout table;

FIGS. 20A and 20B show an example of a symbol determination table first and second selection table;

FIG. 21 shows an example of a first symbol determination table for the free games;

FIG. 22 shows an example of a second symbol determination table for the free games;

FIG. 23 shows an example of a third symbol determination table for the free games;

FIG. 24 shows an example of a fourth symbol determination table for the free games;

FIG. 25 shows an example of a fifth symbol determination table for the free games;

FIG. 26 shows an example of a sixth symbol determination table for the free games;

FIG. 27 shows an example of a seventh symbol determination table for the free games;

FIG. 28 shows an example of an eighth symbol determination table for the free games;

FIG. 29 shows an example of a ninth symbol determination table for the free games;

FIG. 30 shows an example of a tenth symbol determination table for the free games;

FIG. 31 shows an example of a symbol determination table for a basic game;

FIG. 32 shows an example of a payout table;

FIGS. 36A and 36B show an example of a symbol determination table first and second selection table;

FIG. 37 shows an example of a first symbol determination table for the free games;

FIG. 38 shows an example of a second symbol determination table for the free games;

FIG. 39 shows an example of a third symbol determination table for the free games;

FIG. 40 shows an example of a fourth symbol determination table for the free games;

FIG. 41 shows an example of a fifth symbol determination table for the free games;

FIG. 42 shows an example of a sixth symbol determination table for the free games;

FIG. 43 shows an example of a seventh symbol determination table for the free games;

FIG. 44 shows an example of an eighth symbol determination table for the free games;

FIG. 45 shows an example of a ninth symbol determination table for the free games;

FIG. 46 shows an example of a symbol determination table for a basic game;

FIG. 47 shows an example of a payout table;

FIG. 51 shows an example of a symbol determination table selection table;

FIG. 52 shows an example of a first symbol determination table for free games;

FIG. 53 shows an example of a second symbol determination table for the free games;

DESCRIPTION OF THE PREFERRED EMBODIMENTS

Hereinafter, embodiments will be described with reference to the accompanying drawings.

<<<Outline of Gaming Machine According to Embodiments>>>

Figure 1:
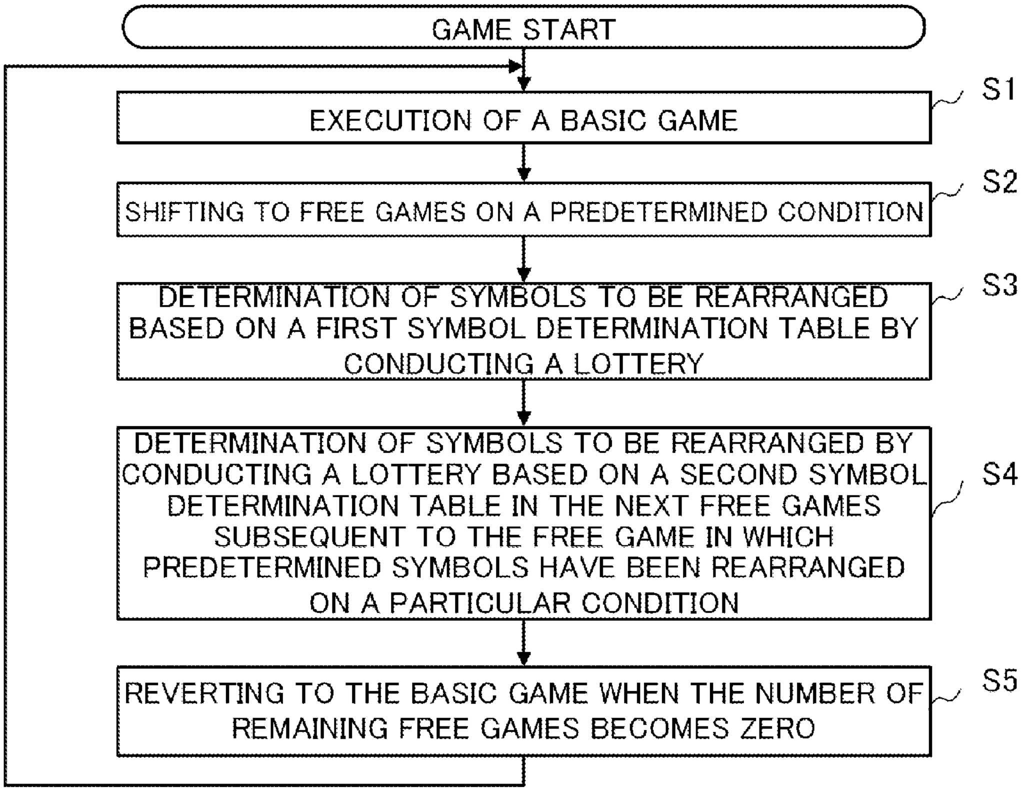
FIG. 1 is a chart showing an outline of a gaming machine.

FIG. 1 is a chart showing an outline of a gaming machine according to each of the embodiments of the present invention.

The gaming machine according to each of the embodiments of the present invention determines symbols to be rearranged in a basic game by conducting a lottery (step S1). When the symbols rearranged in the basic game meet a predetermined condition (for example, a condition that three or more BONUS symbols are rearranged in a display window 56), the gaming machine shifts the game to free games (step S2). Upon shifting to the free games, said gaming machine determines symbols to be rearranged by conducting a lottery based on a first symbol determination table in which probabilities with which predetermined symbols (for example, BONUS symbols) are rearranged are set so as to exceed a predetermined probability on a particular condition (for example, three or more BONUS symbols are rearranged in a display window 56) (step S3). Said gaming machine determines symbols to be rearranged by conducting a lottery based on a second symbol determination table in which in the next free games subsequent to the free game in which the predetermined symbols have been rearranged on the particular condition, the probabilities with which the predetermined symbols are rearranged on the particular condition are set so as to be less than the predetermined probability (step S4). When the number of remaining free games becomes zero, the gaming machine reverts the game to the basic game (step S5). Said gaming machine repeatedly executes these steps S1 to S5.

[Description of Functional Flowchart]

Figure 2:
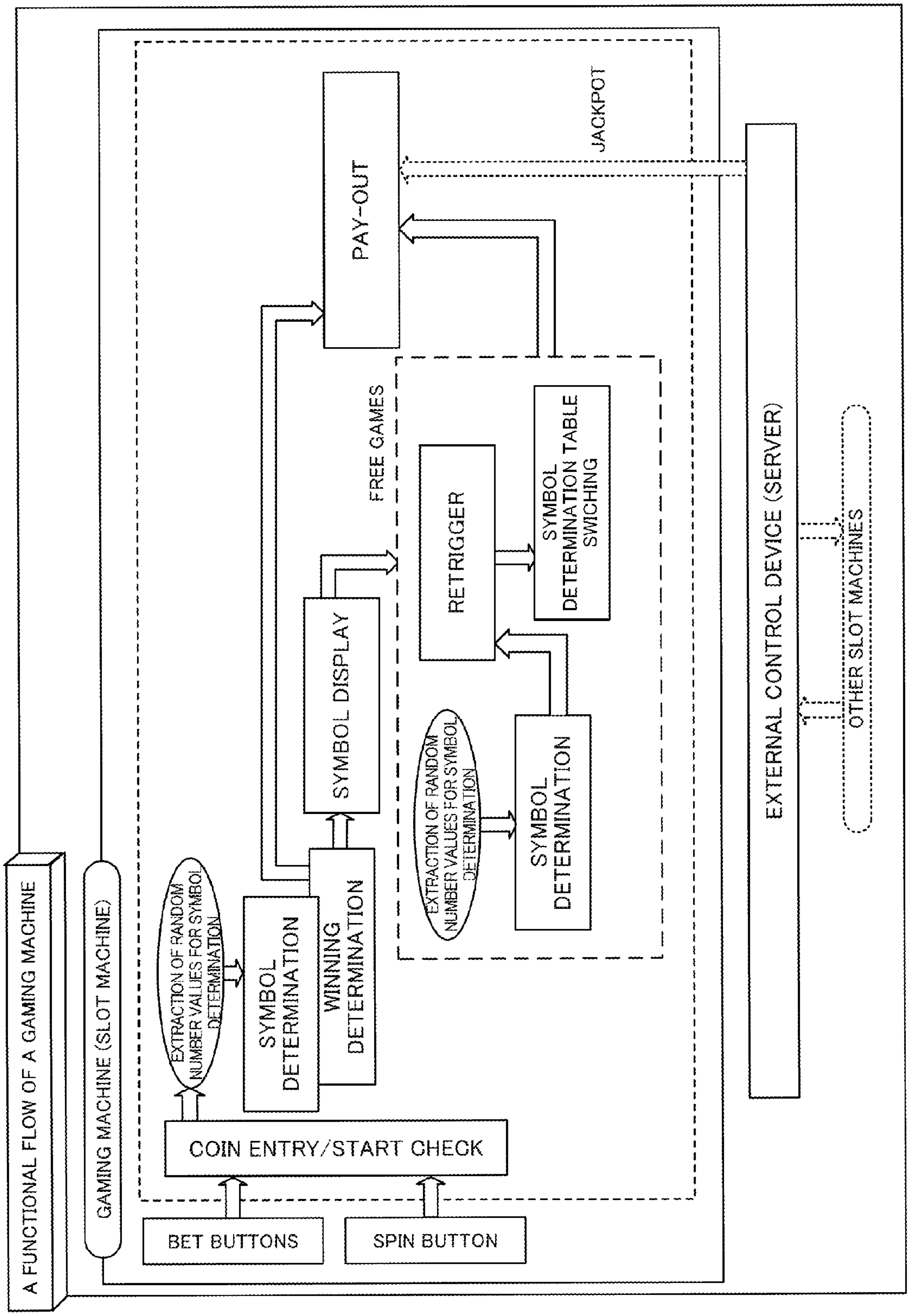
FIG. 2 is a diagram showing a functional flow of operation in the gaming machine.

With reference to FIG. 2, basic functions of the gaming machine according to each of the embodiments will be described. FIG. 2 is a diagram showing a functional flow of operation in the gaming machine according to each of the embodiments of the present invention.

<Coin Entry/Start Check>

First, the gaming machine checks whether or not any BET button has been pressed by a player and subsequently, checks whether or not a spin button has been pressed by a player.

<Determination of Symbols>

Next, when the spin button has been pressed by the player, the gaming machine extracts random number values for determination of symbols and determines symbols to be displayed for the player when scrolling of symbol arrays has been stopped, so as to correspond to each of a plurality of reels that are displayed on the display.

<Determination of Winning>

Next, the gaming machine determines whether or not a combination of the symbols displayed for the player is associated with any winning.

<Display of Symbols>

Next, the gaming machine starts scrolling of symbol arrays of each of the reels, stops the scrolling so as to rearrange symbols such that the determined symbols are displayed for the player.

<Payout>

Next, when a combination of the symbols displayed for the player is associated with any winning, the gaming machine awards a bonus to the player according to a kind of the combination of the symbols. For example, the gaming machine pays out to the player coins in number according to the combination of the symbols when a combination of symbols associated with paying-out of coins is displayed.

<Free Games>

In addition, in the gaming machine according to each of the embodiments, when a combination of symbols associated with a feature game trigger is displayed, the gaming machine shifts the game to the free games. It is to be noted that each of the free games is a game in which each lottery relevant to the above-mentioned determination of symbols and determination of BONUS symbol values is conducted over a predetermined number of times without consuming any coins. In the free games, the gaming machine extracts random number values for the determination of symbols and determines symbols to be rearranged. When the combination of symbols associated with the feature game trigger is displayed (retrigger), the gaming machine increases the number of free games. In the next free games subsequent thereto, the gaming machine switches the symbol determination table in which the retrigger less easily occurs.

In addition, the gaming machine can pay out coins of the amount of a jackpot to the player in a case where the player has won a predetermined level in a jackpot game. The jackpot refers to a function of accumulating a part of coins which are consumed by the player in the gaming machine as the amount of a jackpot and in a case where the player has won the predetermined level of a jackpot, paying out the number of payout according to the amount of a payout of that level. The gaming machine computes the amount which is accumulated as the amount of a jackpot (accumulated amount) each time one game is played and accumulates the amounts as the amount of a jackpot.

The jackpot may be of a standalone type such that a single gaming machine is employed and a part of coins consumed in the single gaming machine is accumulated as the amount of jackpot in that gaming machine, or alternatively, may be of a network type such that a jackpot is shared by connecting gaming machines to each other in a single gaming facility or in a plurality of gaming facilities, and the accumulated amount of jackpot is transmitted via an external control device.

In the network type, a part of coins consumed by a player in each gaming machine is transmitted as the amount of a jackpot to the external control device, and in the external control device, the received amount of a jackpot is accumulated and is shared by each gaming machine. In a case where a gaming machine has won the predetermined level of a jackpot, the amount of a jackpot is transmitted from the external control device to that gaming machine.

In addition, in the gaming machine, in addition to the bonus mentioned above, a bonus such as a mystery bonus may be provided. The mystery bonus is a bonus in which a predetermined amount of coins are paid out by winning in a dedicated lottery. When the spin button is pressed, the gaming machine extracts random number values for the mystery bonus and determines whether or not a mystery bonus trigger is established by conducting the lottery.

<<<Embodiments of Gaming Machine>>>

Hereinafter, in each of the embodiments of the present invention, as the gaming machine according to each of the embodiments of the present invention, a slot machine 10 will be described.

First Embodiment

Hereinafter, a first embodiment of the present invention will be described.

<<Game System>>

Figure 3:
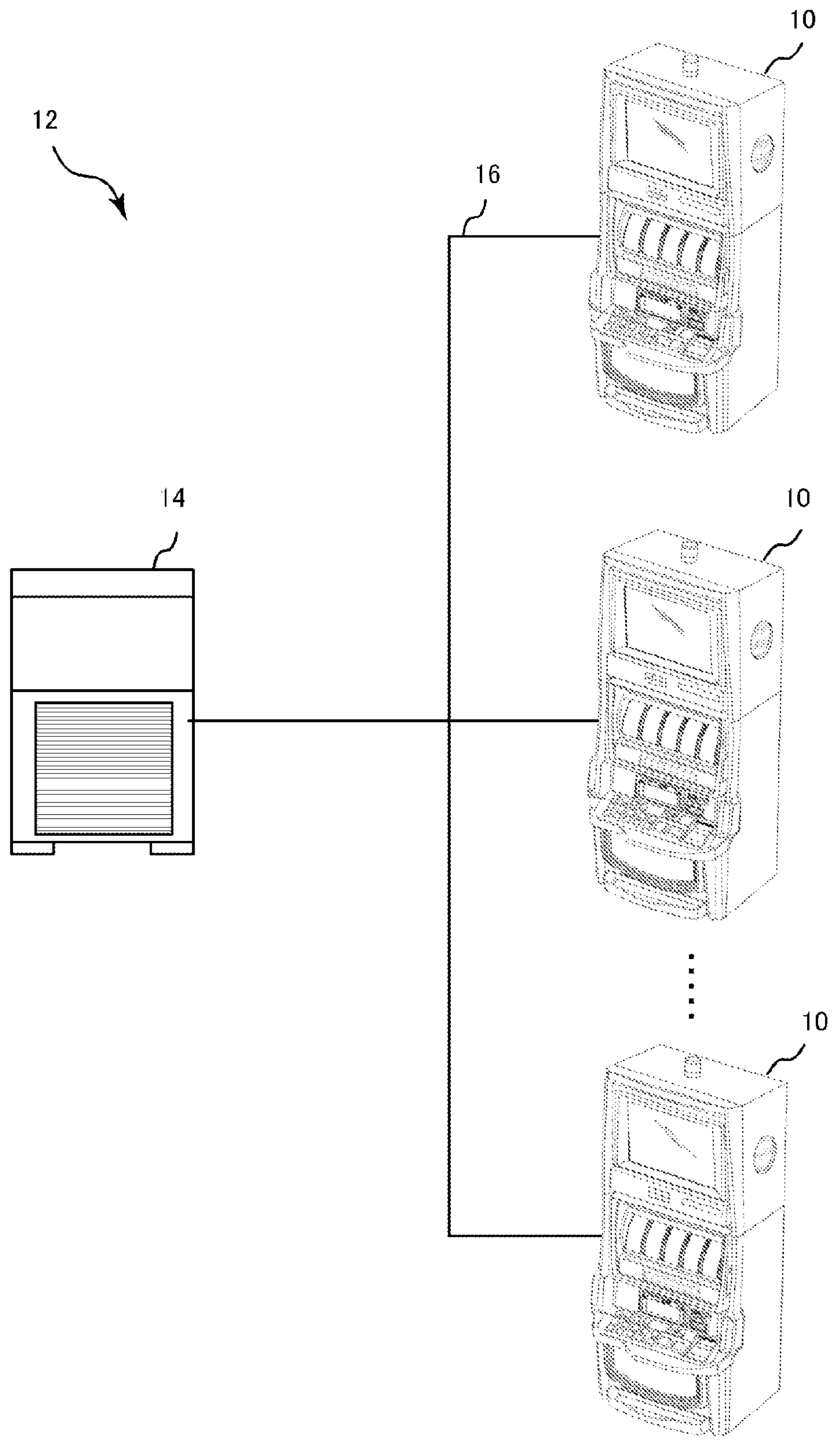
FIG. 3 is a view showing a game system including gaming machines.

FIG. 3 is a view showing a game system including slot machines 10 in the first embodiment.

The game system 12 includes a plurality of slot machines 10 and an external control device 14, which are connected via a communication line 16.

The external control device 14 controls the plurality of slot machines 10. In the embodiment, the external control device 14 is the so-called "hall server" which is installed in a gaming facility having the plurality of slot machines 10. A unique identification number is assigned to each of the slot machines 10, and by using the identification numbers, the external control device 14 identifies a source of data which is transmitted from each of the slot machines 10. In addition, also when data is transmitted from the external control device 14 to each of the slot machines 1, each of the identification numbers is used to designate a destination.

The game system 12 may be constructed in one gaming facility such as a casino in which a variety of games can be played or alternatively, may be constructed among a plurality of gaming facilities. In addition, in a case where the game system is constructed in one gaming facility, the game system 12 may be constructed in each floor or section of the gaming facility. The communication line 16 may be wired or wireless, and a leased line or a switchboard line or the like can be used.

<<Construction of Slot Machine 10>>

Figure 4:
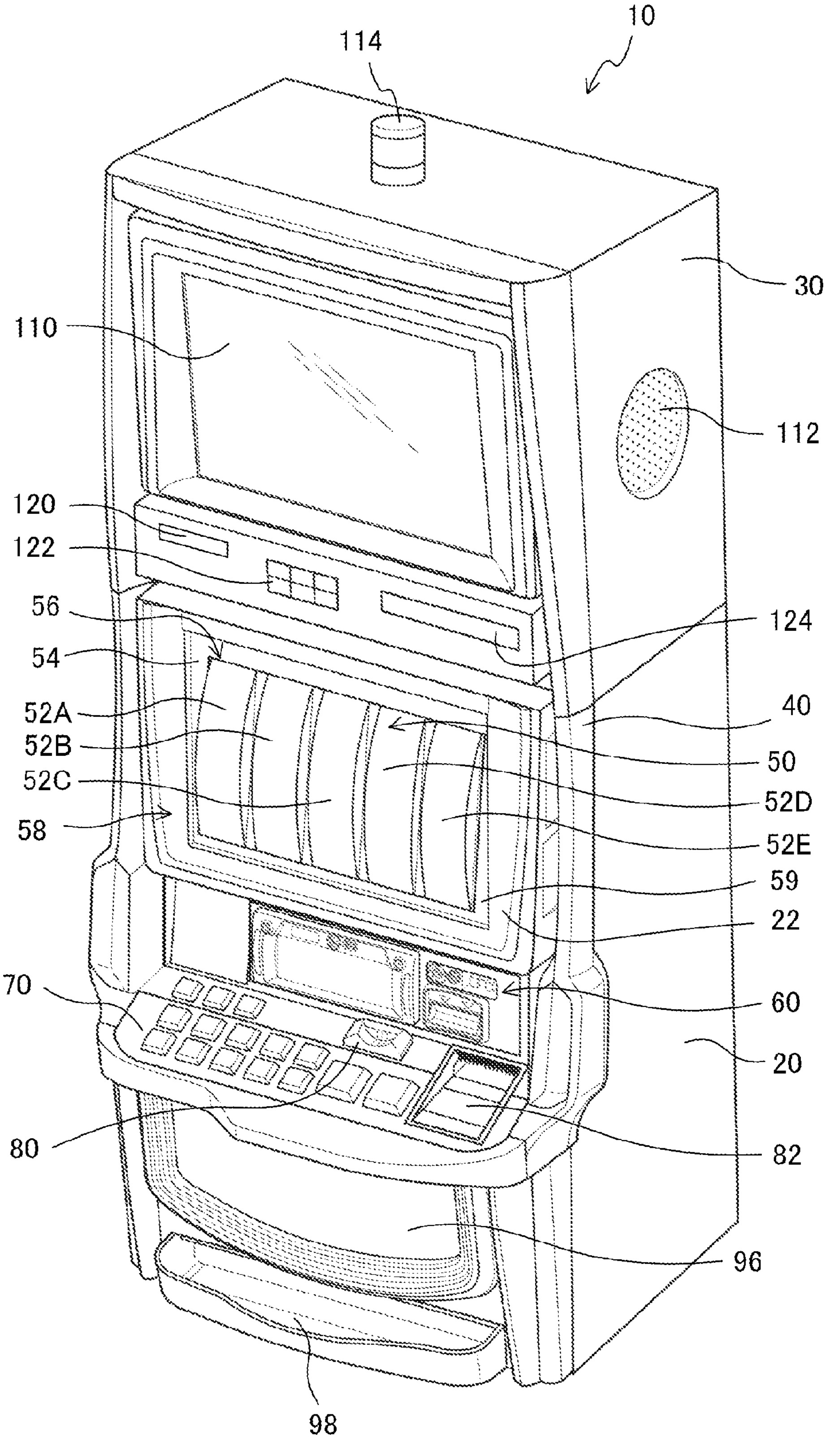
FIG. 4 is a view showing an entire construction of each of the gaming machines.

FIG. 4 is a view showing an entire construction of the slot machine 10 according to the first embodiment of the present invention.

As gaming media which can be used in the slot machine 10, coins, bills, or pieces of electronic information corresponding thereto are included. In addition, credits stored in a bar code ticket or an IC card can be also used as the gaming media used in the slot machine 10. The gaming media are not limited to the above-mentioned gaming media, and other kinds of media are also used in the same manner.

The slot machine 10 shown in FIG. 4 includes: a cabinet 20; a top box 30 installed in the cabinet 20; and a main door 22 provided on a front face of the cabinet 20.

A symbol display unit 40 including a reel assembly 50 is provided at the main door 22. In the present embodiment, the reel assembly 50 includes five reels 52A, 52B, 52C, 52D, and 52E. Each of the reels 52A, 52B, 52C, 52D, and 52E has a drum whose outer circumferential face has a plurality of kinds of symbols arranged thereon. The symbol display unit 40 is installed on a front part of the reel assembly 50 and has a display window 56. A reel cover 54 is provided outside so as to allow a player to visually recognize a part of each of the reels 52A, 52B, 52C, 52D, and 52E. The reel cover 54 is provided on a display panel 58. It is preferable that as the reel cover 54, a transparent liquid crystal panel is used. The symbol display unit 40 includes a touch panel 59 which detects a touch input made by a player.

In a state in which the reels 52A, 52B, 52C, 52D, and 52E have stopped, three symbols among symbols assigned on each of the reels 52A, 52B, 52C, 52D, and 52E appear in the display window 56. Thus, a symbol matrix constituted of three rows and five columns is formed in the display window 56. One or more lines are previously set as paylines for determining whether or not winning occurs. Each time a unit game is executed, the reels 52A, 52B, 52C, 52D, and 52E to which symbols are assigned rotate at a predetermined speed, thereafter stop, and cause symbols to appear in the display window 56, thereby rearranging the symbols. An outcome of the unit game is determined by the rearrangement of the symbols. A profit in accordance with an outcome of the unit game is awarded to a player. For example, when a predetermined winning combination is established along one payline by the rearranged symbols, a predetermined amount of a payout is awarded to a player. In addition, a game mode of the subsequent unit game is determined by the rearrangement of the symbols. As the game modes, there are a basic game mode and a free game mode, and the game modes will be described later in detail.

In the specification, the unit game refers to a game in a period from when processing of starting credits for starting a game is executed to when the symbol arrays have stopped, any symbols are rearranged in the display window 56, and termination processing such as paying-out processing in accordance with an outcome of the game is executed. In a case of the free games, since it is not required for a player to perform a bet operation, the time at which credit processing inside of the slot machine 10 is conducted can be made as the time at which a game is started. In addition, in a case of a game other than the free games, the time at which a player performs the bet operation can be made as the time at which the game is started. In addition, processing in accordance with a outcome of a game, which is determined by rearranged symbols, can be made as the termination processing. For example, the time at which winning has occurred and processing of paying-out in accordance with the winning is executed can be made as the time at which the game is terminated.

In predetermined regions of the display panel 58, an amount of bets and an amount of credits are displayed. The amount of credits indicates the number of coins which a player owns and has deposited inside of the slot machine 10. The amount of payout indicates the number of coins awarded to a player when a winning combination is established.

In the first embodiment, in the slot machine 10, mechanical reels 52A, 52B, 52C, 52D, and 52E are used. Video reels or a combination of the mechanical reels and the video reels may be used.

An IC card reader 60 is provided in a lower part of the symbol display unit 40. The IC card reader 60 receives an IC card. In the IC card, identification information of a player and predetermined data such as game log data pertinent to games played by a player before are stored. In addition, in the IC card, data corresponding to coins, bills, or credits owned by a player can also be stored. The IC card reader 60 performs reading and writing from and to an inserted IC card. It is preferable that the IC card reader 60 includes a liquid crystal display for displaying data read from an IC card.

Figure 5:
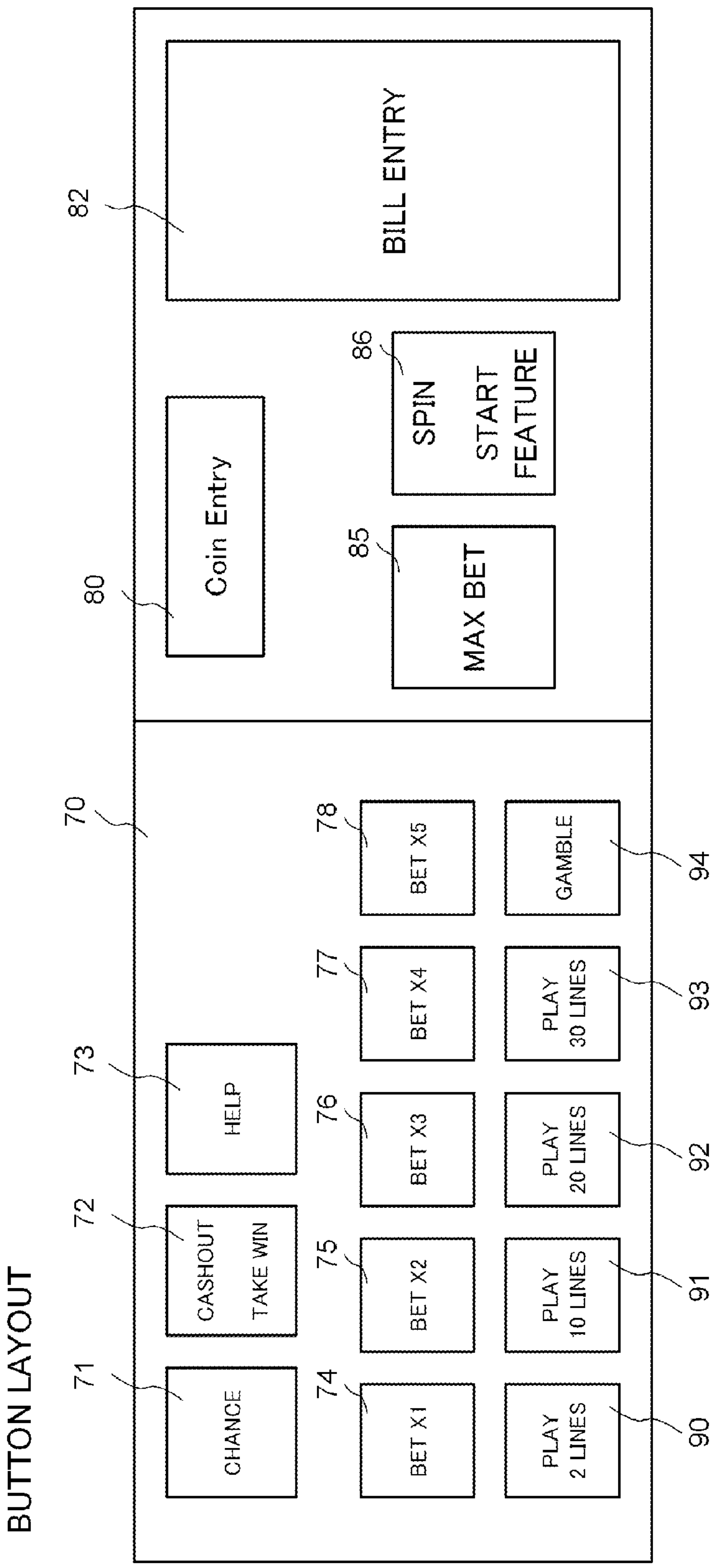
FIG. 5 is a schematic diagram illustrating a layout of buttons of a control panel of the gaming machine.

In addition, as shown in FIG. 4 and FIG. 5, below the reel assembly 50, a variety of buttons disposed on a control panel 70 (input device), a coin entry 80 for receiving coins into the cabinet 20, and a bill entry 82 are provided.

On the control panel 70, a CHANGE button 71, a CASHOUT/TAKE WIN button 72, and a HELP button 73 are disposed in an upper part of a left region thereof, and a 1-BET button 74, a 2-BET button 75, a 3-BET button 76, a 4-BET button 77, a 5-BET button 78, a play-2-LINE button 90, a play-10-LINE button 91, a play-20-LINE button 92, a play-30-LINE button 93, and a GAMBLE button 94 are disposed in a lower part of the left region thereof. In addition, the coin entry 80 and the bill entry 82 for receiving bills or the like are disposed in an upper part of a right region thereof and a MAX-BET button 85 and a spin button 86 are disposed in a lower part of the right region thereof.

The CHANGE button 71 is an operation button used upon temporarily leaving a seat and making a request of a staff in a gaming facility for exchange of money. The CASHOUT/TAKE WIN button 72 is an operation button used upon adjusting coins (credits) deposited inside of the slot machine 10. The HELP button 73 is a button to be pressed in a case where a way of operating a game and the like are unclear. When the HELP button 73 is pressed, a variety of pieces of help information are displayed on a video display unit 110 and the reel assembly 50.

Each time the 1-BET button 74 is pressed, one of credits currently owned by a player is bet on each activated payline on a one-by-one basis. The 2-BET button 75 is a button for starting a game with two bets on each activated payline. In addition, the 3-BET button 76 is a button for starting a game with three bets on each activated payline. In addition, the 4-BET button 77 is a button for starting a game with four bets on each activated payline. In addition, the 5-BET button 78 is a button for starting a game with five bets on each activated payline. In addition, the MAX-BET button 85 is a button for starting a game with 10 bets on each activated payline. Accordingly, by pressing any of the 1-BET button 74, the 2-BET button 75, the 3-BET button 76, the 4-BET button 77, the 5-BET button 78, and the MAX-BET button 85, the number of bets placed on each of the activated paylines is determined.

The play-2-LINE button 90 activates paylines when pressed, whereby the number of the activated paylines becomes "2". The play-10-LINE button 91 activates paylines when pressed, whereby the number of the activated paylines becomes "10". The play-20-LINE button 92 activates paylines when pressed, whereby the number of the activated paylines becomes "20". The play-30-LINE button 93 activates paylines when pressed, whereby the number of the activated paylines becomes "30".

The GAMBLE button 94 is an operation button used upon shifting to a gamble game after terminating a bonus game or the like. Here, the gamble game is a game played by using obtained credits.

The spin button 86 is used upon starting the scrolling of the mechanical reels 52A, 52B, 52C, 52D, and 52E.

The coin entry 80 is to receive coins into the cabinet 20. The bill entry 82 is to validate legitimacy of bills and receive legitimate bills into the cabinet 20.

When coins are inserted into the coin entry 80, the inserted coins are guided to a hopper in the cabinet 20. When bills are inserted into the bill entry 82, it is determined whether or not the inserted bills are legitimate and only legitimate bills are received into the cabinet 20.

On a front face of a lower side of the main door 22 and below the control panel 70, a lower glass 96 and a coin tray 98 are provided. On the lower glass 96, a character of a slot machine and the like are depicted. To the coin tray 98, coins are dispensed from the cabinet 20.

As shown in FIG. 4, the video display unit 110 having the liquid crystal panel is provided on a front face of the top box 30. The video display unit 110 is to provide video effects for enhancing amusement of a game. In addition, in the video display unit 110, information pertinent to rules and operations of a game is also displayed. A speaker 112 and a lamp 114 are provided on a side face and an upper face of the top box 30, respectively. The slot machine 10 provides sound effects and effects presented by emitting light via the speaker 112 or the lamp 114, thereby enhancing amusement of a game.

Below the video display unit 110, a ticket printer 120, a keypad 122, and a data display 124 are provided.

The ticket printer 120 prints on a ticket a bar code including credit data, date and time, and an ID number of the slot machine 10 and discharges the printed ticket as a bar code ticket. A player can exchange the bar code ticket for bills and the like at a predetermined place of a gaming facility (for example, a cashier of a casino).

The keypad 122 has a plurality of keys. A player operates the plurality of keys, thereby allowing a variety of instructions related to the issuance of a bar code ticket to be inputted. On the data display 124 having a fluorescent display tube, an LED, and the like, data inputted from the keypad 122 by a player is displayed.

<<<Electric Configuration of Slot Machine>>>

Figure 6:
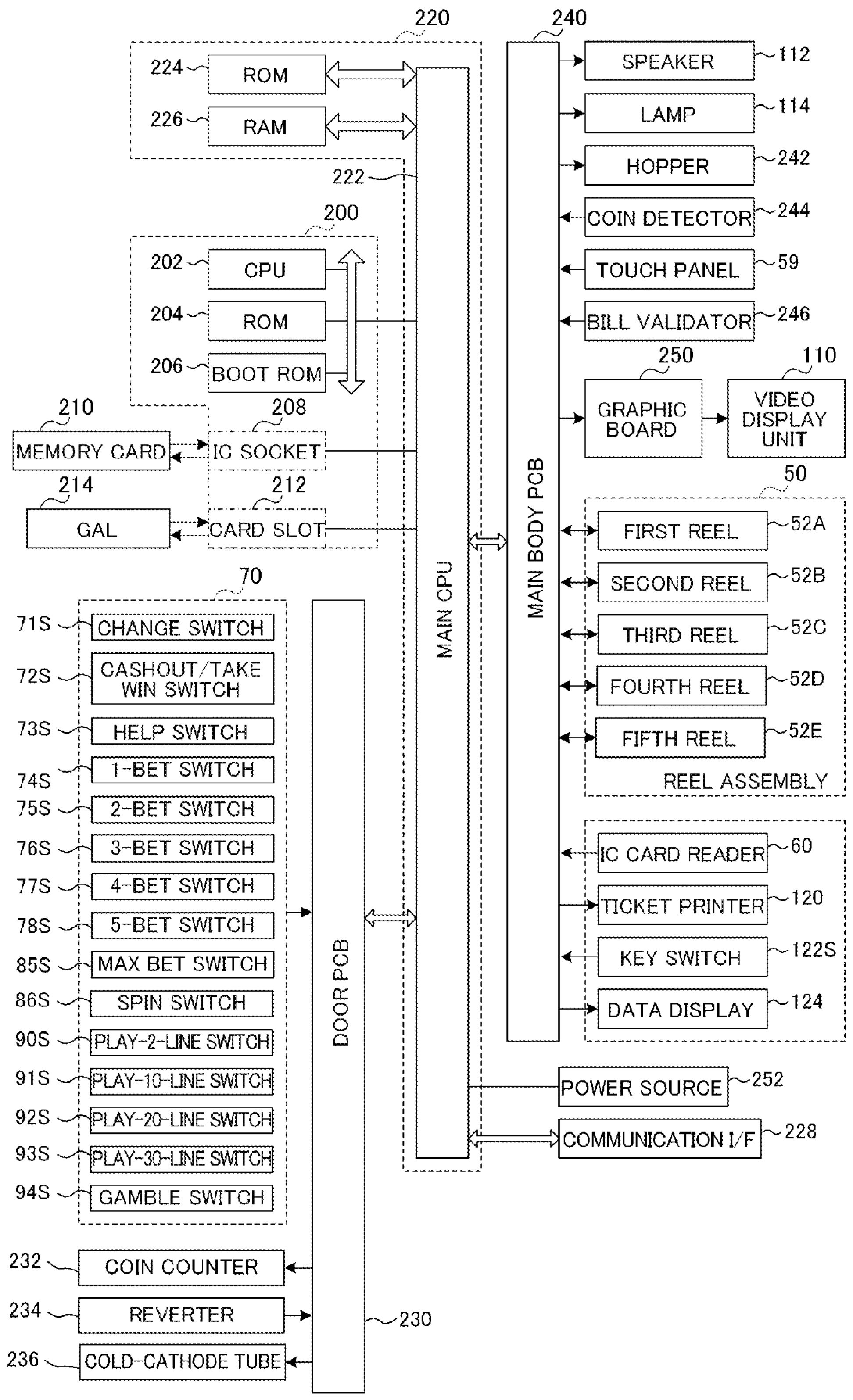
FIG. 6 is an electric block diagram of the gaming machine.

FIG. 6 is an electric block diagram of the slot machine 10 shown in FIG. 4. The slot machine 10 includes a game board 200, a motherboard 220, a door PCB 230, and a main body PCB 240.

The game board 200 includes: a CPU 202; a ROM 204 which can be accessed from the CPU 202 via an internal bus; and a boot ROM 206 which can be accessed from the CPU 202 via the internal bus. The game board 200 includes: an IC socket 208 which is capable of housing a memory card 210 and communicating with the memory card 210; and a card slot 212 which is provided in correspondence with a general-purpose array logic (GAL) 214.

The memory card 210 includes a nonvolatile memory and has a game program and a game system program stored therein.

The IC socket 208 is configured such that the memory card 210 can be removably mounted thereon. The IC socket 208 is connected to the motherboard 220 by an IDE bus. A game executed by the slot machine 10 can be changed by replacing the memory card 210 with another card. In addition, a game executed by the gaming machine 10 can be changed by pulling out the memory card 210 from the IC socket 208, writing another program into the memory card 210, and reinserting the memory card 210 into the IC socket 208.

The GAL 214 is a kind of a programmable logic device (PLD) having a fixed OR array architecture and has a plurality of input ports and output ports. Upon receiving predetermined data via each of the input ports, the GAL 214 outputs data corresponding to the inputted data via each of the output ports.

The card slot 212 is configured such that the GAL 214 can be inserted into the card slot 212 or can be removed from the card slot 212 and is connected to the motherboard 220 by a PCI bus.

The CPU 202, the ROM 204, and the boot ROM 206 which are interconnected by an internal bus are connected to the motherboard 220 by the PCI bus. The PCI bus enables transmission of a signal between the motherboard 220 and the game board 200, and can supply power from the motherboard 220 to the game board 200.

The ROM 204 stores programs. The boot ROM 206 stores a preliminary authentication program and boot codes or the like, which are used by the CPU 202, for starting up the preliminary authentication program. The authentication program is a tampering check program for authenticating that the game program and the game system program are each authentic. The preliminary authentication program is a program for authenticating that the authentication program is authentic. Each of the authentication program and the preliminary authentication program is written by processing for authenticating that a targeted program is not tampered.

As the motherboard 220, a generally available mainboard is used, and the motherboard 220 executes the game program and the game system program. The motherboard 220 includes a main CPU 222, a ROM 224, a RAM 226, and a communication interface 228.

The ROM 224 is a memory device for storing programs that are executed by the main CPU 222, and as in a BIOS, the programs are permanently held together with other pieces of data. The ROM 224 may be a flash memory. The BIOS program initializes peripheral devices when the program is executed by the main CPU 222. In addition, the BIOS program loads the game program and the game system program which are stored in the memory card 210, via the game board 200. The ROM 224 may be rewritable. Alternatively, a write-protected storage medium may be used as the ROM 224.

The RAM 226 stores data and programs used during the operation of the main CPU 222. For example, when the game program, the game system program, or the authentication program is loaded, such a program can be stored in the RAM 226. The RAM 226 has a workspace for executing the programs. For example, in the workspace, the number of bets, the amount of payout, the amount of credits, or the like is stored and is held while a game is executed. Symbols, symbol codes, winning combinations, and a plurality of tables defining probabilities thereof are also held while a game is executed. Further, the RAM 226 stores a symbol code determination table. The symbol code determination table stores mapping information between the symbol codes and random numbers used to determine symbols based on the random numbers. In particular, the RAM 226 holds a mode flag as well as a game counter. The mode flag is a flag indicating a game mode. The game counter counts a value indicating the number of unit games that have already been executed or the number of remaining unit games.

In addition, the RAM 226 stores the count values of a plurality of counters. As the plurality of counters, a bet counter, an amount-of-payout counter, an amount-of-credit counter, and a number-of-free-game counter for counting the number of unit games in the free games are included. In addition, some of the count values may be held in an internal register of the main CPU 222.

The main CPU 222 communicates with an external controller via the communication interface 228. For example, the external controller may be constituted of a server (not shown) or the like connected via a communication path.

The motherboard 220 is connected to the door PCB 230 and the main body PCB 240. The motherboard 220 can communicate with the door PCB 230 and the main body PCB 240 via a USB. The motherboard 220 is connected to a power source 252. The main CPU 222 of the motherboard 220 is started up and operated by using the power supplied from the power source 252. The motherboard 220 supplies a part of the power to the game board 200 via the PCI bus in order to start up the CPU 202. The door PCB 230 and the main body PCB 240 are connected to input devices. As the input devices, there are switches, sensors, peripheral devices, and the like, and operations thereof are controlled by the main CPU 222. The door PCB 230 is connected to the control panel 70, a coin counter 232, a reverter 234, and a cold cathode tube 236.

The control panel 70 has a CHANGE switch 71S, a CASHOUT/TAKE WIN switch 72S, a HELP switch 73S, a 1-BET switch 74S, a 2-BET switch 75S, a 3-BET switch 76S, a 4-BET switch 77S, a 5-BET switch 78S, a MAX-BET switch 85S, a spin switch 86S, a play-2-LINE switch 90S, a play-10-LINE switch 91S, a play-20-LINE switch 92S, a play-30-LINE switch 93S, and a GAMBLE switch 94S which are provided in correspondence with a variety of buttons 71 to 78, 85, 86, and 90 to 94, respectively. Each of the switches 71S to 78S, 85S, 86S, and 90S to 94S detects that each of the buttons 71 to 78, 85, 86, and 90 to 94 is pressed by a player and outputs a signal to the main CPU 222.

The coin counter 232 and the reverter 234 are provided in a coin entry 80. The coin counter 232 determines whether or not a coin inserted into the coin entry 80 is authentic, based on features such as a material and a shape of the coin. In a case where an authentic coin is detected, the coin counter 232 outputs a signal to the main CPU 222. A coin which is not determined to be authentic is ejected to the coin tray 98. The reverter 234 operates based on a control signal from the main CPU 222. The reverter 234 supplies the coin which is determined to be authentic by the coin counter 232 to either a hopper 242 or a cashbox (not shown). In a case where the hopper 242 is not filled with coins, such coins are guided to the hopper 242. On the other hand, in a case where the hopper 242 is filled with coins, such coins are guided to the cashbox.

The cold cathode tube 236 is provided on a rear face of the video display unit 110. The cold cathode tube 236 functions as a backlight or alternatively, performs illumination based on a control signal from the main CPU 222.

The main body PCB 240 is connected to the speaker 112, the lamp 114, the hopper 242, a coin detector 244, the touch panel 59, a bill validator 246, the reel assembly 50, the IC card reader 60, a graphic board 250, the ticket printer 120, a key switch 122S, or the data display 124.

The lamp 114 turns ON or OFF based on a control signal from the main CPU 222. The speaker 112 outputs a sound such as background music (BGM) based on a control signal from the main CPU 222.

The hopper 242 operates based on a control signal from the main CPU 222 and pays out coins, whose amount of payout is specified, to the coin tray 98 via a coin payout exit (not shown) formed between the lower glass 96 and the coin tray 98. The coin detector 244 detects the coins which are paid out from the hopper 242 and outputs a detection signal to the main CPU 222.

The touch panel 59 detects a position touched by a player and supplies a position detection signal according to the detected position to the main CPU 222. The bill validator 246 provided in the bill entry 82 supplies a bill detection signal corresponding to the amount of bill to the main CPU 222 when an authentic bill is detected.

The graphic board 250 controls the video display unit 110 and the display panel 58 of the symbol display unit 40 in accordance with a control signal from the main CPU 222. The graphic board 250 includes: a video display processor (VDP) adapted to generate video data; and a video RAM adapted to temporality store video data. The video data is generated from the game program which is stored in the RAM 226.

The IC card reader 60 reads out data which is stored in an IC card inserted into the IC socket 208 and supplies the read-out data to the main CPU 222. The IC card reader 60 writes data supplied to the main CPU 222 to the IC card.

In order to output a barcode ticket, the ticket printer 120 prints, on the ticket, a barcode including the amount of credits stored in the RAM 226, date and time, and an identification number of the gaming machine 10, in accordance with a control signal from the main CPU 222.

The key switch 122S is provided on a back side of the keypad 122 and when the keypad 122 is pressed by a player, a key detection signal is outputted to the main CPU 222.

The data display 124 displays information relevant to information inputted via the keypad 122, in accordance with a control signal from the main CPU 222.

<<Electric Circuit of Reel Assembly>>

Figure 7:
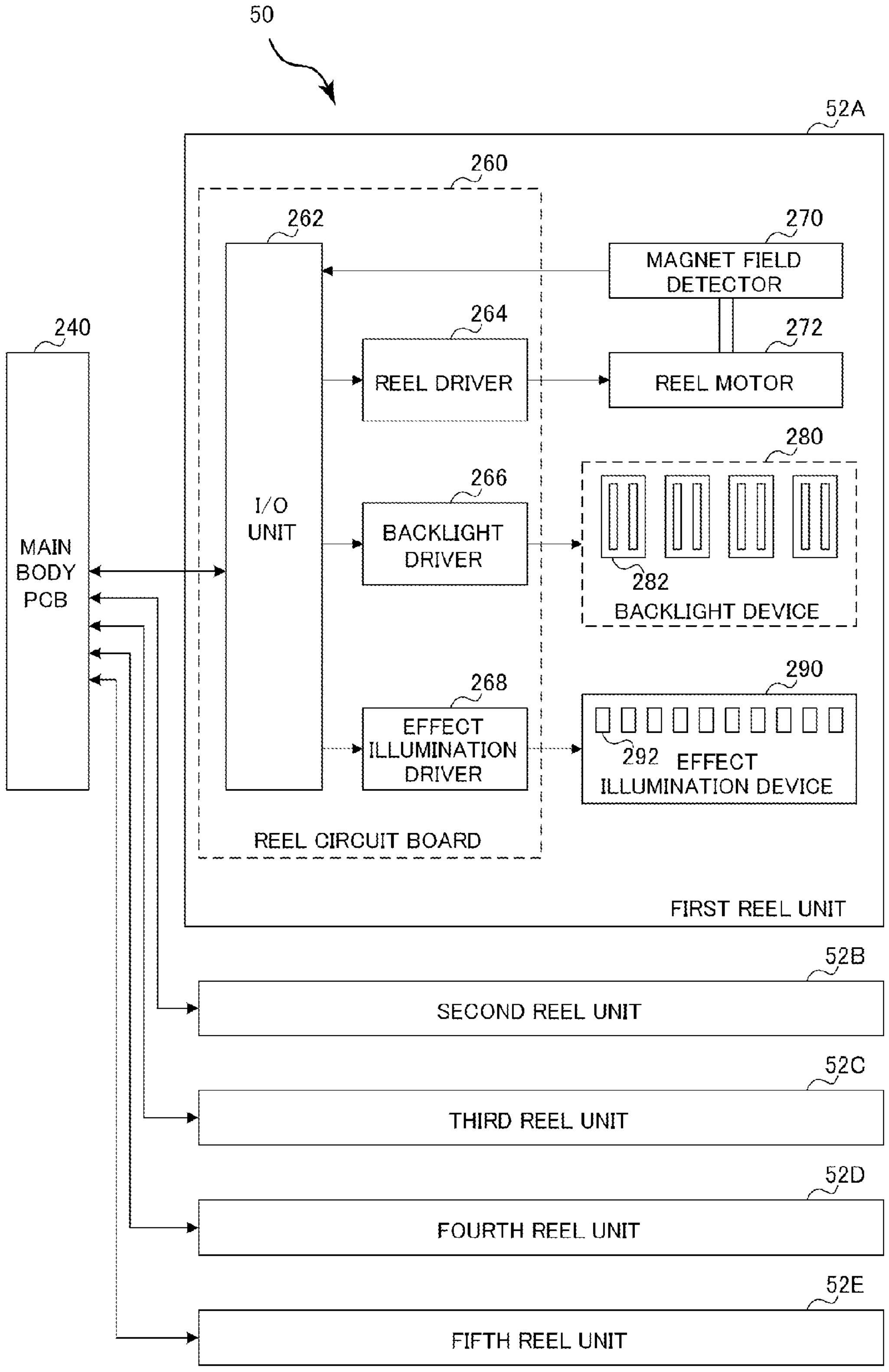
FIG. 7 is a block diagram showing an electric circuit of a reel assembly.

FIG. 7 is a block diagram showing an electric circuit of the reel assembly.

As shown in FIG. 7, the main body PCB 240 is electrically connected to the reel assembly 50. As mentioned above, the reel assembly 50 includes the first to fifth reels 52A, 52B, 52C, 52D, and 52E. Each of the reels 52A, 52B, 52C, 52D, and 52E is provided on a reel circuit board 260. The reel circuit board 260 includes: an input/output (I/O) unit 262 which can communicate with the main body PCB 240; a reel driver 264 that is connected to the I/O unit 262; a backlight driver 266; and an effect illumination driver 268.

The I/O unit 262 is connected to a magnetic field detector 270. The magnetic field detector 270 includes: a magnetic sensor adapted to detect an intensity of a magnetic field and then output a magnetic detection signal which is proportional to the intensity of the magnetic field; and a sensor fixing part for fixing the magnetic sensor at a predetermined position. The magnetic sensor detects the intensity of the magnetic field which is generated by a magnet. The magnet is provided on a rotary shaft of a reel motor 272, and rotates together with the reel 52A.

The reel driver 264 supplies power to the reel motor 272. The backlight driver 266 supplies individually power to respective light sources 282 of the backlight device 280. The effect illumination driver 268 supplies individually power to respective light sources 292 of an effect illumination device 290.

Each of the second to fifth reels 52B to 52E has the same configuration as that of the first reel 52A and a detailed description thereof will be omitted.

<<Processing of Game Program>>

Figure 8:
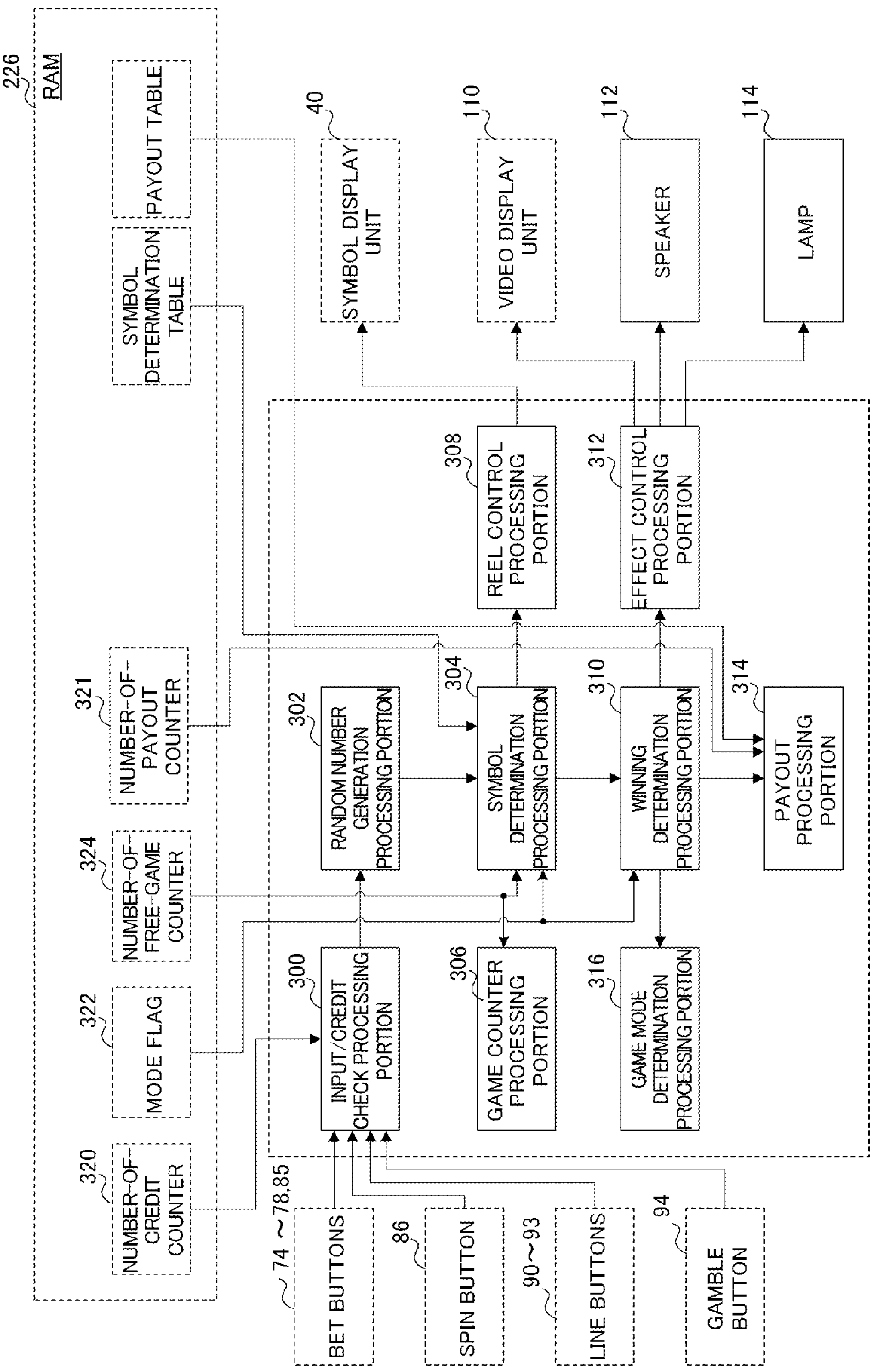
FIG. 8 a block diagram showing processing of game programs executed by a main CPU of a motherboard.

FIG. 8 is a block diagram showing processing of the game programs executed by the main CPU 222 of the motherboard 220. When power is supplied to the slot machine 10, the main CPU 222 reads the authenticated game program and game system program from the memory card 210 via the game board 200 and writes these programs into the RAM 226. The game program is executed in a state in which the program is thus loaded into the RAM 226.

According to the preferable embodiment, the game programs are executed by: an input/credit check processing part 300; a random number generation processing part 302; a symbol determination processing part 304; a game counter processing part 306; a reel control processing part 308; a winning determination processing part 310; an effect control processing part 312; a payout processing part 314; and a game mode determination processing part 316.

It is to be noted that the input/credit check processing part 300 may be a single input/credit check processing device 300'; the random number generation processing part 302 may be a single random number generation processing device 302'; the symbol determination processing part 304 may be a single symbol determination processing 304'; the game counter processing part 306 may be a single game counter processing device 306'; the reel control processing part 308 may be a single reel control processing device 308'; the winning determination processing part 310 may be a single winning determination processing device 310'; the effect control processing part 312 may be a single effect control processing device 312'; the payout processing part 314 may be a single payout processing device 314'; and the game mode determination processing part 316 may be a single game mode determination processing device 316'. As mentioned above, the game programs in the present embodiment can be executed by a set of the single devices. In addition, the game programs in the present embodiment can be executed by a device obtained by integrating some of the above-mentioned single devices. In any case, it is only required for such device or devices to be a module, a device, or a unit capable of executing the game programs in the present embodiment.

<Input/Credit Check Processing Part 300>

The input/credit check processing part 300 continuously checks whether either any one of the 1-BET button 74 to 5-BET button 78, the MAX-BET button 85, or the spin button 86 is pressed in an idle state in which spinning of the reels 52A, 52B, 52C, 52D, and 52E stops. In a case where either any one of the 1-BET button 74 to 5-BET button 78, the MAX-BET button 85, or the spin button 86 is pressed, the input/credit check processing part 300 checks whether or not any credit of a player remains based on credit data 320 which is stored in the RAM 226. In a case where at least one credit of the player remains, the input/credit check processing part 300 invokes the random number generation processing part 302.

Subsequently, the random number generation processing part 302 generates random numbers, and the symbol determination processing part 304 uses these random numbers. In the present embodiment, the random number generation processing part 302 generates five random numbers. Each of the five random numbers is used in each of the first to fifth reels 52A, 52B, 52C, 52D, and 52E.

After all of the five random numbers have been extracted, the symbol determination processing part 304 determines to-be-stopped symbols of each of the reels 52A, 52B, 52C, 52D, and 52E with reference to the symbol code determination table. The symbol determination processing part 304 determines five to-be-stopped symbols of the reels 52A, 52B, 52C, 52D, and 52E and causes the to-be-stopped symbols to appear in the display window 56 of the symbol display unit 40 with respect to the respective reels 52A, 52B, 52C, 52D, and 52E.

In particular, with reference to a mode flag 322 stored in the RAM 226, the symbol determination processing part 304 checks the current game mode. Processing of determining symbols in the basic game is different from processing of determining symbols in the free games. In the basic game, the symbol determination processing part 304 determines symbols by using a given symbol code determination table in accordance with a given procedure with random numbers. On the other hand, in the free games, the symbol determination processing part 304 continuously changes a symbol code determination table with respect to each of the unit games and alters processing of determining symbols. By continuously changing the symbol code determination table, in accordance with the progress of the free games, the number of winning combinations including at least one specific symbol can be increased. The number of free games which can be executed in a single set of free games is limited to a predetermined number, for example, eight. In order to limit the number of free games, the game counter processing part 306 counts the number of free games which have already been executed in the single set of free games and the number of remaining free games in the single set of free games. Values in a number-of-free-game counter 324 are stored in the RAM 226. The game counter processing part 306 may belong to the symbol determination processing part 304.

The reel control processing part 308 controls the reel assembly 50 by supplying stop position information according to the determined symbols. Thus, the reels 52A, 52B, 52C, 52D, and 52E are spun, and subsequently, the spun reels are stopped at positions which are specified according to the stop position information. In other words, the symbols scroll with the spinning of the reels 52A, 52B, 52C, 52D, and 52E. Next, the reel control processing part 308 stops the reels 52A, 52B, 52C, 52D, and 52E such that the determined symbols are rearranged at central positions in a vertical direction in the display window 56 of the symbol display unit 40.

The winning determination processing part 310 determines whether or not a predetermined winning combination is established by the rearranged symbols. In a case where the winning combination is established by the rearranged symbols, the effect control processing part 312 controls the symbol display unit 40 and other devices. As the other devices, the speaker 112, the lamp 114, a video display unit 110, and the like are included. As effects, effects by video and audio and effects by changes in the backlight and illumination are included. In addition, the payout processing part 314 determines the amount of payout in accordance with the established winning combination, and the amount of payout is awarded to a player.

In addition, each time a unit game is terminated, the game mode determination processing part 316 determines a game mode of a next unit game. In a case where a trigger event has occurred by the rearranged symbols, the game mode determination processing part 316 changes the game mode from the basic game mode to the free game mode. On the other hand, in a case where a termination condition has been met, the game mode determination processing part 316 changes the game mode from the free game mode to the basic game mode. In a case other than the above-mentioned cases the game mode determination processing part 316 maintains an immediately preceding game mode. The processing by the game mode determination processing part 316 may be executed by the winning determination processing part 310.

<Payline>

FIG. 9 shows an example of a payline definition table defining paylines employed in the gaming machine 10. In the gaming machine 10, five paylines are set for a symbol matrix. The payline definition table shows that any of the first to third rows each constitutes a payline with respect to the first to fifth reels 52A, 52B, 52C, 52D, and 52E.

For example, this table shows that a payline "No. 1" is constituted of a second row of the first reel 52A (first column), a second row of the second reel 52B (second column), a second row of the third reel 52C (third column), a second row of the fourth reel 52D (fourth column), and a second row of the fifth reel 52E (fifth column).

In addition, this table shows that a payline "No. 2" is constituted of a first row of the first reel 52A (first column), a first row of the second reel 52B (second column), a first row of the third reel 52C (third column), a first row of the fourth reel 52D (fourth column), and a first row of the fifth reel 52E (fifth column).

In addition, this table shows that a payline "No. 3" is constituted of a third row of the first reel 52A (first column), a third row of the second reel 52B (second column), a third row of the third reel 52C (third column), a third row of the fourth reel 52D (fourth column), and a third row of the fifth reel 52E (fifth column).

In addition, this table shows that a payline "No. 4" is constituted of a first row of the first reel 52A (first column), a second row of the second reel 52B (second column), a third row of the third reel 52C (third column), a second row of the fourth reel 52D (fourth column), and a first row of the fifth reel 52E (fifth column).

In addition, this table shows that a payline "No. 5" is constituted of a third row of the first reel 52A (first column), a second row of the second reel 52B (second column), a first row of the third reel 52C (third column), a second row of the fourth reel 52D (fourth column), and a third row of the fifth reel 52E (fifth column).

Each of the paylines can be activated in accordance with a player's selection. However, all of the 5 paylines can be activated, regardless of whatsoever the amount of bets or the player's selection may be. A total number of paylines can be changed in accordance with a size of the symbol matrix, and other paylines can be appropriately set.

<Symbol Determination Table for Basic Game>

FIG. 10 shows an example of a symbol determination table for the basic game in the first embodiment.

In this example, the symbol determination table for the basic game is shown as a table defining the symbols in the first to fifth reels 52A, 52B, 52C, 52D, and 52E, symbol arrangement, and probabilities with which the respective symbols appear. The symbol determination table defines probabilities with which the symbols on each of the reels appear on a predetermined row of the symbol matrix (for example, a second row).

In this symbol determination table, weights appearing on the predetermined row are associated with the respective symbols of each of the reels, whereby the probabilities with which the symbols appear are defined. For example, with respect to a 2BAR symbol of a code number 00 on the first reel 52A, the weight is set to "6", and the appearance probability is set to 6/284 (although the 284 in the lowest row is a total weight, said row is merely indicated for the sake of convenience and does not need to be included in the symbol determination table).

<Payout Table>

FIG. 11 shows an example of a payout table in the first embodiment.

The payout table briefly shows a relationship between winning combinations and the respective payouts. This table shows how much a corresponding payout is in a case where any combination of symbols is displayed on the first to fifth reels 52A, 52B, 52C, 52D, and 52E on a defined payline. In this case, the symbols other than CHERRY symbols and BONUS symbols will be described. In a case where a part of a symbol combination may be any symbol, it is defined as (ANY). Although (ANY) symbols are set on the forth reel and the fifth reel for the sake of convenience, in the present embodiment, in a case where the (ANY) symbols are respectively displayed on the fourth reel and the fifth reel, it is denoted that any two symbols among the symbols on the first to fifth reels 52A, 52B, 52C, 52D, and 52E may be arbitrary symbols, and in a case where an (ANY) symbol is displayed on only the fifth reel, it is denoted that any one symbol among the symbols on the first to fifth reels may be an arbitrary symbol.

In addition, in a case where "1BAR/2BAR/3BAR" symbols or the like are shown, it is indicated that when any one of these three symbols is displayed, a condition is met.

With respect to the CHERRY symbols and the BONUS symbols, it is not required for any combination of these symbols to be displayed on a payline, and when a predetermined number or more of these symbols are displayed in the display window 56, each predetermined payout is awarded. In the payout table, payouts corresponding to the numbers of the CHERRY symbols or the BONUS symbols displayed in the display window 56 are shown.

In the gaming machine 10, the winning determination processing part 310 refers to the payout table each time a unit game is executed and determines whether or not a winning combination is established on a payline or whether or not the predetermined number or more of winning symbols are displayed in the display window 56. In a case where it is determined that a winning combination defined in the payout table is included on one of the paylines or the predetermined number or more of winning symbols are displayed in the display window 56, the winning determination processing part 310 detects the winning combination or the winning symbols and with reference to the payout table, checks a payout.

The payout processing part 314 pays out the determined amount of a payout. On the other hand, in a case where it is determined that a winning combination is not established by the symbols that have appeared on a payline and that the predetermined number or more of winning symbols are not displayed in the display window 56, the winning determination processing part 310 determines that a game outcome is the so-called "losing". The profit by the payout is awarded to a player by paying coins to the coin tray 92 or alternatively, adding credits equivalent to the amount of a payout.

<Game State Transition>

Figure 12:
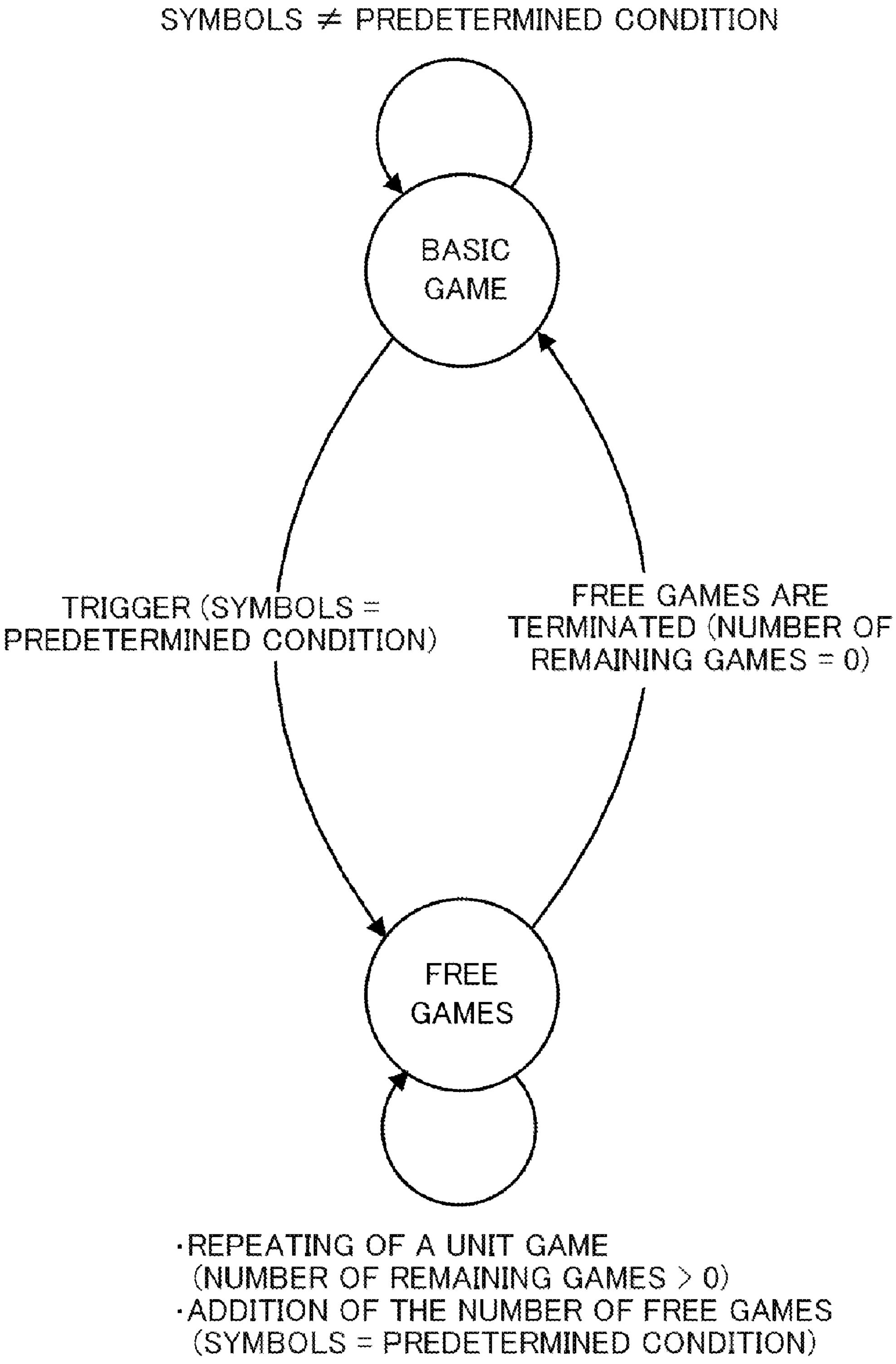
FIG. 12 is a diagram showing a pattern of state transition in the gaming machine.

FIG. 12 is a diagram showing a pattern of state transition in the gaming machine 10.

The gaming machine 10 executes two kinds of games: the basic game and the free games as a feature game. In the gaming machine 10, the basic game is executed as a main game, and when in the basic game, a trigger (event) has occurred, the game shifts to the feature game.

In the first embodiment, a condition on which the trigger occurs is that in the display window 56 of the symbol display unit 40, the BONUS symbols have been rearranged (three or more BONUS symbols have been rearranged) on a predetermined condition. Of course, other condition may be set as the condition on which the trigger occurs.

As can be understood from FIG. 12, in the basic game, a unit game is repeated until the BONUS symbols have been rearranged in the display window 56 of the symbol display unit 40 on the predetermined condition. In this basic game, when a combination of the symbols rearranged on a payline matches any winning combination shown in the payout table, coins whose number is in accordance with a payout for that combination are paid out. In addition, when in the display window 56, the predetermined number or more of the predetermined winning symbols have been rearranged, coins whose number is in accordance with a payout associated with the number of the rearranged winning symbols are paid out.

In the free games, a unit game similar to the unit game in the basic game is repeatedly executed without consuming any gaming media such as medals. When three or more BONUS symbols have been displayed, the number of free games is increased and when the number of remaining free games becomes "0" (that is, a value on the number-of-free-game counter 324 is zero), the game is terminated and the game reverts to the basic game.

In the first embodiment, the number of free games upon starting the free games is set to 10. In addition, in the free games, when in the display window 56 of the symbol display unit 40, the three or more BONUS symbols have been rearranged, the number of free games to be further added is determined to be five, and the five free games are added to the number of free games remaining at that time.

[Contents of Programs]

Next, with reference to FIG. 13 to FIG. 17, programs executed by the gaming machine 10 will be described.

<Main Control Processing>

Figure 13:
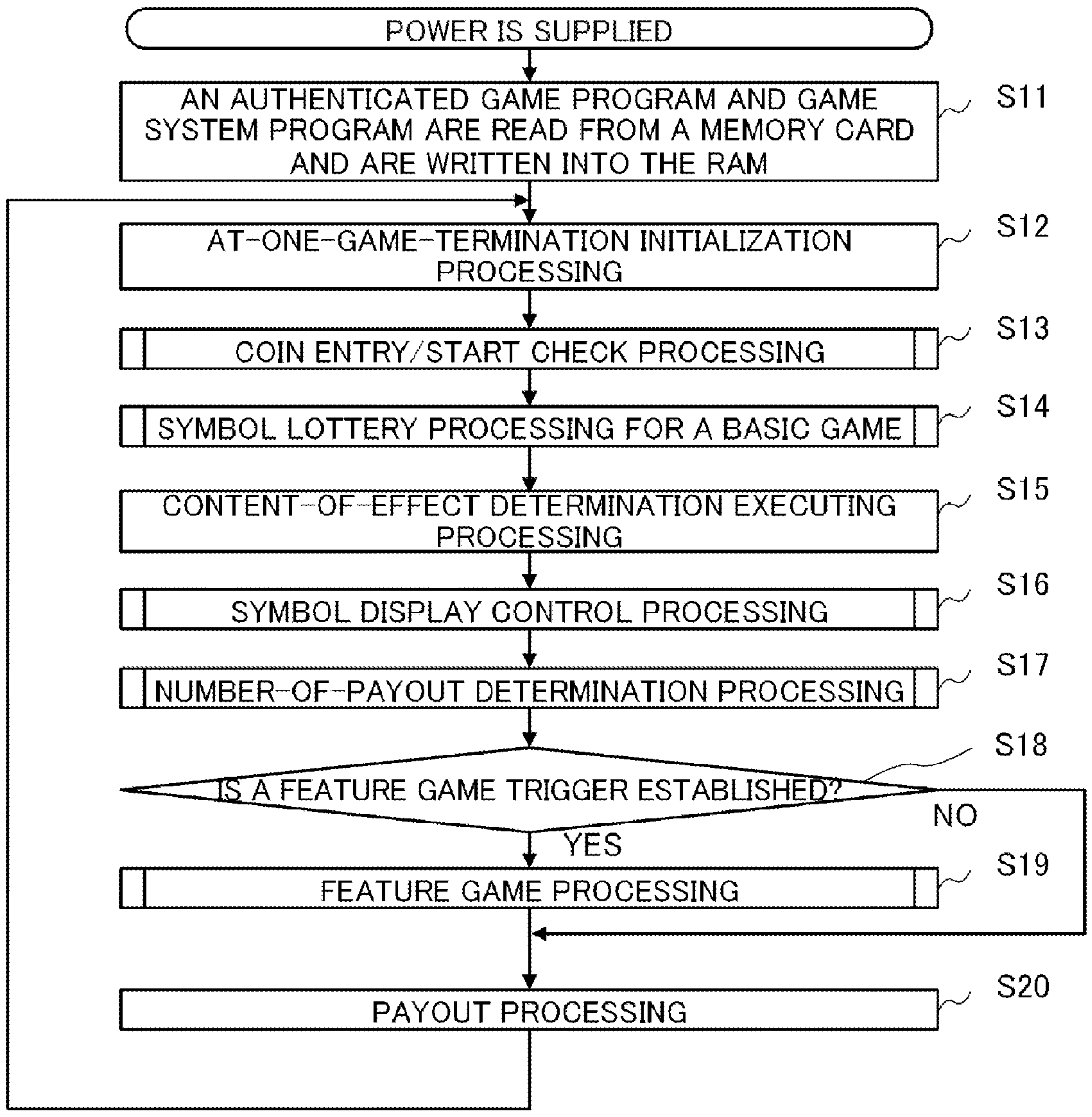
FIG. 13 is a flowchart of main control processing in the gaming machine.

First, with reference to FIG. 13, main control processing will be described. FIG. 13 is a flowchart of the main control processing in the gaming machine 10 according to the first embodiment of the present invention.

First, when power is supplied to the gaming machine 10, the main CPU 222 reads out the authenticated game program and game system program from the memory card 210 via the game board 200 and writes the read-out programs into the RAM 226 (step S11).

Next, the main CPU 222 conducts at-one-game-termination initialization processing (step S12). For example, data such as the number of BETs the symbols determined by conducting a lottery, which becomes unnecessary in the workspace of the RAM 226 each time one game is played, is cleared.

Figure 14:
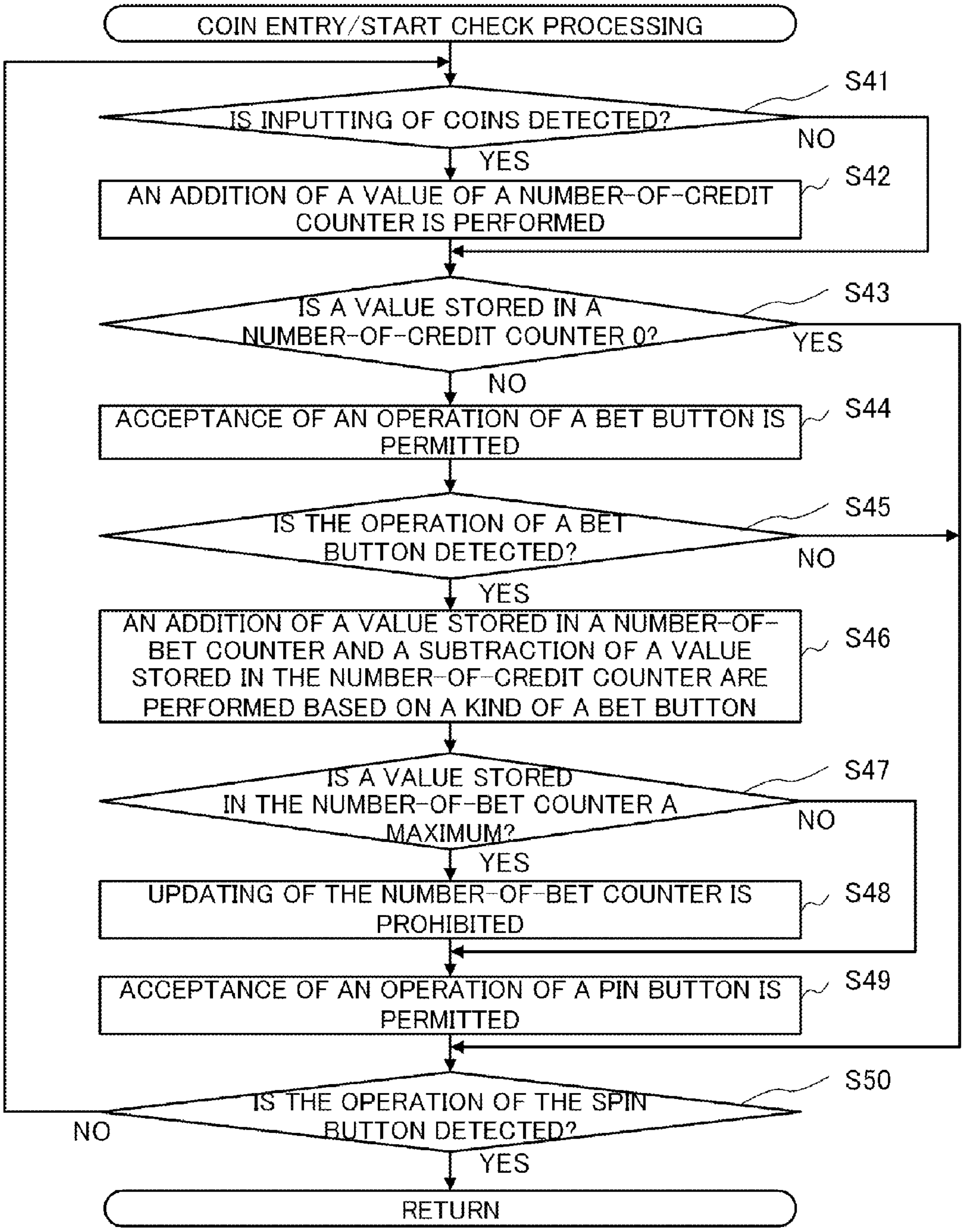
FIG. 14 is a flowchart of coin entry/start check processing in the gaming machine.

Next, the main CPU 222 conducts coin entry/start check processing to be described later with reference to FIG. 14 (step S13). In this processing, input check of any BET button and the spin button or the like is conducted.

Figure 15:
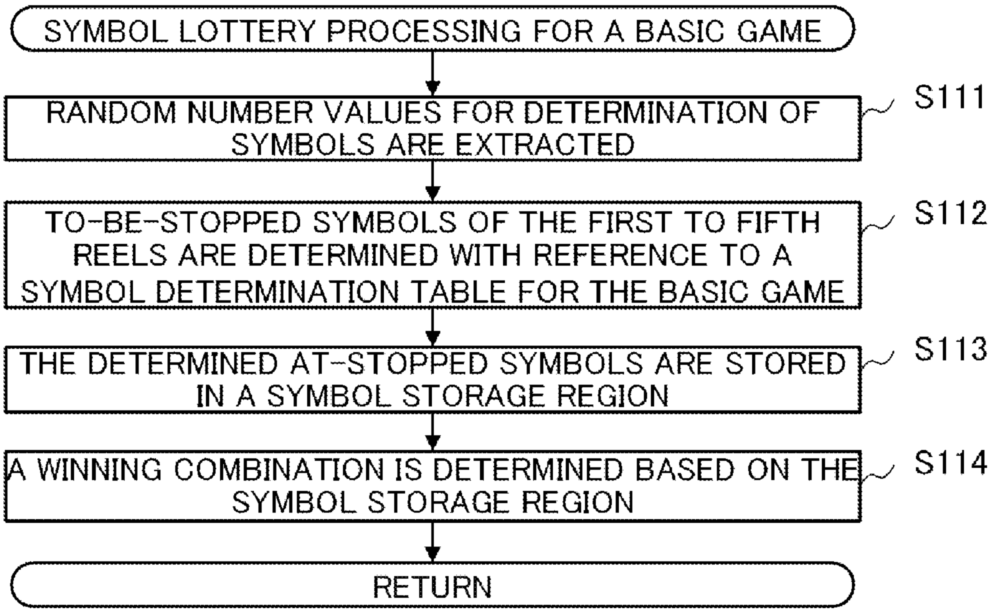
FIG. 15 is a flowchart of symbol lottery processing for the basic game in the gaming machine.

Next, the main CPU 222 conducts symbol lottery processing for the basic game to be described later with reference to FIG. 15 (step S14). In this processing, determination of to-be-stopped symbols based on random number values for determination of symbols is conducted.

Next, the effect control processing part 312 operatively executed by the main CPU 222 conducts content-of-effect determination executing processing (step S15). The main CPU 222 extracts random number values for effects, determines any of a plurality of predetermined contents of effects by conducting a lottery, and executes the contents of effects at the timing of the determined contents of effects. For example, the main CPU 222 conducts control in such a manner that a video image for effects is displayed on the video display unit 110, audio is outputted by the speaker 112, the lamp 114 is lit, and effect processing is applied to these contents, etc.

Next, the main CPU 222 conducts symbol display control processing to be described later with reference to FIG. 16 (step S16). In this processing, scrolling of symbol arrays of each of the reels is started, to-be-stopped symbols determined in the symbol lottery processing for the basic game at step S14 are stopped at their predetermined positions. In addition, light emission control for each of the reels is conducted based on the values of the BONUS symbols which are determined in the symbol lottery processing for the basic game at step S14.

Figure 17:
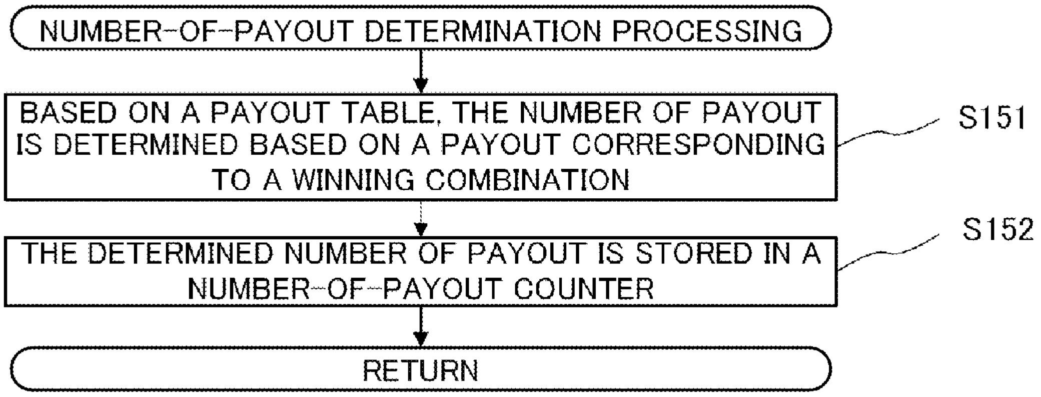
FIG. 17 is a flowchart of number-of-payout determination processing in the gaming machine.

Next, the main CPU 222 conducts number-of-payout determination processing to be described later with reference to FIG. 17 (step S17). In this processing, in the basic game, determination of the number of payout based on the payout table (FIG. 11) is conducted according to a combination of symbols which are displayed on a payline, and the determined number of payout is stored in the number-of-payout storage region which is provided in the RAM 226 (the number-of-payout counter 321).

Next, the main CPU 222 determines whether or not a feature game trigger is established (step S18). When the main CPU 222 determines that the feature game trigger is established (for example, the main CPU 222 determines that the feature game trigger is established in a case where the game mode is a feature game mode), the main CPU 222 conducts feature game processing to be described later with reference to FIG. 18 (step S19).

Next, after the processing at step S19, or at step S18, when the main CPU 222 determines that the feature game trigger is not established the main CPU 222 conducts payout processing (step S20). The main CPU 222 adds a value stored in the number-of-payout storage region (the number-of-payout counter 321) to a value stored in the number-of-credit storage region provided in the RAM 226 (the number-of-credit counter 320). One or more coins according to the number-of-payout counter 321 may be ejected from the coin payout opening by controlling the driving of the hopper 242. In addition, a ticket having a barcode attached thereon in which the number-of-payout counter 321 is recorded may be issued by controlling the driving of the ticket printer 120. After this processing has been conducted, the mode flag and the symbol value storage region or the like are cleared, and the game shifts to step S12.

<Coin Entry/Start Check Processing>

Next, with reference to FIG. 14, coin entry/start check processing will be described. FIG. 14 is a flowchart of the coin entry/start check processing in the gaming machine 10 according to the first embodiment of the present invention.

First, with the use of the input/credit check processing part 300 operatively executed by the main CPU 222, the main CPU 222 determines whether or not coin entry is detected by the coin counter 232 (step S41). When the main CPU 222 determines that the coin entry is detected, the main CPU 222 adds a value of the number of the entered coins to a value stored in the number-of-credit storage region (the number-of-credit counter 320) (step S42). In addition to the coin entry, it is determined by the bill validator 246 whether or not bill entry is detected, and when it is determined that the bill entry is detected, a value corresponding to the bill may be added to the number-of-credit counter 320.

After step S42 or at step S41, when the main CPU 222 determines that the coin entry is not detected, the main CPU determines whether or not the number-of-credit counter 320 is set to 0 (step S43). When the main CPU 222 determines that the number-of-credit counter 320 is not set to 0, the main CPU 222 permits acceptance of operation of any BET button (step S44).

Next, the main CPU 222 determines whether or not the operation of any BET button is detected (step S45). When the main CPU 222 detects that any BET button is pressed by a player with use of the BET switch, the main CPU 222 adds a value stored in the number-of-BET storage region which is provided in the RAM 226 (the number-of-BET counter 325), based on a kind of the BET button, and subtracts on the number-of-credit counter 320 (step S46).

Next, the main CPU 222 determines whether or not a value on the number-of-BET counter 325 is a maximum (step S47). When the main CPU 222 determines that the value on the number-of-BET counter 325 is the maximum, the main CPU 222 disables updating of the number-of-BET counter 325 (step S48). When the main CPU 222 determines that the value on the number-of-BET counter 325 is not the maximum subsequent to step S48 or in step S47, the main CPU 222 permits acceptance of operation of the spin button (step S49).

After step S49 or at step S45, when the main CPU 222 determines that the operation of the BET button is not detected, or alternatively, at step S43, when the main CPU 222 determines the number-of-credit counter 320 is set to 0, the main CPU 222 determines whether or not operation of the spin button is detected (step S50). When the main CPU 222 determines that the operation of the spin button is detected, the game shifts to step S41.

When the main CPU 222 determines that the operation of the spin button is detected, the main CPU 222 finishes the coin entry/start check processing.

<Symbol Lottery Processing for Basic Game>

Next, with reference to FIG. 15, symbol lottery processing for the basic game will be described. FIG. 15 is a flowchart of the symbol lottery processing for the basic game in the gaming machine 10 according to the first embodiment of the present invention.

First, the number-of-random generating processing part 302 operatively executed by the main CPU 222 extracts random number values for determination of symbols (step S111). Next, the symbol determination processing part 304 operatively executed by the main CPU 222 determines the to-be-stopped symbols of each of the reels by conducting a lottery (step S112). The main CPU 222 conducts the lottery with respect to each of the reels (first to fifth reels 52A, 52B, 52C, 52D, and 52E) and determines any of 22 symbols (code numbers “00” to “21”) as the to-be-stopped symbols, based on the symbol determination table for the basic game (shown in FIG. 10 (FIG. 31 in the second embodiment and FIG. 46 in the third embodiment)). At this time, the probabilities with which any of the 22 symbols (code numbers “00” to “21”) appear are determined in accordance with the weights in the symbol determination table.

Next, the main CPU 222 stores the determined to-be-stopped symbols of each of the reels in the symbol storage region that is provided in the RAM 226 (step S113). Next, the winning determination processing part 310 operatively executed by the main CPU 222 determines a winning combination based on a combination of the symbols which are stored in the symbol storage region with reference to the payout table (shown in FIG. 11 (FIG. 32 in the second embodiment and FIG. 47 in the third embodiment)) (step S114). The main CPU 222 determines whether or not a combination of the symbols displayed on a payline by each of the reels matches any combination of the symbols defined in the payout table or whether or not the predetermined number or more of predetermined winning symbols defined in the payout table have been rearranged in the display window 56 and determines a winning combination.

<Symbol Display Control Processing>

Next, with reference to FIG. 16, symbol display control processing will be described. FIG. 16 is a flowchart of the symbol display control processing in the gaming machine 10 according to the first embodiment of the present invention.

First, the reel control processing part 308 operatively executed by the main CPU 222 transmits a spinning control signal to each of the reel assemblies (not shown), and the reel driver 264 of each of the first to fifth reels 52A, 52B, 52C, 52D, and 52E supplies power to each of the reel motors 272 and then spins each of the first to fifth reels 52A, 52B, 52C, 52D, and 52E. In response thereto, the first to fifth reels 52A, 52B, 52C, 52D, and 52E respectively start spinning, and the symbol arrays assigned to the first to fifth reels 52A, 52B, 52C, 52D, and 52E scroll in the display window 56 of the symbol display unit 40 (step S131).

Next, the reel control processing part 308 operatively executed by the main CPU 222 conducts reel stop control (step S132). The spinning control signal includes information relevant to a stop position of each of the first to fifth reels 52A, 52B, 52C, 52D, and 52E, which is obtained from the to-be-stepped symbols in each of the reels stored in the symbol storage region. The reel driver 264 of each of the first to fifth reels 52A, 52B, 52C, 52D, and 52E controls the reel motor 272 and stops each of the first to fifth reels 52A, 52B, 52C, 52D, and 52E at the position which is indicated by the spinning control signal. In this manner, the reel motor 272 constituted of a stepping motor is stopped at a desired position, and scrolling of the symbol arrays is stopped such that the to-be-stopped symbols are located in the second row of the symbol matrix which is formed in the display window 56. In the first embodiment, the reels are stopped in the order of the first reel 52A, the second reel 52B, the third reel 52C, the fourth reel 52D, and the fifth reel 52E.

Lastly, the symbol display control processing is finished and the flow of execution reverts to the main processing.

<Number-of-Payout Determination Processing>

Next, with reference to FIG. 17, number-of-payout determination processing will be described. FIG. 17 is a flowchart of the number-of-payout determination processing in the gaming machine 10 according to the first embodiment of the present invention.

With reference to the symbol storage region and the payout table (shown in FIG. 11 (FIG. 32 in the second embodiment and FIG. 47 in the third embodiment)), the number-of-payout is determined based on a payout corresponding to any winning combination in the basic game (step S151). For example, when on the paylines across the first to fifth reels 52A, 52B, 52C, 52D, and 52E, SEVEN symbols are displayed on all of the reels, the winning combination is established as “SEVEN”, and based on the corresponding payout “500” (refer to the payout table shown in FIG. 11), the number of a payout is determined as “500”. It is to be noted that when “Losing” is established, the number of a payout is determined as “0”.

Subsequent to step S151, the payout processing part 314 operatively executed by the main CPU 222 stores the determined number of a payout in the number-of-payout counter 321 of the number-of-payout storage region (step S152). Upon having conducted this processing, the number-of-payout determination processing is finished.

<Feature Game Processing>

Figure 18:
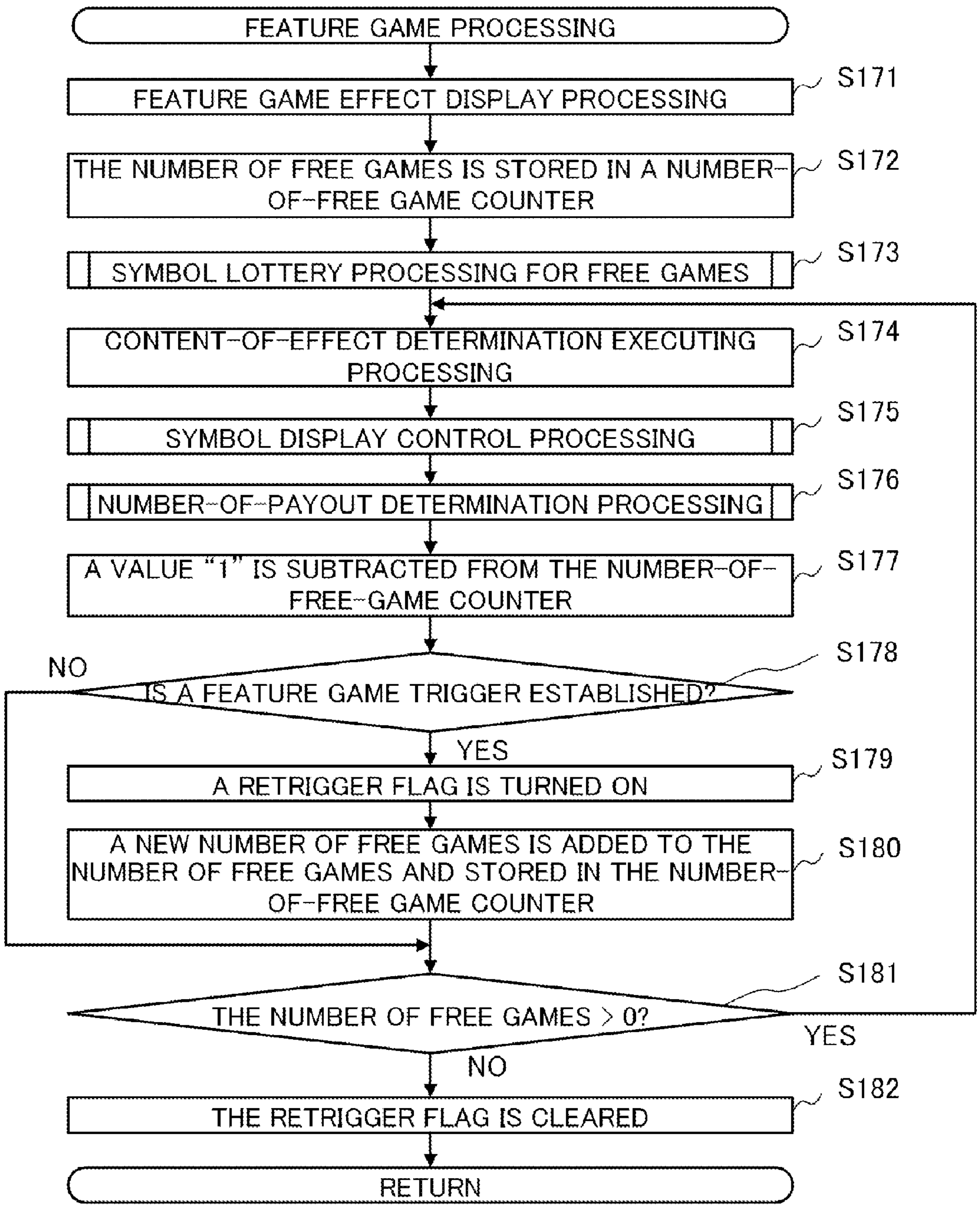
FIG. 18 is a flowchart of feature game processing in the gaming machine.

Next, with reference to FIG. 18, feature game processing will be described. FIG. 18 is a flowchart of the feature game processing in the gaming machine 10 according to the first embodiment of the present invention.

This processing is invoked in a case where it is determined that a feature game trigger is established in the main control processing shown in FIG. 13. First, the effect control processing part 312 operatively executed by the main CPU 222 conducts control to display an effect video image on the video display unit 110 in order to conduct effects related to the start of a feature game (step S171).

Next, the game counter processing part 306 operatively executed by the main CPU 222 sets the number of free games as 10 to the value stored in the number-of-free-game storage region (the number-of-free-game counter 324) (step S172). Subsequently, the game mode determination processing part 316 operatively executed by the main CPU 222 sets the game mode to the free game mode, and as described later, a unit game which is similar to that in the basic game is repeatedly conducted at 10 times (there is a case where the number of free games may be increased based on the later-described condition) according to the determined number of free games.

Figure 19:
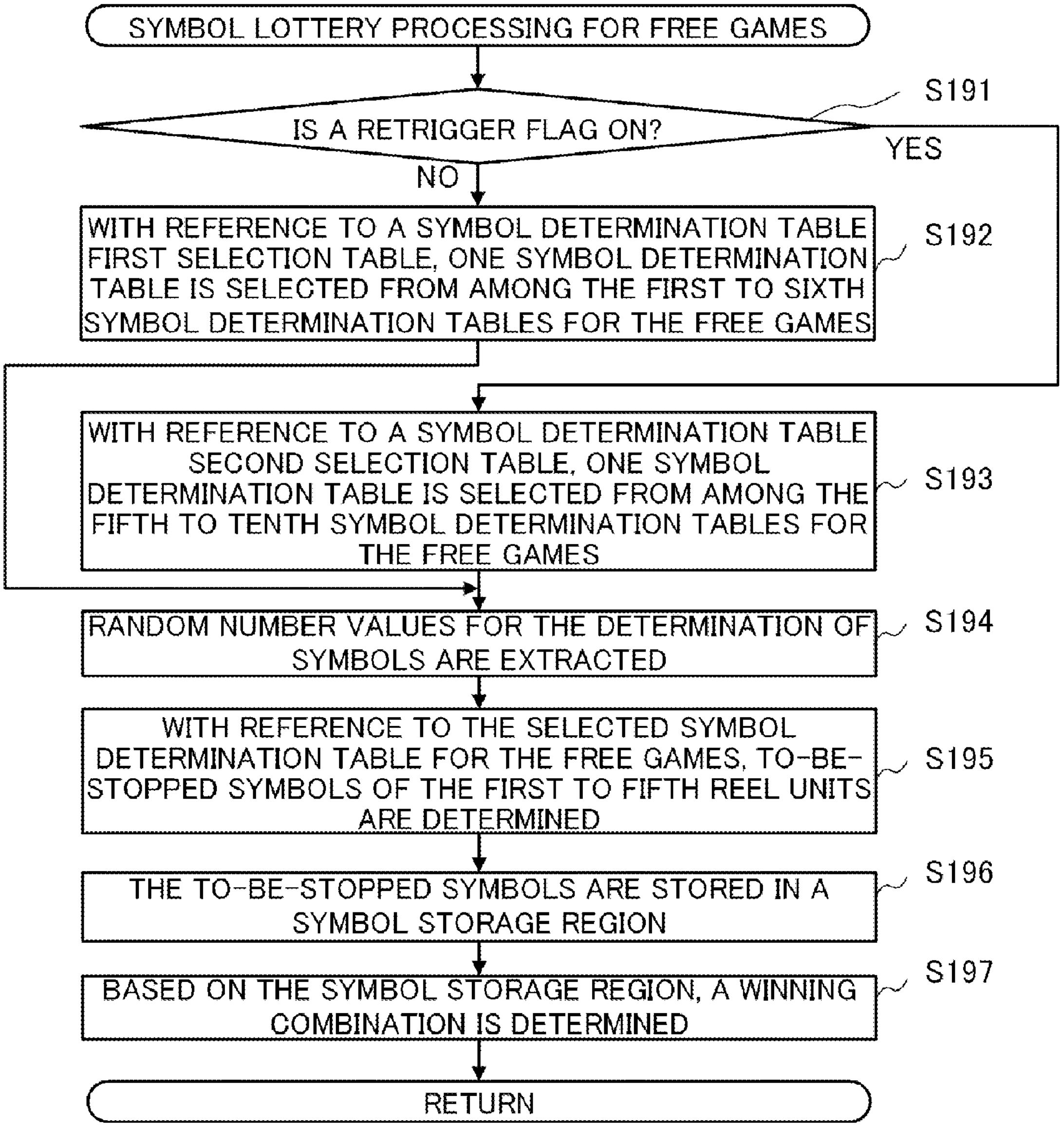
FIG. 19 is a flowchart of symbol lottery processing for free games in the gaming machine.

Next, the main CPU 222 conducts symbol lottery processing for the free games, later described with reference to FIG. 19 (step S173). In this processing, to-be-stopped symbols are determined based on the later-described first to tenth symbol determination tables for the free games and random number values for the determination of symbols.

Next, the effect control processing part 312 operatively executed by the main CPU 222 conducts content-of-effect determination executing processing (step S174). The main CPU 222 extracts effect random number values, determines any of a plurality of the predetermined contents of effects by conducting a lottery, and executes the contents of effects at the timing of the determined contents of effects. For example, an effect video image is displayed on the video display unit 110, audio (such as background music (BGM)) is outputted by the speaker 112, the lamp 114 is lit, and effect processing is applied to these elements, etc., thereby conducting control of a display mode or the like.

Figure 16:
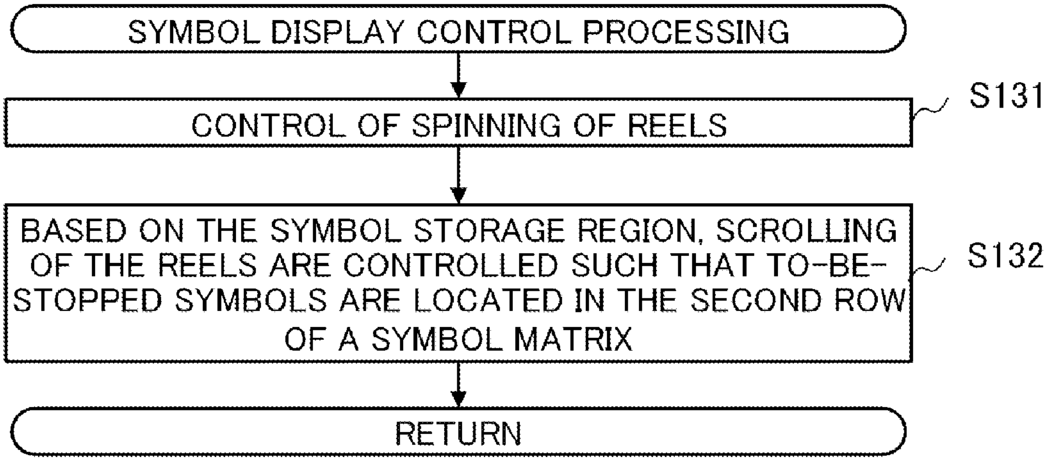
FIG. 16 is a flowchart of symbol display control processing in the gaming machine.

Next, the main CPU 222 conducts symbol display control processing which is similar to that in the main control processing shown in FIG. 16 (step S175). It is to be noted that the symbol display control processing at step S175 can be conducted prior to or in parallel with the execution of the contents of effects at step S174. Next, the main CPU 222 conducts number-of-payout determination processing which is similar to that in the main control processing shown in FIG. 16 (step S176).

Subsequently, the game counter processing part 306 operatively executed by the main CPU 222 subtracts "1" from a value on the number-of-free-game counter 324 in response to the termination of one free game (step S177). The main CPU 222 determines whether or not the feature game trigger is established as a result of the symbol lottery processing for the free games at step S173 (step S178), and if the feature game trigger is established (retrigger), the main CPU 222 turns on a retrigger flag stored in a predetermined region of the RAM 226 (step S179). Once this retrigger flag is turned on since the start of the free games, even if the retrigger is established again, the retrigger flag remains on until the value on the number-of-free-game counter 324 becomes zero and the free games are terminated. Thus, as in the later-described symbol lottery processing for the free games shown in FIG. 19, the processing executed before establishing the first retrigger and the processing executed after establishing the first retrigger are different from each other. Next, the game counter processing part 306 operatively executed by the main CPU 222 adds five as the number of free games to be newly added by the retrigger to the value stored in the number-of-free-game region (number-of-free-game counter 324) (step S180).

Next, the main CPU 222 determines whether or not the number-of-free-game counter 324 is set to 0 in a case where no feature game is established or in a case where the processing at step S180 is finished (step S181). When the number-of-free-game counter 324 is not set to 0, the main CPU 222 shifts the processing to step S173 in order to conduct a new free game. When the number-of-free-game counter 324 is set to 0, the main CPU 222 clears the retrigger flag (step S182) and finishes the feature game processing.

<Symbol Lottery Processing for Free Games>

Next, with reference to FIG. 19, symbol lottery processing for the free games will be described. FIG. 19 is a flowchart of the symbol lottery processing for the free games in the gaming machine 10 according to the first embodiment of the present invention.

First, the main CPU 222 determines whether or not the retrigger flag is on (step S191). When the retrigger flag is off, that is, when the retrigger is not established, with reference to a symbol determination table first selection table (FIG. 20A), the main CPU 222 selects one symbol determination table from among the first to sixth symbol determination tables for the free games (step S192). On the other hand, when the retrigger flag is on, that is, when the retrigger is established at one or more times, with reference to a symbol determination table second selection table (FIG. 20B), the main CPU 222 one symbol determination table from among the fifth to tenth symbol determination tables for the free games (step S193).

In the symbol determination table first selection table shown in FIG. 20A, weights corresponding to the seventh to tenth symbol determination tables for the free games among the first to tenth symbol determination tables for the free games are defined as zero. Accordingly, one symbol determination table is selected from among the first to sixth symbol determination tables for the free games. Here, in the first to sixth symbol determination tables for the free games (FIG. 21 to FIG. 26), probabilities with which the respective symbols appear are set so as to allow the retrigger to be easily established. More specifically, a probability with which the three or more BONUS symbols are rearranged in the display window 56 is set to be high (higher than a predetermined probability). Thus, it is made possible for the retrigger to be easily established when the retrigger has not been established.

Therefore, a player can play the games while expecting the addition of the number of free games since the start of the free games.

On the other hand, in the symbol determination table second selection table shown in FIG. 20B, weights corresponding to the first to fourth symbol determination tables for the free games among the first to tenth symbol determination tables for the free games are defined as zero. Accordingly, one symbol determination table is selected from among the fifth to tenth symbol determination tables for the free games. Here, in the seventh to tenth symbol determination tables (FIG. 27 to FIG. 30) among the fifth to tenth symbol determination tables for the free games, probabilities with which the respective symbols appear are set so as to allow the retrigger to be less easily established. More specifically, a probability with which the three or more BONUS symbols are rearranged in the display window 56 is set to be low (lower than a predetermined probability). Thus, it is made possible for the retrigger to be less easily established when the retrigger has once been established.

Therefore, the excessive addition of the free games for a player can be prevented. In addition, even after free games have once been added to the number of games, although the probability with which the retrigger is established is lowered, a player can play the games while further expecting the addition of the free games to the number of games.

Further, each of the first to tenth symbol determination tables for the free games is selected by conducting a lottery for each game. In addition, the probabilities, with which the three or more BONUS symbols are rearranged in the display window 56, in the respectively selected symbol determination tables are set to be different from one another. Accordingly, in the case where the three or more BONUS symbols are easily rearranged in the display window 56 as well as in the case where the three or more BONUS symbols are less easily rearranged in the display window 56, the variation of said probabilities is increased, thus allowing the games to be prevented from becoming monotonous.

Further, in the first and tenth symbol determination tables for the free games (FIG. 21 and FIG. 30), appearance probabilities of the respective symbols are set such that the SEVEN symbols are easily rearranged on the "No. 5" payline. In the second and seventh symbol determination tables for the free games (FIG. 22 and FIG. 27), appearance probabilities of the respective symbols are set such that the SEVEN symbols are easily rearranged on the "No. 1" payline. In the third and eighth symbol determination tables for the free games (FIG. 23 and FIG. 28), appearance probabilities of the respective symbols are set such that the SEVEN symbols are easily rearranged on the "No. 2" payline. In the fourth and ninth symbol determination tables for the free games (FIG. 24 and FIG. 29), appearance probabilities of the respective symbols are set such that the SEVEN symbols are easily rearranged on the "No. 3" payline. In the fifth symbol determination table for the free games (FIG. 25), appearance probabilities of the respective symbols are set such that the SEVEN symbols are easily rearranged on the "No. 4" and "No. 5" paylines. In the sixth symbol determination table for the free games (FIG. 26), appearance probabilities of the respective symbols are set such that the SEVEN symbols are easily rearranged on the "No. 4" payline. Thus, it is made possible to vary the paylines for each of the free games, on which the SEVEN symbols are easily rearranged.

Accordingly, in the free games, in accordance with the selected symbol determination table, the payline on which the SEVEN symbol combination is established is varied each time the game is played. Thus, diversity can be imparted to the patterns, in each of which the winning obtained by the SEVEN symbol combination is established.

Next, the random number generation processing part 302 operatively executed by the main CPU 222 extracts random number values for the determination of symbols (step S194). The symbol determination processing part 304 operatively executed by the main CPU 222 determines to-be-stopped symbols of each of the reels by conducting a lottery based on the random number values extracted at step S194 (step S195). The main CPU 222 conducts the lottery with respect to each of the reels (the first to fifth reels 52A, 52B, 52C, 52D, and 52E) and based on the one symbol determination table selected at step S192 or step S193 from among the first to tenth symbol determination tables for the free games (FIG. 21 to FIG. 30), determines any of 22 symbols (code numbers "00" to "21") as the to-be-stopped symbols. At this time, the appearance probabilities of the 22 symbols (code numbers "00" to "21") are in accordance with the weights in each of the symbol determination tables.

Next, the main CPU 222 stores the to-be-stopped symbols of each of the reels in the symbol storage region provided in the RAM 226 (step S196). Next, with reference to the payout table (FIG. 11), the winning determination processing part 310 executed by the main CPU 222 determines a winning combination based on a combination of the symbols stored in the symbol storage region (step S197). The main CPU 222 determines whether or not a combination of symbols displayed on a payline by each of the reels matches any symbol combination defined in the payout table or whether or not the predetermined number or more of the predetermined winning symbols defined in the payout table are rearranged in the display window 56, thereby determining a winning combination.

In the first embodiment, although the number of free games which is set immediately after shifting to the free games is set to 10, the number thereof is not limited thereto and may be less than 10 or exceed 10. In addition, although the number of additional games to be added when the retrigger is established is five, the number thereof is not limited thereto and the number thereof may be less than five or exceed five.

In addition, in the first embodiment, although the condition on which the retrigger is established is that the three or more BONUS symbols are rearranged in the display window 56, the condition is not limited thereto. The condition may be that any symbols other than the BONUS symbols are rearranged therein, or may be that, for example, four or more symbols are rearranged in the display window 56.

Second Embodiment

Hereinbefore, the first embodiment is described. Hereinafter, a second embodiment will be described. It is to be noted that the description regarding parts of a configuration in common with those of the first embodiment is omitted and only parts of the configuration differing from those of the first embodiment will be described with reference to the accompanying drawings.

<Symbol Determination Table for Basic Game>

FIG. 31 shows an example of a symbol determination table for a basic game in the second embodiment. In said table, arrangement of symbols on each of the first to fifth reels 52A, 52B, 52C, 52D, and 52E and values of corresponding weights are different from those in the first embodiment. However, a basic function thereof is the same as that of the symbol determination table for the basic game (FIG. 10) in the first embodiment.

<Payout Table>

FIG. 32 shows an example of a payout table in the second embodiment. In said table, kinds of symbols are partly different from those in the first embodiment. However, a basic function thereof is the same as that of the payout table (FIG. 11) in the first embodiment.

<Game State Transition>

Figure 33:
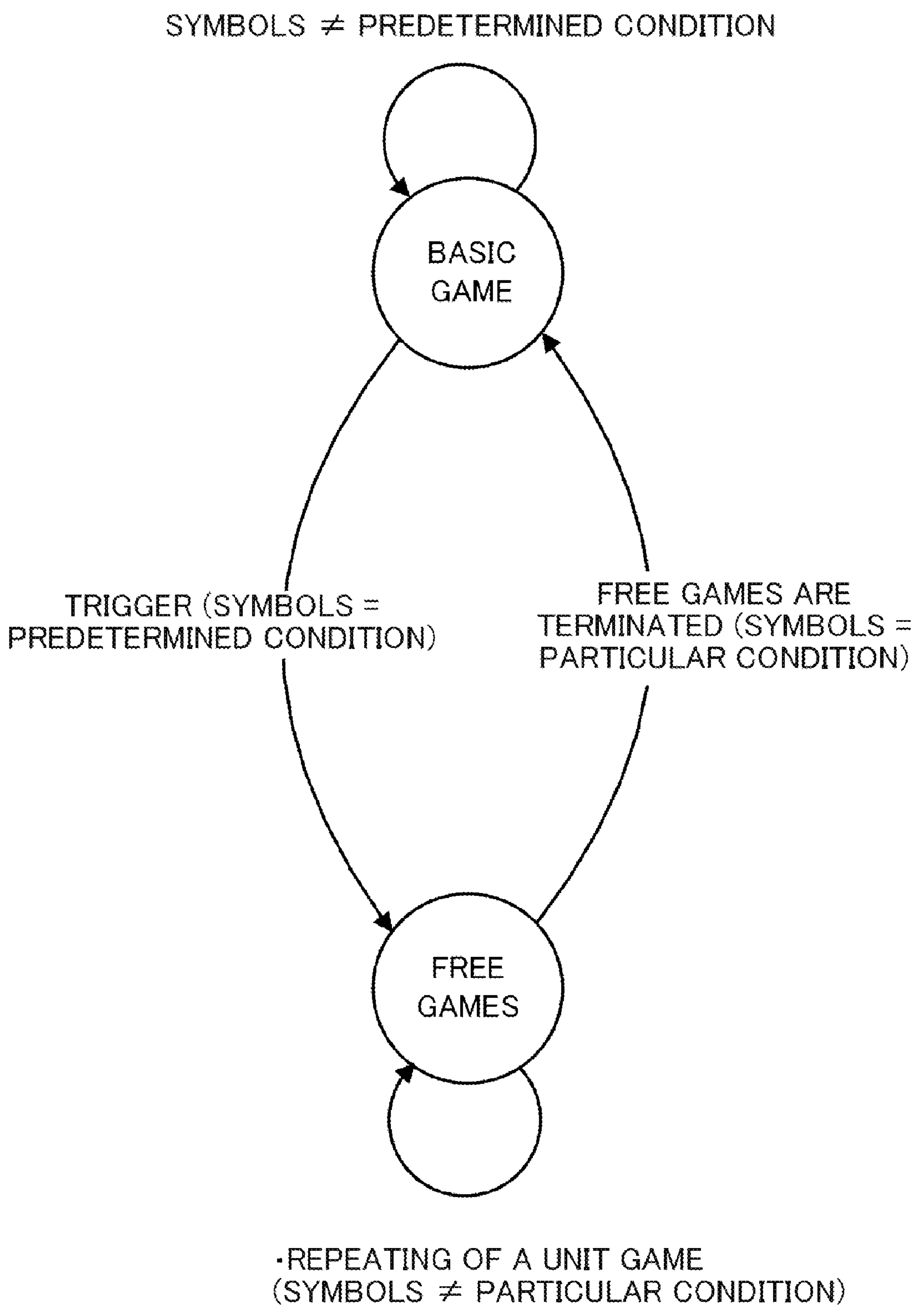
FIG. 33 is a diagram showing a pattern of state transition in a gaming machine.

FIG. 33 is a diagram showing a pattern of state transition in a gaming machine 10 in the second embodiment.

The gaming machine 10 executes two kinds of games: a basic game and free games as a feature game. In the gaming machine 10, the basic game is executed as a main game, and when in the basic game, a trigger (event) has occurred, the game shifts to the feature game.

In the second embodiment, a condition on which the trigger occurs is that predetermined symbols have been rearranged on a payline defined in the payline definition table (FIG. 9) on a predetermined condition. This predetermined condition is that a combination of symbols rearranged on a payline is a combination of SEVEN symbols or BELL symbols. Of course, other condition may be set as the condition on which the trigger occurs.

As can be understood from FIG. 33, in the basic game, a unit game is repeated until the predetermined symbols have been rearranged on a payline defined in the payline definition table (FIG. 9) on the predetermined condition. In this basic game, when a combination of the symbols rearranged on a payline matches any winning combination shown in the payout table, coins whose number is in accordance with a payout for that combination are paid out. In addition, when in the display window 56, the predetermined number or more of the predetermined winning symbols have been rearranged, coins whose number is in accordance with a payout associated with the number of the rearranged winning symbols are paid out.

In the free games, a unit game similar to the unit game in the basic game is repeatedly executed without consuming any gaming media such as medals. When a COIN symbol is rearranged in a region corresponding to the fourth reel 52D or the fifth reel 52E in the display window 56 (a particular condition is established), the game is terminated and the game reverts to the basic game.

In the second embodiment, upon starting the free games, the number of free games is not set. The free games are continued until the COIN symbol is rearranged in the region corresponding to the fourth reel 52D or the fifth reel 52E in the display window 56. However, as described later, when the number of free games which have already been played is three or less, the COIN symbol is set so as not to be rearranged. Accordingly, a player can play at least three free games.

<Feature Game Processing>

Figure 34:
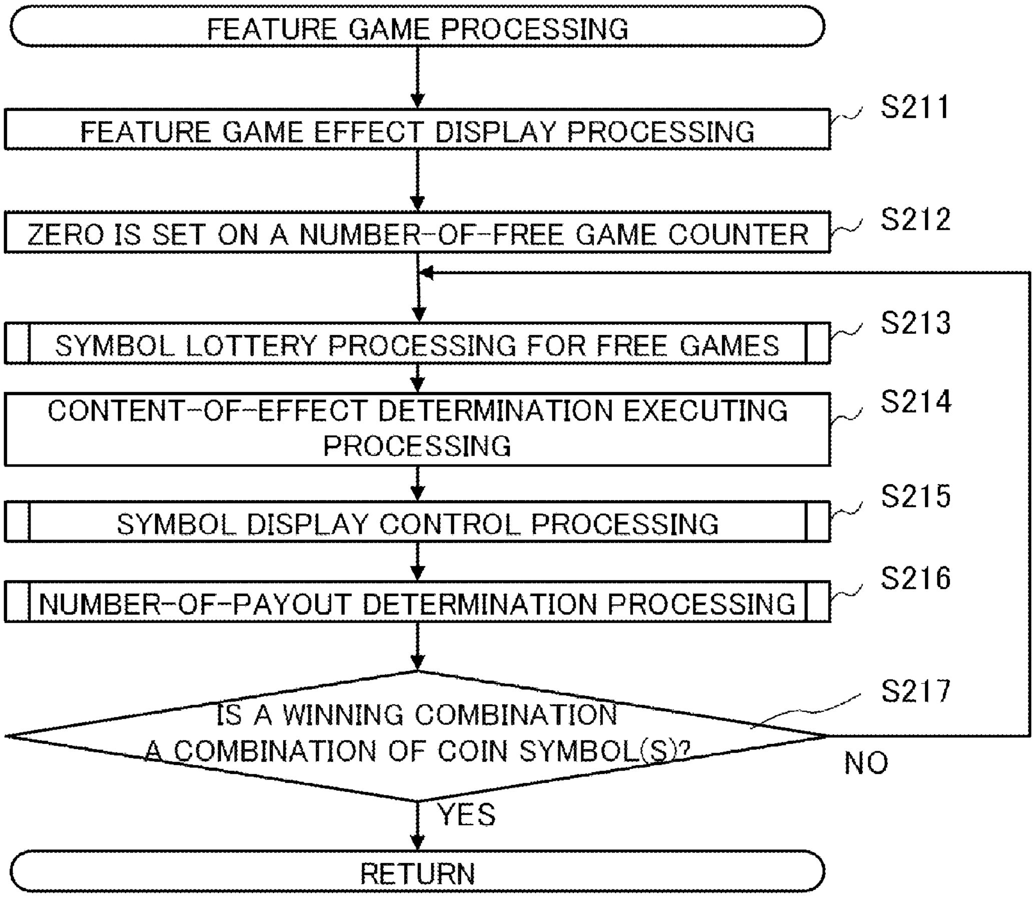
FIG. 34 is a flowchart of feature game processing in the gaming machine.

Next, with reference to FIG. 34, feature game processing will be described. FIG. 34 is a flowchart of the feature game processing in the gaming machine 10 according to the second embodiment of the present invention.

This processing is invoked in a case where it is determined that a feature game trigger is established in the main control processing shown in FIG. 13. First, the effect control processing part 312 operatively executed by the main CPU 222 conducts control to display an effect video image on the video display unit 110 in order to conduct effects related to the start of a feature game (step S211).

Next, the game counter processing part 306 operatively executed by the main CPU 222 sets zero to a value stored in the number-of-free-game storage region (the number-of-free-game counter 324) (step S212). In the second embodiment, the number-of-free-game counter 324 indicates the number of free games which a player has already played. Subsequently, the game mode determination processing part 316 operatively executed by the main CPU 222 sets the game mode to the free game mode, and as described later, a unit game which is similar to that in the basic game is repeatedly conducted until the COIN symbol is rearranged in the part corresponding to the fourth reel 52D or the fifth reel 52E in the display window 56.

Figure 35:
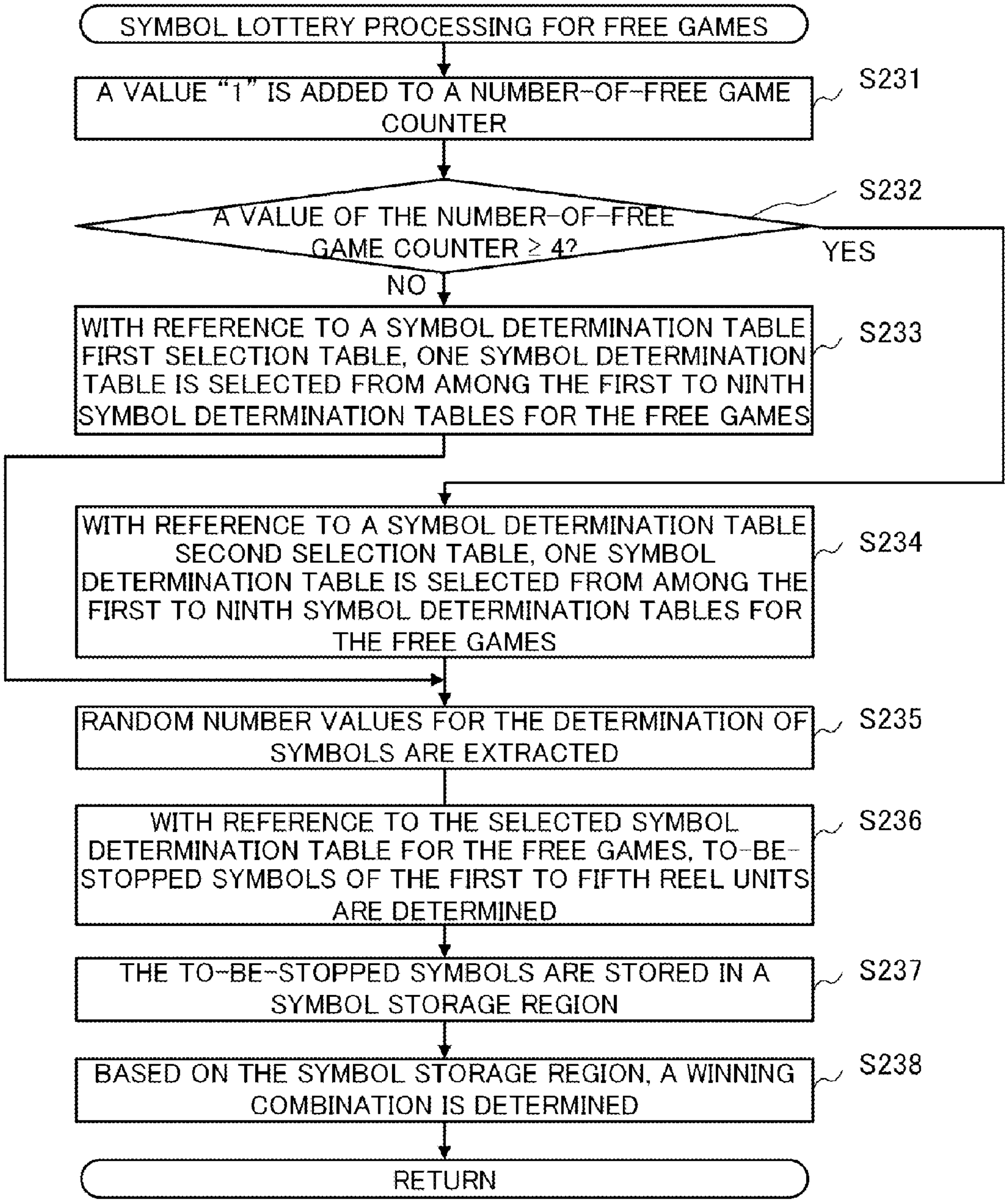
FIG. 35 is a flowchart of symbol lottery processing for free games in the gaming machine.

Next, the main CPU 222 conducts symbol lottery processing for the free games, later described with reference to FIG. 35 (step S213). In this processing, to-be-stopped symbols are determined based on the later-described first to ninth symbol determination tables for the free games and random number values for the determination of symbols.

Next, the effect control processing part 312 operatively executed by the main CPU 222 conducts content-of-effect determination executing processing (step S214). The specific processing which the main CPU 222 executes is the same as that in the first embodiment.

Next, the main CPU 222 conducts symbol display control processing which is similar to that in the main control processing shown in FIG. 16 (step S215). It is to be noted that the symbol display control processing at step S215 can be conducted prior to or in parallel with the execution of the contents of effects at step S214. Next, the main CPU 222 conducts number-of-payout determination processing which is similar to that in the main control processing shown in FIG. 16 (step S216).

Next, the main CPU 222 determines whether or not a winning combination of the COIN symbols appears, that is, whether or not the COIN symbol is rearranged in the region corresponding to the fourth reel 52D or the fifth reel 52E in the display window 56 (step S217). When the winning combination of the COIN symbols does not appear, the main CPU 222 shifts the processing to step S213 in order to conduct a new free game. When the winning combination of the COIN symbols appears, the main CPU 222 finishes the feature game processing.

<Symbol Lottery Processing for Free Games>

Next, with reference to FIG. 35, symbol lottery processing for the free games will be described. FIG. 35 is a flowchart of the symbol lottery processing for the free games in the gaming machine 10 according to the second embodiment of the present invention.

First, the game counter processing part 306 operatively executed by the CPU 222 adds one to the number-of-free-game counter 324 (step S231). Next, the main CPU 222 determines whether or not a value on the number-of-free-game counter 324 is four or more (step S232). When a value on the number-of-free-game counter 324 is three or less, that is, when the number of free games which have already been played is three or less, with reference to a symbol determination table first selection table (FIG. 36A), the main CPU 222 selects one symbol determination table from among the first to ninth symbol determination tables for the free games (step S233). On the other hand, when a value on the number-of-free-game counter 324 is four or more, that is, when the number of free games which have already been played is four or more, with reference to a symbol determination table second selection table (FIG. 36B), the main CPU 222 selects one symbol determination table from among the first to ninth symbol determination tables for the free games (step S234).

Here, the first to ninth symbol determination tables for the free games (FIG. 37 to FIG. 45) in the second embodiment will be described. In the first symbol determination table for the free games (FIG. 37), appearance probabilities of the respective symbols are set such that the BELL symbols are easily rearranged on the “No. 1” payline. Further, the appearance probabilities of the respective symbols are set such that when the first reel 52A and the second reel 52B are stopped, the BELL symbols are invariably rearranged on the “No. 1” payline. Therefore, a ready-to-win combination of the BELL symbols is invariably established.

In the second symbol determination table for the free games (FIG. 38), appearance probabilities of the respective symbols are set such that the BELL symbols are easily rearranged on the “No. 4” payline. Further, the appearance probabilities of the respective symbols are set such that when the first reel 52A and the second reel 52B are stopped, the BELL symbols are invariably rearranged on the “No. 4” payline. Therefore, a ready-to-win combination of the BELL symbols is invariably established.

In the third symbol determination table for the free games (FIG. 39), appearance probabilities of the respective symbols are set such that the BELL symbols are easily rearranged on the "No. 5" payline. Further, the appearance probabilities of the respective symbols are set such that when the first reel 52A and the second reel 52B are stopped, the BELL symbols are invariably rearranged on the "No. 5" payline. Therefore, a ready-to-win combination of the BELL symbols is invariably established.

In the fourth symbol determination table for the free games (FIG. 40), appearance probabilities of the respective symbols are set such that the SEVEN symbols are easily rearranged on the "No. 1" or "No. 5" payline. Further, the appearance probabilities of the respective symbols are set such that when the first reel 52A and the second reel 52B are stopped, the SEVEN symbols are invariably rearranged on the "No. 1" or "No. 5" payline. Therefore, a ready-to-win combination of the SEVEN symbols is invariably established.

In the fifth symbol determination table for the free games (FIG. 41), appearance probabilities of the respective symbols are set such that the SEVEN symbols are easily rearranged on the "No. 1" or "No. 4" payline. Further, the appearance probabilities of the respective symbols are set such that when the first reel 52A and the second reel 52B are stopped, the SEVEN symbols are invariably rearranged on the "No. 1" or "No. 4" payline. Therefore, a ready-to-win combination of the SEVEN symbols is invariably established.

In the sixth symbol determination table for the free games (FIG. 42), appearance probabilities of the respective symbols are set such that the COIN symbol is likely to be rearranged in the region corresponding to the fourth reel 52D in the display window 56 and the COIN symbol is likely to be rearranged in the region corresponding to the fifth reel 52E in the display window 56. Further, the appearance probabilities of the respective symbols are set such that when the first reel 52A and the second reel 52B are stopped, the SEVEN symbols are invariably rearranged on the "No. 1", "No. 4", or "No. 5" payline. Therefore, a ready-to-win combination of the SEVEN symbols is invariably established.

In the seventh symbol determination table for the free games (FIG. 43), appearance probabilities of the respective symbols are set such that the COIN symbol is likely to be rearranged in the region corresponding to the fourth reel 52D in the display window 56 and the COIN symbol is likely to be rearranged in the region corresponding to the fifth reel 52E in the display window 56. Further, the appearance probabilities of the respective symbols are set such that when the first reel 52A and the second reel 52B are stopped, the BELL symbols are invariably rearranged on the "No. 1", "No. 4", or "No. 5" payline. Therefore, a ready-to-win combination of the BELL symbols is invariably established.

In the eighth symbol determination table for the free games (FIG. 44), appearance probabilities of the respective symbols are set such that when the first reel 52A and the second reel 52B are stopped, the SEVEN symbols are invariably rearranged on the "No. 1", "No. 4", or "No. 5" payline. Therefore, a ready-to-win combination of the SEVEN symbols is invariably established.

In the ninth symbol determination table for the free games (FIG. 45), appearance probabilities of the respective symbols are set such that when the first reel 52A and the second reel 52B are stopped, the BELL symbols are invariably rearranged on the "No. 1", "No. 4", or "No. 5" payline. Therefore, a ready-to-win combination of the BELL symbols is invariably established.

As described above regarding the first to ninth symbol determination tables for the free games in the second embodiment, each payline on which the winning symbols are rearranged can be varied each time each of the free games is played. Thus, diversity can be imparted to patterns, in each of which the BELL or SEVEN winning combination is established. In addition, each payline on which the ready-to-win combination is established can be varied each time each of the free games is played. Thus, diversity can be imparted to patterns, in each of which the ready-to-win combination for the BELL or SEVEN winning combination is displayed. In addition, since the ready-to-win combination for the BELL or SEVEN winning combination is invariably established, a player can play the games while having a sense of expectation that the BELL or SEVEN winning combination could be established.

In the symbol determination table first selection table shown in FIG. 36A, weights corresponding to the sixth, seventh, and ninth symbol determination tables for the free games among the first to ninth symbol determination tables for the free games are defined as zero. Accordingly, one symbol determination table is selected from among the first to fifth and eighth symbol determination tables for the free games. In addition, said symbol determination table first selection table is selected when the number of free games which have already been played is three or less. Therefore, when the number of free games which have already been played is three or less, there is no likelihood that the COIN symbol is rearranged in the region corresponding to each of the fourth reel 52D and the fifth reel 52E in the display window 56. Therefore, it does not occur that the free games are terminated. Thus, a player can be provided with at least three free games.

On the other hand, in the symbol determination table second selection table shown in FIG. 36B, weights corresponding to the sixth and ninth symbol determination tables for the free games among the first to ninth symbol determination tables for the free games are defined as zero. Accordingly, one symbol determination table is selected from among the first to fifth, seventh, and eighth symbol determination tables for the free games. In addition, said symbol determination table second selection table is selected when the number of free games which have already been played is four or more. Therefore, since when the number of free games which have already been played is four or more, the COIN symbol is likely to be rearranged in the region corresponding to the fourth reel 52D in the display window 56 and the COIN symbol is likely to be rearranged in the region corresponding to the fifth reel 52E in the display window 56, there may be a case where the free games are terminated. Accordingly, a player can play the games while having a sense of expectation that the BELL or SEVEN winning combination could be established as well as a sense of tension that after the ready-to-win combination has been displayed, the COIN symbol would be rearranged and the free games could be thereby terminated. In addition, since the reels are stopped in the order from the first reel 52A to the fifth reels 52E, a player cannot recognize that the COIN symbol is rearranged and the free games are thereby terminated until either the fourth reel 52D or the fifth reel 52E is stopped. Thus, it is made possible to prevent a player from recognizing in an early stage while playing one of the free games that the free games are terminated.

During the free games, in all of the games, the sixth and the ninth symbol determination tables for the free games are not selected. The reason for this is that with respect to the sixth symbol determination table for the free games (FIG. 42), it is heartless to a player, who is expecting that the SEVEN winning combination leading to a large payout could be established, to terminate the free games by rearranging the COIN symbol when the ready-to-win combination of the SEVEN symbols has been established. In addition, another reason for this is that with respect to the ninth symbol determination table for the free games (FIG. 45), said table has the same function as that of each of the first to third symbol determination tables for the free games (FIG. 37 to FIG. 39). In other words, when each of the first to third symbol determination tables for the free games is selected, even after the ready-to-win combination of the BELL symbols is established, there is a case where the BELL winning combination is not established. However, the weights which the symbol determination table first and second selection table have are not limited to the above-described weights. For example, in the symbol determination table first selection table, the weight corresponding to the ninth symbol determination table for the free games may be defined as being larger than zero and the ninth symbol determination table for the free games may be thereby selected. In addition, in the symbol determination table second selection table, weights corresponding to the sixth and ninth symbol determination tables for the free games may be defined as being larger than zero and the sixth and ninth symbol determination tables for the free games may be thereby selected. In other words, when the number of free games which have already been played is four or more, the sixth symbol determination table for the free games may be likely to be selected and in all games of the free games, the ninth symbol determination table for the free games may be likely to be selected.

Next, the random number generation processing part 302 operatively executed by the main CPU 222 extracts random number values for the determination of symbols (step S235). The symbol determination processing part 304 operatively executed by the main CPU 222 determines to-be-stopped symbols of each of the reels by conducting a lottery based on the random number values extracted at step S235 (step S236). The main CPU 222 conducts the lottery with respect to each of the reels (the first to fifth reels 52A, 52B, 52C, 52D, and 52E) and determines any of 22 symbols (code numbers "00" to "21") as the to-be-stopped symbols based on one symbol determination table selected at step S233 or step S234 among the first to ninth symbol determination tables for the free games (FIG. 37 to FIG. 45). At this time, appearance probabilities of the 22 symbols (code numbers "00" to "21") are defined in accordance with the weights in the symbol determination table.

Next, the main CPU 222 stores the to-be-stopped symbols of each of the reels in a symbol storage region provided in the RAM 226 (step S237). Next, with reference to the payout table (FIG. 32), the winning determination processing part 310 operatively executed by the main CPU 222 determines a winning combination based on the combination of symbols stored in the symbol storage region (step S238). The main CPU 222 determines whether or not a combination of symbols on a payline displayed by each of the reels matches any combination of symbols defined in the payout table or whether or not a predetermined number or more of predetermined winning symbols defined in the payout table are rearranged in the display window 56, thereby determining a winning combination.

In the second embodiment, when the COIN symbol is rearranged in the region corresponding to the fourth reel 52D or the fifth reel 52E in the display window 56, the free games are terminated. When the number of free games which have already been played is four or more, the seventh symbol determination table for the free games in which the COIN symbol is rearranged is likely to be selected. However, the case where said table is selected is not limited to the case where the number of free games which have already been played is four or more, and the case where said table is selected may be a case where the number of free games which have already been played is n or more (n is a natural number excluding four).

Third Embodiment

Hereinbefore, the first and second embodiment are described. Hereinafter, a third embodiment will be described. It is to be noted that the description regarding parts of a configuration in common with those of the first and second embodiments is omitted and only parts of the configuration differing from those of the first and embodiments will be described with reference to the accompanying drawings.

<Symbol Determination Table for Basic Game>

FIG. 46 shows an example of a symbol determination table for a basic game in the third embodiment. In said table, arrangement of symbols on each of the first to fifth reels 52A, 52B, 52C, 52D, and 52E and values of corresponding weights are different from those in the first embodiment. However, a basic function is the same as that of the symbol determination table for the basic game (FIG. 10) in the first embodiment.

<Payout Table>

FIG. 47 shows an example of a payout table in the third embodiment. In said tables, kinds of symbols are partly different from those in the first embodiment. However, a basic function is the same as that of the payout table (FIG. 11) in the first embodiment.

<Game State Transition>

Figure 48:
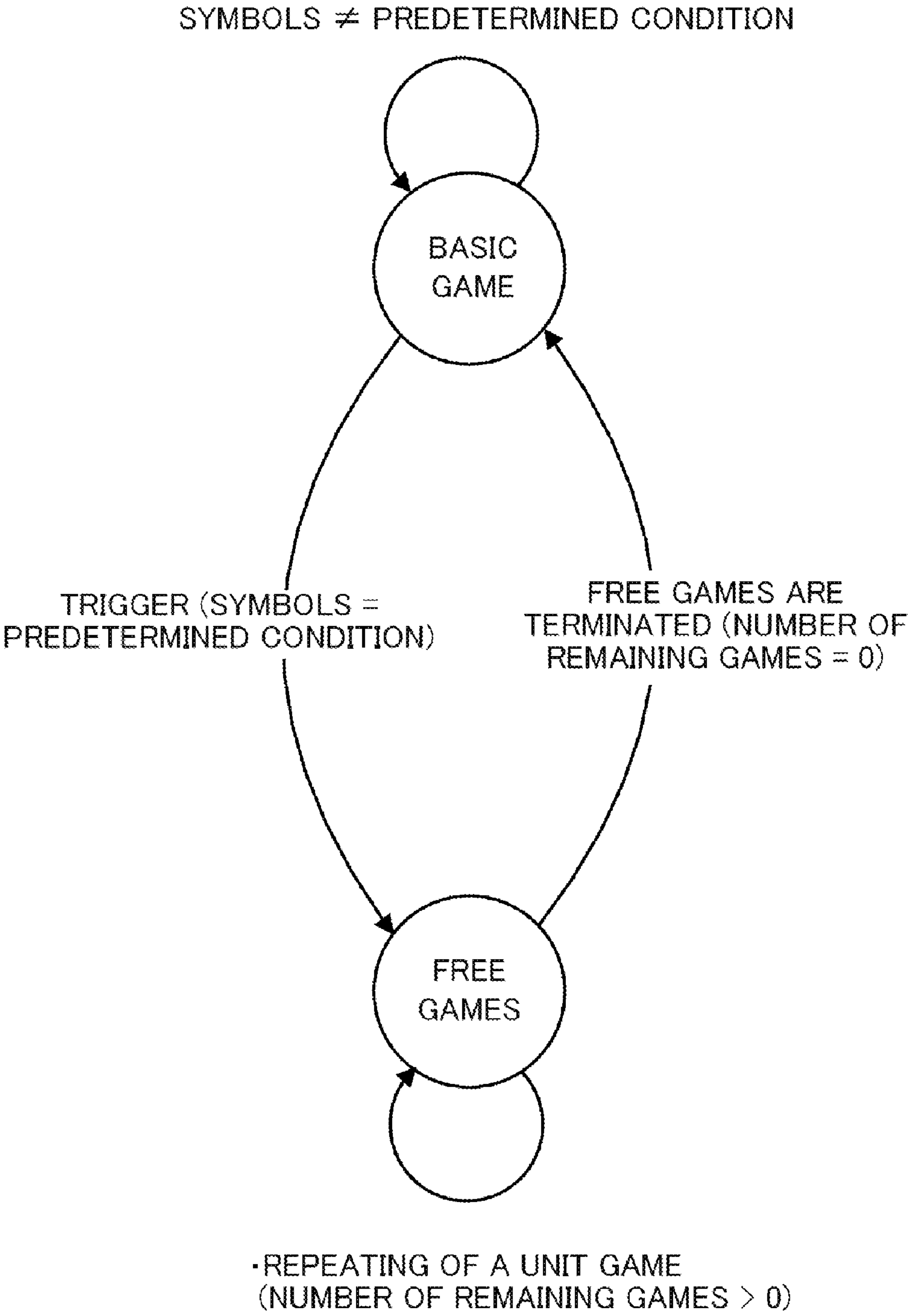
FIG. 48 is a diagram showing a pattern of state transition in a gaming machine.

FIG. 48 is a diagram showing a pattern of state transition in a gaming machine 10 in the third embodiment.

The gaming machine 10 executes two kinds of games: a basic game and free games as a feature game. In the gaming machine 10, the basic game is executed as a main game, and when in the basic game, a trigger (event) has occurred, the game shifts to the feature game.

In the third embodiment, a condition on which the trigger occurs is that in the display window 56 of the symbol display unit 40, SEVEN symbols have been rearranged (three or more SEVEN symbols have been rearranged) on a predetermined condition. Of course, other condition may be set as the condition on which the trigger occurs.

As can be understood from FIG. 48, in the basic game, a unit game is repeated until the SEVEN symbols have been rearranged in the display window 56 of the symbol display unit 40 on the predetermined condition. In this basic game, when a combination of the symbols rearranged on a payline matches any winning combination shown in the payout table, coins whose number is in accordance with a payout for that combination are paid out. In addition, when in the display window 56, the predetermined number or more of the predetermined winning symbols have been rearranged, coins whose number is in accordance with a payout associated with the number of the rearranged winning symbols are paid out.

In the free games, a unit game similar to the unit game in the basic game is repeatedly executed without consuming any gaming media such as medals. When the number of remaining free games becomes "0" (that is, a value on the number-of-free-game counter 324 is zero), the game is terminated and the game reverts to the basic game.

In the third embodiment, the number of free games upon starting the free games is set to 5.

<Feature Game Processing>

Figure 49:
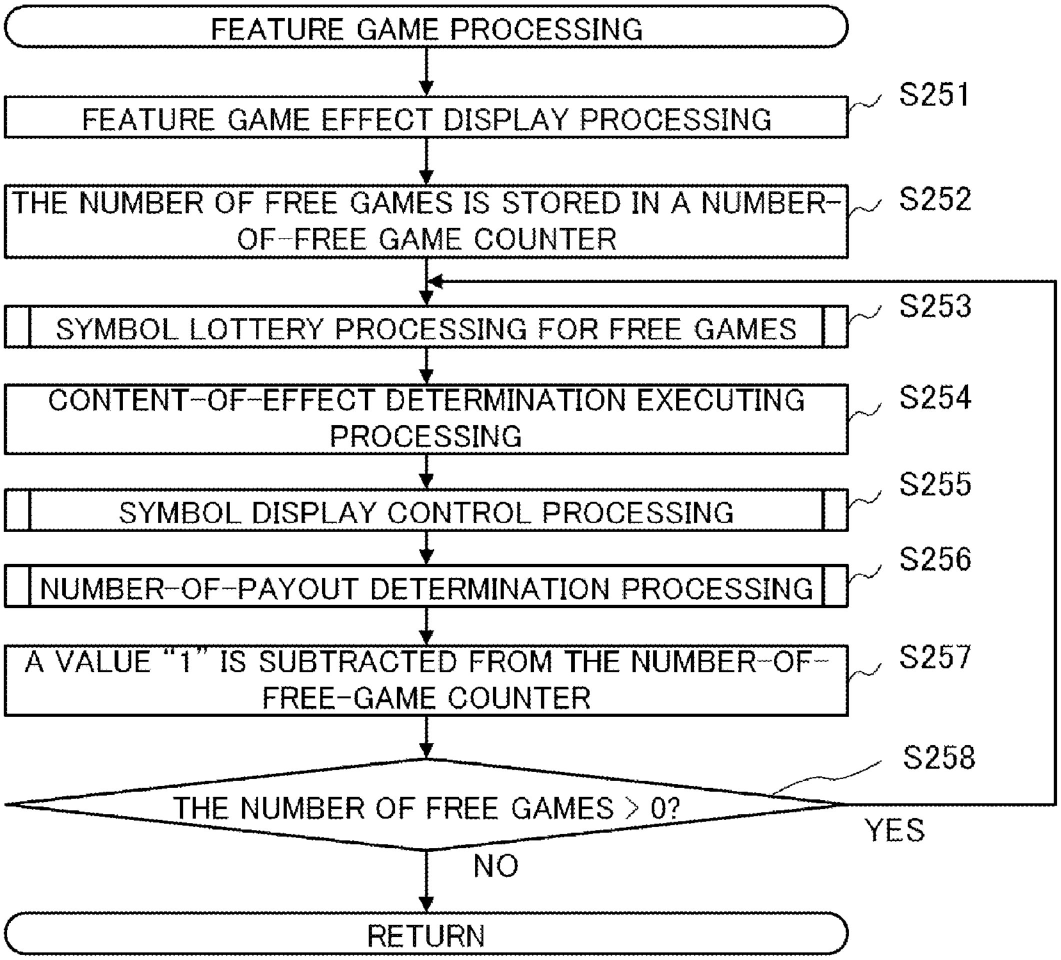
FIG. 49 is a flowchart of feature game processing in the gaming machine.

Next, with reference to FIG. 49, feature game processing will be described. FIG. 49 is a flowchart of the feature game processing in the gaming machine 10 according to the third embodiment of the present invention.

This processing is invoked in a case where it is determined that a feature game trigger is established in the main control processing shown in FIG. 13. First, the effect control processing part 312 operatively executed by the main CPU 222 conducts control to display an effect video image on the video display unit 110 in order to conduct effects related to the start of a feature game (step S251).

Next, the game counter processing part 306 operatively executed by the main CPU 222 sets the number of free games as five to the value stored in the number-of-free-game storage region (the number-of-free-game counter 324) (step S252). Subsequently, the game mode determination processing part 316 operatively executed by the main CPU 222 sets the game mode to the free game mode, and as described later, a unit game which is similar to that in the basic game is repeatedly conducted at five times.

Figure 50:
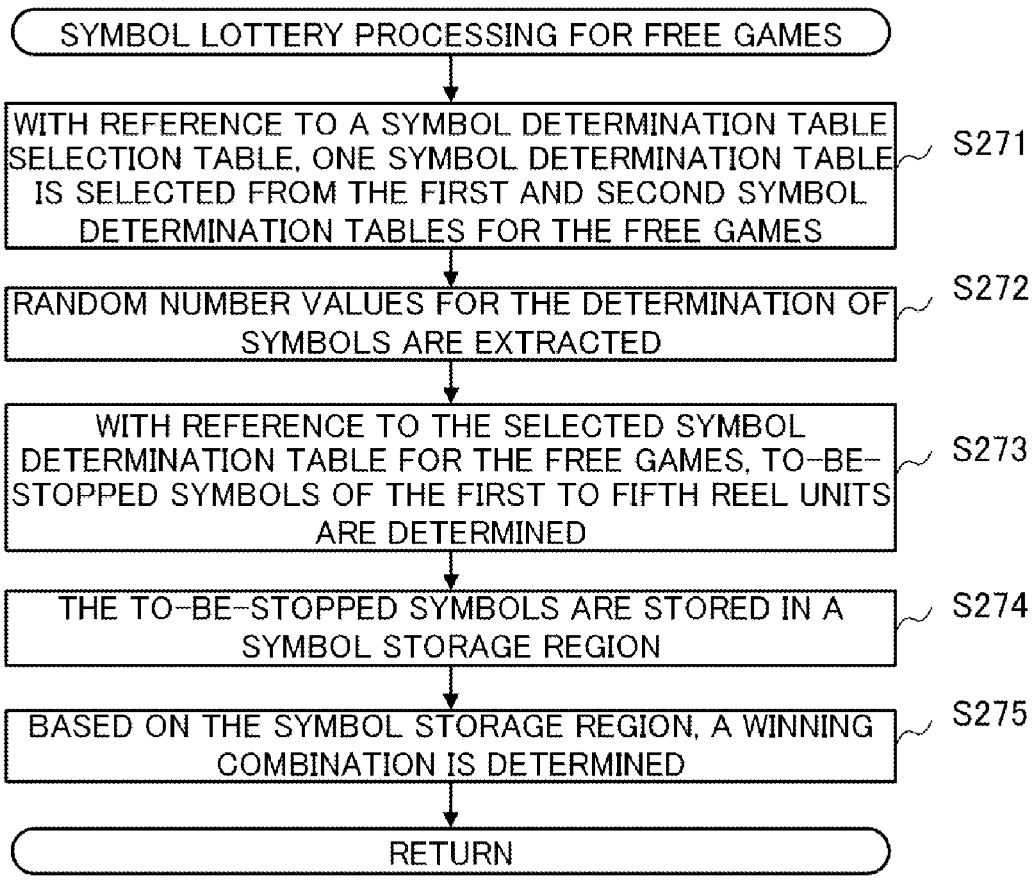
FIG. 50 is a flowchart of symbol lottery processing for the free games in the gaming machine.

Next, the main CPU 222 conducts symbol lottery processing for the free games, later described with reference to FIG. 50 (step S253). In this processing, to-be-stopped symbols are determined based on the later-described first and second symbol determination tables for the free games and random number values for the determination of symbols.

Next, the effect control processing part 312 operatively executed by the main CPU 222 conducts content-of-effect determination executing processing (step S254). The main CPU 222 extracts effect random number values, determines any of a plurality of the predetermined contents of effects by conducting a lottery, and executes the contents of effects at the timing of the determined contents of effects. For example, an effect video image is displayed on the video display unit 110, audio (such as background music (BGM)) is outputted by the speaker 112, the lamp 114 is lit, and effect processing is applied to these elements, etc., whereby control of a display mode or the like is conducted.

Next, the main CPU 222 conducts symbol display control processing which is similar to that in the main control processing shown in FIG. 16 (step S255). It is to be noted that the symbol display control processing at step S255 can be conducted prior to or in parallel with the execution of the contents of effects at step S254. Next, the main CPU 222 conducts number-of-payout determination processing which is similar to that in the main control processing shown in FIG. 16 (step S256).

Subsequently, the game counter processing part 306 operatively executed by the main CPU 222 subtracts "1" from a value on the number-of-free-game counter 324 in response to the termination of one free game (step S257). The main CPU 222 determines whether or not the number-of-free-game counter 324 is set to 0 (step S258). When the value on the number-of-free-game counter 324 is not set to 0, the main CPU 222 shifts the processing to step S253 in order to conduct a new free game. When the number-of-free-game counter 324 is set to 0, the main CPU 222 finishes the feature game processing.

<Symbol Lottery Processing for Free Games>

Next, with reference to FIG. 50, symbol lottery processing for the free games will be described. FIG. 50 is a flowchart of the symbol lottery processing for the free games in the gaming machine 10 according to the third embodiment of the present invention.

First, with reference to a symbol determination table selection table (FIG. 51), the main CPU 222 selects one symbol determination table from the first and second symbol determination tables for the free games (step S271).

According to the symbol determination table selection table shown in FIG. 51, one symbol determination table is selected from the first and second symbol determination tables for the free games.

Here, in the first symbol determination table for the free games (FIG. 52), appearance probabilities of the respective symbols are set such that the SEVEN symbols are easily rearranged on the "No. 1" or "No. 5" payline. Further, the appearance probabilities of the respective symbols are set such that when the first reel 52A and the second reel 52B are stopped, the SEVEN symbols are invariably rearranged on the "No. 1" or "No. 5" payline. Therefore, a ready-to-win combination of the SEVEN symbols is invariably established.

In the second symbol determination table for the free games (FIG. 53), appearance probabilities of the respective symbols are set such that the SEVEN symbols are easily rearranged on the "No. 1" or "No. 4" payline. Further, the appearance probabilities of the respective symbols are set such that when the first reel 52A and the second reel 52B are stopped, the SEVEN symbols are invariably rearranged on the "No. 1" or "No. 4" payline. Therefore, a ready-to-win combination of the SEVEN symbols is invariably established.

As described above regarding the first and second symbol determination tables for the free games in the third embodiment, a payline on which the SEVEN symbols are rearranged as the winning combination can be varied each time each of the free games is played. Thus, diversity can be imparted to patterns, in each of which the SEVEN winning combination is established. In addition, a payline on which the ready-to-win combination is established can be varied each time each of the free games is played. Thus, diversity can be imparted to patterns, in each of which the ready-to-win combination for the BELL or SEVEN winning combination is displayed. In addition, since the ready-to-win combination for the SEVEN winning combination is invariably established, a player can play the games while having a sense of expectation that the SEVEN winning combination could be established.

Next, the random number generation processing part 302 operatively executed by main CPU 222 extracts random number values for the determination of symbols (step S272). The symbol determination processing part 304 operatively executed by the main CPU 222 determines to-be-stopped symbols of each of the reels by conducting a lottery based on the random number values extracted at step S272 (step S273). The main CPU 222 conducts the lottery with respect to each of the reels (the first to fifth reels 52A, 52B, 52C, 52D, and 52E) and determines any of 22 symbols (code numbers "00" to "21") as the to-be-stopped symbols based on one symbol determination table selected at step S271 from the first and second symbol determination tables for the free games (FIG. 52 and FIG. 53). At this time, appearance probabilities of the 22 symbols (code numbers "00" to "21") are defined in accordance with the weights in the symbol determination table.

Next, the main CPU 222 stores the to-be-stopped symbols of each of the reels in a symbol storage region provided in the RAM 226 (step S274). Next, with reference to the payout table (FIG. 47), the winning determination processing part 310 operatively executed by the main CPU 222 determines a winning combination based on the combination of symbols stored in the symbol storage region (step S275). The main CPU 222 determines whether or not a combination of symbols on a payline displayed by each of the reels matches any combination of symbols defined in the payout table or whether or not a predetermined number or more of predetermined winning symbols defined in the payout table are rearranged in the display window 56, thereby determining a winning combination.

<Effects in Free Games>

Figure 54A:
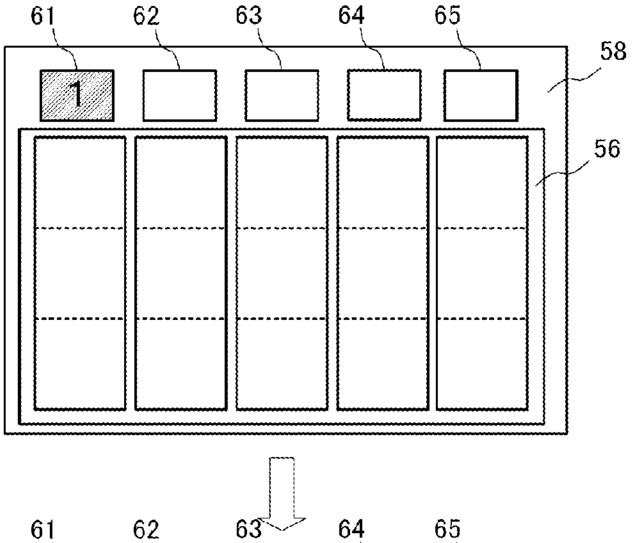
FIGS. 54A to 54C are diagrams illustrating an example of effects.
Figure 54B:
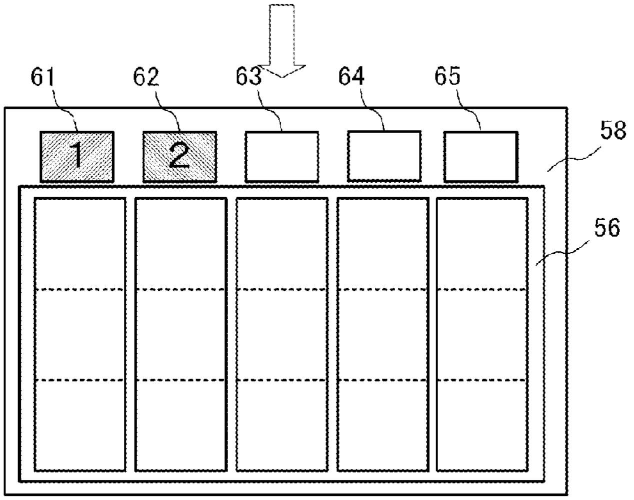
Figure 54C:
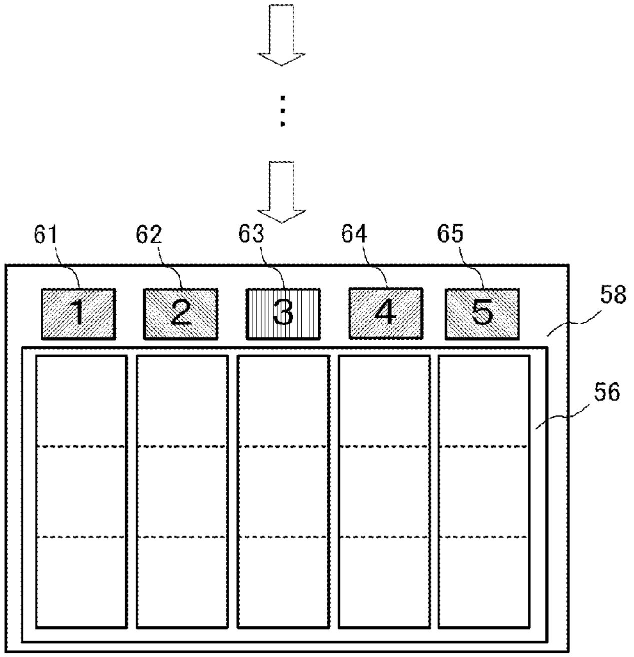

FIGS. 54A to 54C are diagrams illustrating effects executed when the feature game trigger is determined as being established in the third embodiment. In the effects, it is indicated that the number of free games as the feature game is five. In FIGS. 54A to 54C, display regions 61 to 65 are provided in an upper part of the display panel 58 provided on the periphery of the display window 56. Five LEDs which are operable to emit light from an inside of the slot machine 10 are provided so as to be associated with these five display regions. In addition, on a front face of the display region 61, a transparent sheet having "1" depicted thereon is provided. Similarly, on respective front faces of the display region 62, the display region 63, the display region 64, and the display region 65, transparent sheets having "2", "3", "4", and "5" depicted thereon respectively are provided. In addition, a color of each of the LEDs associated with the display regions 61 to 65 can be arbitrarily set. For example, blue is set for the display region 61; red is set for the display region 62; green is set for the display region 63, blue is set for the display region 64; and red is set for the display region 65.

When the feature game trigger is determined as being established, first, the LED associated with the display region 61 emits blue light and the display region 61 is lit up, thereby allowing the numeric character "1" to be visible (FIG. 54A). Next, the LED associated with the display region 62 emits red light and the display region 62 is lit up, thereby allowing the numeric character "2" to be visible (FIG. 54B). The same processing as mentioned above is executed sequentially for the display regions 63 to 65, and lastly, the LED associated with the display region 65 emits red light and the display region 65 is lit up, thereby allowing the numeric character "5" to be visible (FIG. 54C). As described above, the display regions 61 to 65 are sequentially lit up, thereby allowing a player to recognize that the number of free games at the time point when the feature game trigger is established is five.

Figure 55A:
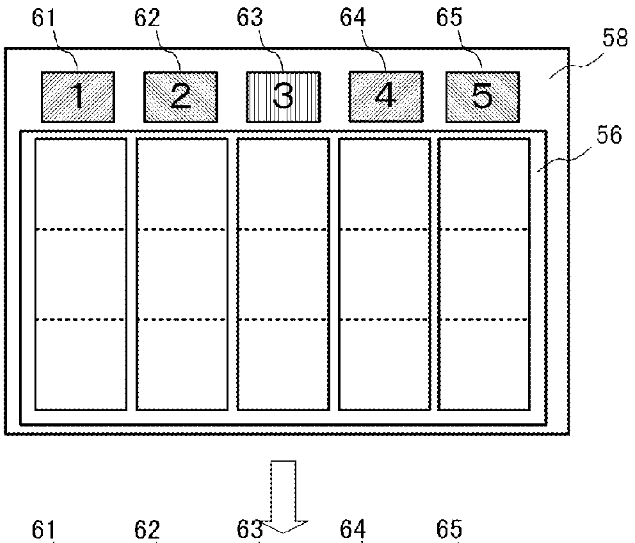
FIGS. 55A to 55C are diagrams illustrating an example of effects.
Figure 55B:
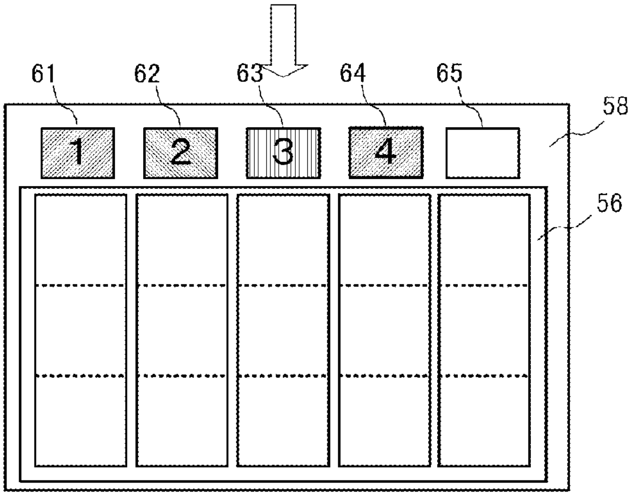
Figure 55C:
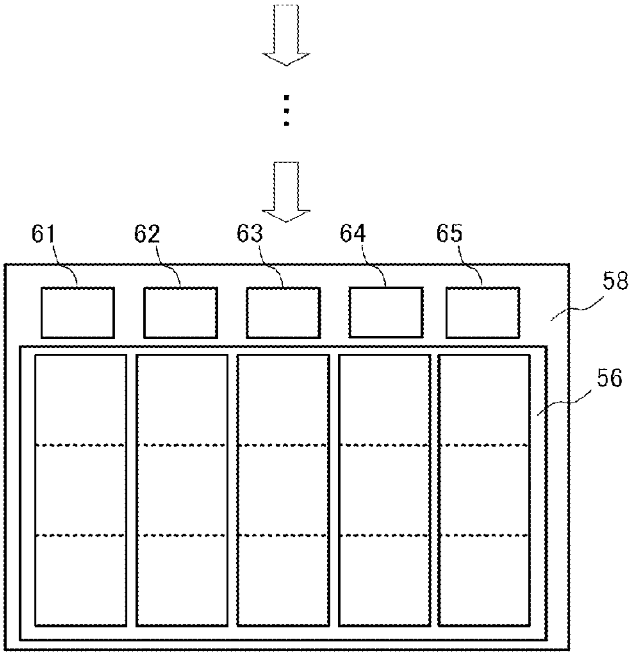

FIGS. 55A to 55C are diagrams illustrating effects conducted when the free games are executed in the third embodiment. In the effects, the number of remaining free games is notified. First, when the number of remaining free games is five, all of the display regions 61 to 65 are lit up (FIG. 55A). Thereafter, when one game has already been played, the LED associated with the display region 65 is lit off, thereby notifying that the number of remaining games is four (FIG. 55B). In accordance with the number of free games which have already been played, the LEDs associated with the display regions 64, 63, 62, and 61 are sequentially lit off and lastly, all of the LEDs associated with the display regions 61 to 65 are lit off, thereby notifying that the number of free games is zero.

In the third embodiment, although the number of free games which is set immediately after shifting to the free games is set to 5, the number thereof is not limited thereto and may be less than 5 or exceed 5.

REFERENCE SIGNS LIST

52A, 52B, 52C, 52D, 52E reel
222 main CPU
224 ROM
226 RAM

What is claimed is:

1. A gaming machine in which a payout is determined based on rearranged symbols, comprising:

a symbol display device which is configured to display a plurality of symbols in display regions thereof in a scrolling manner and in a stopped manner;

a memory storing therein first and second free-game-symbol-determination tables according to which predetermined symbols will be displayed in the stopped manner during execution of free games; wherein the first and second free-game-symbol-determination tables define probabilities for each of the predetermined symbols to be displayed in the stopped manner; wherein the probabilities defined by the first free-game-symbol-determination table are set such that a first likelihood that the predetermined symbols will satisfy a predetermined free-game condition exceeds a predetermined-condition-occurrence probability; and wherein the probabilities defined by the second free-game-symbol-determination table are set such that a second likelihood that the predetermined symbols will satisfy the predetermined free-game condition is less than the first likelihood that the predetermined symbols will satisfy the predetermined condition; and a controller which controls the symbol display device and which executes control to rearrange the plurality of symbols in the display regions, the controller being programmed to execute the following steps:

(a) conducting a basic-game lottery to determine symbols to be displayed in the stopped manner in a basic game; (b) causing the plurality of symbols to be displayed in the scrolling manner during execution of the basic game; and (c) causing to be displayed in the stopped manner the symbols that have been determined by the basic-game lottery to be displayed in the stopped manner;

(d) shifiting to a free game if the symbols that are displayed in the stopped manner during execution of the basic game satisfy a predetermined free-game-initiation condition;

(e) for each execution of the free game prior to occurrence of the predetermined free-game condition, conducting a free-game symbol-determination lottery to determine, in accordance with the first free-game-symbol-determination table, symbols to be displayed in the stopped manner in the free game; (f) causing the plurality of symbols to be displayed in the scrolling manner during execution of the free game; and (g) causing to be displayed in the stopped manner the symbols that have been determined by the free-game symbol-determination lottery, in accordance with the first free-game-symbol-determination table, to be displayed in the stopped manner; and upon occurrence of the predetermined free-game condition during a given execution of the free game, (i) conducting the free-game-symbol-determination lottery to determine, in accordance with the second free-game-symbol-determination table, symbols to be displayed in the stopped manner in each subsequent execution of the free game and (j) adding a predetermined number of free games to be executed to a number of free games remaining to be executed; (k) causing the plurality of symbols to be displayed in the scrolling manner during execution of the free game; and (g) causing to be displayed in the stopped manner the symbols that have been determined by the free-game-symbol-determination lottery, in accordance with the second free-game-symbol-determination table, to be displayed in the stopped manner.

2. The gaming machine according to claim 1, wherein the memory has stored therein first and second free-game-symbol-determination-table groups each comprising a plurality of free-game-symbol-determination tables according to which the predetermined symbols will be displayed in the stopped manner during execution of free games, with the free-game-symbol-determination tables within the two groups each defining probabilities for each of the predetermined symbols to be displayed in the stopped manner;

wherein the probabilities defined by the free-game-symbol-determination tables within the first group are set such that a first set of likelihoods that the predetermined symbols will satisfy a predetermined free-game condition each exceed a predetermined-condition-occurrence probability; and wherein the probabilities defined by the free-game-symbol-determination tables within the second group are set such that a second set of likelihoods that the predetermined symbols will satisfy the predetermined free-game condition are all less than the likelihoods associated with the first group that the predetermined symbols will satisfy the predetermined condition;

wherein the step (e) includes (e1) selecting, for each execution of the free game prior to occurrence of the predetermined free-game condition, a free-game-symbol-determination-table from the first group by conducting a table-selection lottery; and (e2) determining symbols to be displayed in the stopped manner in the free game by conducting the free-game-symbol-determination lottery in accordance with the free-game-symbol-determination table selected in step (e1) via the table-selection lottery; and wherein the step (i) includes (i1) selecting, for each execution of the free game subsequent to occurrence of the predetermined free-game condition, a free-game-symbol-determination-table from the second group by conducting a table-selection lottery; and (i2) determining symbols to be displayed in the stopped manner in the free game by conducting the free-game-symbol-determination lottery in accordance with the free-game-symbol-determination table selected in step (i1) via the table-selection lottery.

3. A gaming machine in which a payout is determined based on rearranged symbols, comprising:

a symbol display device which is configured to display a plurality of symbols in display regions thereof in a scrolling manner and in a stopped manner;

a memory storing therein first and second pluralities of free-game-symbol-determination tables according to which predetermined symbols will be displayed in the stopped manner during execution of free games; wherein each of the free-game-symbol-determination tables within said first and second pluralities of tables defines probabilities for each of the predetermined symbols to be displayed in the stopped manner; wherein the probabilities defined by the free-game-symbol-determination tables within said first plurality of tables are set such that a first likelihood that the predetermined symbols will satisfy a predetermined free-game condition exceeds a predetermined-condition-occurrence probability; and wherein the probabilities defined by the free-game-symbol-determination tables within said second plurality of tables are set such that a second likelihood that the predetermined symbols will satisfy the predetermined free-game condition is less than the first likelihood that the predetermined symbols will satisfy the predetermined condition; and a controller which controls the symbol display device and which executes control to rearrange the plurality of symbols in the display regions, the controller being programmed to execute the following steps:

(a) conducting a basic-game lottery to determine symbols to be displayed in the stopped manner in a basic game; (b) causing the plurality of symbols to be displayed in the scrolling manner during execution of the basic game; and (c) causing to be displayed in the stopped manner the symbols that have been determined by the basic-game lottery to be displayed in the stopped manner;

(d) shifting to a free game if the symbols that are displayed in the stopped manner during execution of the basic game satisfy a predetermined free-game-initiation condition;

(e) for each execution of the free game, conducting a free-game symbol-determination lottery to determine, in accordance with any one of the first and second pluralities of free-game-symbol-determination tables, symbols to be displayed in the stopped manner in the free game; (0 causing the plurality of symbols to be displayed in the scrolling manner during execution of the free game; and (g) causing to be displayed in the stopped manner the symbols that have been determined by the free-game symbol-determination lottery; and (h) upon occurrence of the predetermined free-game condition during a given execution of the free game, adding a predetermined number of free games to be executed to a number of free games remaining to be executed;

wherein for each execution of a free game until the predetermined free-game condition occurs, a free-game-symbol-determination table is selected for use in the free-game symbol-determination lottery of step (e) by means of a first table-selection lottery configured such that the respective probabilities associated with each of the first plurality of free-game-symbol-determination tables being the selected table exceed a predetermined probability; and wherein for each execution of a free game subsequent to the predetermined free-game condition occurring, a free-game-symbol-determination table is selected for use in the free-game symbol-determination lottery of step (e) by means of a second table-selection lottery configured such that the respective probabilities associated with each of the first plurality of free-game-symbol-determination tables being the selected table are less than the predetermined probability.

4. The gaming machine according to claim 3, wherein the first table-selection lottery is configured such that for each execution of a free game until the predetermined free-game condition occurs, the table that is selected for use in the free-game symbol-determination lottery of step (e) invariably is one of the first plurality of free-game-symbol-determination tables.

5. The gaming machine according to claim 3, wherein the second table-selection lottery is configured such that for each execution of a free game subsequent to the predetermined free-game condition occurring, the respective probabilities associated with each of the second plurality of free-game-symbol-determination tables being selected for use in the free-game symbol-determination lottery of step (e) are all higher than the respective probabilities associated with each of the first plurality of free-game-symbol-determination tables being selected for use in the free-game symbol-determination lottery of step (e), whereby it is more likely that the free-game-symbol-determination table that is selected for use in the free-game symbol-determination lottery of step (e) will be one of the second plurality of free-game-symbol-determination tables than it is that the free-game-symbol-determination table that is selected for use in the free-game symbol-determination lottery of step (e) will be one of the first plurality of free-game-symbol-determination tables.

* * * * *